US007939336B2

(12) United States Patent
Constantz et al.

(10) Patent No.: US 7,939,336 B2
(45) Date of Patent: May 10, 2011

(54) COMPOSITIONS AND METHODS USING SUBSTANCES CONTAINING CARBON

(75) Inventors: Brent Constantz, Portola Valley, CA (US); James R. O'Neil, Palo Alto, CA (US); Sidney Omelon, Los Gatos, CA (US)

(73) Assignee: Calera Corporation, Los Gatos, CA (US)

( * ) Notice: Subject to any disclaimer, the term of this patent is extended or adjusted under 35 U.S.C. 154(b) by 0 days.

(21) Appl. No.: 12/571,400

(22) Filed: Sep. 30, 2009

(65) Prior Publication Data

US 2010/0077922 A1      Apr. 1, 2010

Related U.S. Application Data

(63) Continuation-in-part of application No. 12/557,492, filed on Sep. 10, 2009, and a continuation-in-part of application No. 12/475,378, filed on May 29, 2009, now Pat. No. 7,753,618, and a continuation-in-part of application No. 12/344,019, filed on Dec. 24, 2008, now Pat. No. 7,887,694, and a continuation-in-part of application No. 12/501,217, filed on Jul. 10, 2009, now Pat. No. 7,749,476, and a continuation-in-part of application No. 12/486,692, filed on Jun. 17, 2009, now Pat. No. 7,754,169.

(60) Provisional application No. 61/101,629, filed on Sep. 30, 2008, provisional application No. 61/181,250, filed on May 26, 2009, provisional application No. 61/117,541, filed on Nov. 24, 2008, provisional application No. 61/219,310, filed on Jun. 22, 2009, provisional application No. 61/232,401, filed on Aug. 7, 2009, provisional application No. 61/239,429, filed on Sep. 2, 2009, provisional application No. 61/230,042, filed on Jul. 30, 2009, provisional application No. 61/178,475, filed on May 14, 2009, provisional application No. 61/170,086, filed on Apr. 16, 2009, provisional application No. 61/168,166, filed on Apr. 9, 2009, provisional application No. 61/158,992, filed on Mar. 10, 2009, provisional application No. 61/101,631, filed on Sep. 30, 2008, provisional application No. 61/101,626, filed on Sep. 30, 2008.

(51) Int. Cl.
*G01N 33/00* (2006.01)

(52) U.S. Cl. ........................................ 436/145; 436/133

(58) Field of Classification Search .......................... None
See application file for complete search history.

(56) References Cited

U.S. PATENT DOCUMENTS

| 1,678,345 A | 7/1928 | Mattison |
| 1,865,833 A | 7/1932 | Chesny |
| 1,897,725 A | 2/1933 | Gaus et al. |
| 2,304,391 A | 12/1942 | Zimmerman |
| 2,329,940 A | 9/1943 | Ponzer |
| 2,383,674 A | 8/1945 | Osborne |
| 2,458,039 A | 1/1949 | Wait |
| 2,606,839 A | 8/1952 | Evans |
| 2,934,419 A | 4/1960 | Cook |
| 2,967,807 A | 1/1961 | Osborne et al. |
| 3,046,152 A | 7/1962 | Tsuneyoshi |
| 3,120,426 A | 2/1964 | Crawford, Jr. |
| 3,179,579 A | 4/1965 | Gustave et al. |
| 3,350,292 A | 10/1967 | Weinberger et al. |
| 3,374,164 A | 3/1968 | Balej et al. |
| 3,420,775 A | 1/1969 | Cadwallader |
| 3,463,814 A | 8/1969 | Blanco et al. |
| 3,466,169 A | 9/1969 | Nowak et al. |
| 3,511,595 A | 5/1970 | Fuchs |
| 3,511,712 A | 5/1970 | Giner |
| 3,525,675 A | 8/1970 | Gaudin |
| 3,558,769 A | 1/1971 | Globus |
| 3,574,530 A | 4/1971 | Suriani et al. |
| 3,627,479 A | 12/1971 | Yee |
| 3,627,480 A | 12/1971 | Birchall |
| 3,630,762 A | 12/1971 | Olton et al. |
| 3,663,379 A | 5/1972 | Kendall |
| 3,686,372 A | 8/1972 | Hiatt et al. |
| 3,725,267 A | 4/1973 | Gelblum |
| 3,861,928 A | 1/1975 | Slater et al. |
| 3,864,236 A | 2/1975 | Lindstrom |
| 3,904,496 A | 9/1975 | Harke et al. |
| 3,917,795 A | 11/1975 | Pelczarski et al. |
| 3,925,534 A | 12/1975 | Singleton et al. |
| 3,953,568 A | 4/1976 | Seko et al. |
| 3,963,592 A | 6/1976 | Lindstrom |
| 3,970,528 A | 7/1976 | Zirngiebl et al. |
| 4,026,716 A | 5/1977 | Urschel III et al. |

(Continued)

FOREIGN PATENT DOCUMENTS

AU           2007100157           4/2007

(Continued)

OTHER PUBLICATIONS

Lopez-Capel et al. "Application of simultaneous thermal analysis mass spectrometry and stable carbon isotope analysis in a carbon sequestration study," Rapid Communiations in Mass Spectrometry, 2005, 19, 3192-3198.* Sample et al. "Isotope Geochemistry of Syntectonic Carbonate Cements and Veins from the Oregon Margin: Implications for the Hydrogeologic Evolution of the Accretionary Wedge," Proceedings of the Ocean Drilling Program, Scientific Results, 1995, 146, 137-148.*
Bauer, C. F. et al. "Identification and Quanitication of Carbonate Compounds in Coal Fly Ash," Environmental Science & Technology 1981, 15, 783-788.*
Sakata, M. "Movement and Neutralization of Alkaline Leachate at Coal Ash Disposal Sites," Environmental Science & Technology 1987, 21, 771-777.*

(Continued)

*Primary Examiner* — Yelena G Gakh
*Assistant Examiner* — Michelle M Adams

(57) ABSTRACT

Methods of characterizing and producing compositions with negative $\delta^{13}C$ values are provided. Aspects of the invention include characterizing source materials and process products. Aspects of the invention also include compositions that contain carbon with negative $\delta^{13}C$ values. Methods and techniques are provided for confirming that a given composition contains substances sequestered from a particular source e.g., fossil fuels.

9 Claims, 10 Drawing Sheets

U.S. PATENT DOCUMENTS

| | | | |
|---|---|---|---|
| 4,036,749 A | 7/1977 | Anderson | |
| 4,080,270 A | 3/1978 | O'Leary et al. | |
| 4,107,022 A | 8/1978 | Strempel et al. | |
| 4,128,462 A | 12/1978 | Ghiringhelli et al. | |
| 4,140,510 A | 2/1979 | Scholze et al. | |
| 4,147,599 A | 4/1979 | O'Leary et al. | |
| 4,188,291 A | 2/1980 | Anderson | |
| 4,217,186 A | 8/1980 | McRae | |
| 4,242,185 A | 12/1980 | McRae | |
| 4,246,075 A | 1/1981 | Hilbertz | |
| 4,253,922 A | 3/1981 | Welch | |
| 4,264,367 A | 4/1981 | Schutz | |
| 4,335,788 A | 6/1982 | Murphey et al. | |
| 4,340,572 A | 7/1982 | Ben-Shmuel et al. | |
| 4,361,475 A | 11/1982 | Moeglich | |
| 4,370,307 A | 1/1983 | Judd | |
| 4,376,101 A | 3/1983 | Sartori et al. | |
| 4,377,554 A | 3/1983 | Johnson | |
| 4,410,606 A | 10/1983 | Loutfy et al. | |
| 4,450,009 A | 5/1984 | Childs et al. | |
| 4,477,573 A | 10/1984 | Taufen | |
| 4,561,945 A | 12/1985 | Coker et al. | |
| 4,588,443 A | 5/1986 | Bache | |
| 4,620,969 A | 11/1986 | Wilkinson | |
| 4,670,234 A | 6/1987 | Holter et al. | |
| 4,716,027 A | 12/1987 | Morrison | |
| 4,804,449 A | 2/1989 | Sweeney | |
| 4,818,367 A | 4/1989 | Winkler | |
| 4,838,941 A | 6/1989 | Hill | |
| 4,899,544 A | 2/1990 | Boyd | |
| 4,915,914 A | 4/1990 | Morrison | |
| 4,931,264 A | 6/1990 | Rochelle et al. | |
| 5,037,286 A | 8/1991 | Roberts | |
| 5,100,633 A | 3/1992 | Morrison | |
| 5,230,734 A | 7/1993 | Kumasaka et al. | |
| 5,244,304 A | 9/1993 | Weill et al. | |
| 5,246,551 A | 9/1993 | Pletcher et al. | |
| 5,282,935 A | 2/1994 | Cawlfield et al. | |
| 5,362,688 A | 11/1994 | Porta et al. | |
| 5,364,611 A | 11/1994 | Iijima et al. | |
| 5,366,513 A | 11/1994 | Goldmann et al. | |
| 5,388,456 A | 2/1995 | Kettel | |
| 5,470,671 A | 11/1995 | Fletcher et al. | |
| 5,520,898 A | 5/1996 | Pinnavaia et al. | |
| 5,531,821 A | 7/1996 | Wu | |
| 5,531,865 A | 7/1996 | Cole | |
| 5,536,310 A | 7/1996 | Brook et al. | |
| 5,547,027 A | 8/1996 | Chan et al. | |
| 5,569,558 A | 10/1996 | Takeuchi et al. | |
| 5,584,923 A | 12/1996 | Wu | |
| 5,584,926 A | 12/1996 | Borgholm et al. | |
| 5,595,641 A | 1/1997 | Traini et al. | |
| 5,614,078 A | 3/1997 | Lubin et al. | |
| 5,624,493 A | 4/1997 | Wagh et al. | |
| 5,690,729 A | 11/1997 | Jones, Jr. | |
| 5,702,585 A | 12/1997 | Hillrichs et al. | |
| 5,766,338 A | 6/1998 | Weber | |
| 5,766,339 A | 6/1998 | Babu et al. | |
| 5,776,328 A | 7/1998 | Traini et al. | |
| 5,785,868 A | 7/1998 | Li et al. | |
| 5,803,894 A | 9/1998 | Kao et al. | |
| 5,846,669 A | 12/1998 | Smotkin et al. | |
| 5,849,075 A | 12/1998 | Hopkins et al. | |
| 5,855,666 A | 1/1999 | Kao et al. | |
| 5,855,759 A | 1/1999 | Keating et al. | |
| 5,885,478 A | 3/1999 | Montgomery et al. | |
| 5,897,704 A | 4/1999 | Baglin | |
| 5,925,255 A | 7/1999 | Mukhopadhyay | |
| 5,965,201 A | 10/1999 | Jones, Jr. | |
| 6,024,848 A | 2/2000 | Dufner et al. | |
| 6,059,974 A | 5/2000 | Scheurman, III | |
| 6,071,336 A | 6/2000 | Fairchild et al. | |
| 6,080,297 A | 6/2000 | Ayers | |
| 6,090,197 A | 7/2000 | Vivian et al. | |
| 6,129,832 A | 10/2000 | Fuhr et al. | |
| 6,180,012 B1 | 1/2001 | Rongved | |
| 6,190,428 B1 | 2/2001 | Rolison et al. | |
| 6,200,381 B1 | 3/2001 | Rechichi | |
| 6,200,543 B1 | 3/2001 | Allebach et al. | |
| 6,217,728 B1 | 4/2001 | Lehmann et al. | |
| 6,235,186 B1 | 5/2001 | Tanaka et al. | |
| 6,248,166 B1 | 6/2001 | Solsvik | |
| 6,251,356 B1 | 6/2001 | Mathur | |
| 6,280,505 B1 | 8/2001 | Torkildsen et al. | |
| 6,293,731 B1 | 9/2001 | Studer | |
| 6,331,207 B1 | 12/2001 | Gebhardt | |
| 6,352,576 B1 | 3/2002 | Spencer et al. | |
| 6,375,825 B1 | 4/2002 | Mauldin et al. | |
| 6,402,831 B1 | 6/2002 | Sawara et al. | |
| 6,416,574 B1 | 7/2002 | Steelhammer et al. | |
| 6,428,767 B1 * | 8/2002 | Burch et al. | 424/1.37 |
| 6,444,107 B2 | 9/2002 | Hartel et al. | |
| 6,475,460 B1 | 11/2002 | Max | |
| 6,495,013 B2 | 12/2002 | Mazur et al. | |
| 6,517,631 B1 | 2/2003 | Bland | |
| 6,518,217 B2 | 2/2003 | Xing et al. | |
| 6,537,456 B2 | 3/2003 | Mukhopadhyay | |
| 6,602,630 B1 | 8/2003 | Gopal | |
| 6,620,856 B1 | 9/2003 | Mortimer et al. | |
| 6,623,555 B1 | 9/2003 | Haverinen et al. | |
| 6,638,413 B1 | 10/2003 | Weinberg et al. | |
| 6,648,949 B1 | 11/2003 | Der et al. | |
| 6,712,946 B2 | 3/2004 | Genders et al. | |
| 6,755,905 B2 | 6/2004 | Oates et al. | |
| 6,776,972 B2 | 8/2004 | Vohra et al. | |
| 6,786,963 B2 | 9/2004 | Matherly et al. | |
| 6,841,512 B1 | 1/2005 | Fetcenko et al. | |
| 6,890,419 B2 | 5/2005 | Reichman et al. | |
| 6,890,497 B2 | 5/2005 | Rau et al. | |
| 6,908,507 B2 | 6/2005 | Lalande et al. | |
| 6,936,573 B2 | 8/2005 | Wertz et al. | |
| 7,037,434 B2 | 5/2006 | Myers et al. | |
| 7,040,400 B2 | 5/2006 | de Rouffignac et al. | |
| 7,132,090 B2 | 11/2006 | Dziedzic et al. | |
| 7,135,604 B2 | 11/2006 | Ding et al. | |
| 7,182,851 B2 | 2/2007 | Gomez | |
| 7,198,722 B2 | 4/2007 | Hussain | |
| 7,255,842 B1 | 8/2007 | Yeh et al. | |
| 7,261,912 B2 | 8/2007 | Zeigler | |
| 7,282,189 B2 | 10/2007 | Zauderer | |
| 7,285,166 B2 | 10/2007 | Luke et al. | |
| 7,314,847 B1 | 1/2008 | Siriwardane | |
| 7,347,896 B2 | 3/2008 | Harrison | |
| 7,390,444 B2 | 6/2008 | Ramme et al. | |
| 7,427,449 B2 | 9/2008 | Delaney et al. | |
| 7,440,871 B2 | 10/2008 | McConnell et al. | |
| 7,452,449 B2 | 11/2008 | Weinberg et al. | |
| 7,459,134 B2 | 12/2008 | Cadours et al. | |
| 7,595,001 B2 | 9/2009 | Arakel et al. | |
| 7,674,443 B1 | 3/2010 | Davis | |
| 2001/0022952 A1 | 9/2001 | Rau et al. | |
| 2001/0023655 A1 | 9/2001 | Knopf et al. | |
| 2001/0054253 A1 | 12/2001 | Takahashi et al. | |
| 2002/0009410 A1 | 1/2002 | Mathur | |
| 2002/0127474 A1 | 9/2002 | Fleischer et al. | |
| 2003/0017088 A1 | 1/2003 | Downs et al. | |
| 2003/0027023 A1 | 2/2003 | Dutil et al. | |
| 2003/0126899 A1 | 7/2003 | Wolken | |
| 2003/0188668 A1 | 10/2003 | Bland | |
| 2003/0213937 A1 | 11/2003 | Yaniv | |
| 2003/0229572 A1 | 12/2003 | Raines et al. | |
| 2004/0014845 A1 | 1/2004 | Takamura et al. | |
| 2004/0040671 A1 | 3/2004 | Duesel, Jr. et al. | |
| 2004/0040715 A1 | 3/2004 | Wellington et al. | |
| 2004/0052865 A1 | 3/2004 | Gower et al. | |
| 2004/0109927 A1 | 6/2004 | Ang et al. | |
| 2004/0126293 A1 | 7/2004 | Geerlings et al. | |
| 2004/0139891 A1 | 7/2004 | Merkley et al. | |
| 2004/0151957 A1 | 8/2004 | Brooks et al. | |
| 2004/0213705 A1 | 10/2004 | Blencoe et al. | |
| 2004/0219090 A1 | 11/2004 | Dziedzic et al. | |
| 2004/0224214 A1 | 11/2004 | Vamos et al. | |
| 2004/0228788 A1 | 11/2004 | Nagai et al. | |
| 2004/0231568 A1 | 11/2004 | Morioka et al. | |
| 2004/0234443 A1 | 11/2004 | Chen et al. | |
| 2004/0259231 A1 | 12/2004 | Bhattacharya | |
| 2004/0267077 A1 | 12/2004 | Ding et al. | |

| | | | | | | |
|---|---|---|---|---|---|---|
| 2005/0002847 A1 | 1/2005 | Maroto-Valer et al. | | 2009/0202410 A1 | 8/2009 | Kawatra et al. |
| 2005/0011770 A1 | 1/2005 | Katsuyoshi et al. | | 2009/0214408 A1 | 8/2009 | Blake et al. |
| 2005/0031522 A1 | 2/2005 | Delaney et al. | | 2009/0232861 A1 | 9/2009 | Wright et al. |
| 2005/0036932 A1 | 2/2005 | Takahashi et al. | | 2009/0263301 A1 | 10/2009 | Reddy et al. |
| 2005/0087496 A1 | 4/2005 | Borseth | | 2009/0294366 A1 | 12/2009 | Wright et al. |
| 2005/0098499 A1 | 5/2005 | Hussain | | 2009/0301352 A1 | 12/2009 | Constantz et al. |
| 2005/0118081 A1 | 6/2005 | Harris et al. | | 2010/0024686 A1 | 2/2010 | Constantz et al. |
| 2005/0129606 A1 | 6/2005 | Mitsuhashi et al. | | 2010/0063902 A1 | 3/2010 | Constantz et al. |
| 2005/0136310 A1 | 6/2005 | Luo et al. | | 2010/0077691 A1 | 4/2010 | Constantz et al. |
| 2005/0154669 A1 | 7/2005 | Streetman | | 2010/0083880 A1 | 4/2010 | Constantz et al. |
| 2005/0180910 A1 | 8/2005 | Park et al. | | 2010/0084280 A1 | 4/2010 | Gilliam et al. |
| 2005/0232855 A1 | 10/2005 | Stevens et al. | | 2010/0089142 A1 | 4/2010 | Sukhija et al. |
| 2005/0232856 A1 | 10/2005 | Stevens et al. | | 2010/0111810 A1 | 5/2010 | Constantz et al. |
| 2005/0238563 A1 | 10/2005 | Eighmy et al. | | 2010/0116683 A1 | 5/2010 | Gilliam |
| 2005/0252215 A1 | 11/2005 | Beaumont | | 2010/0132556 A1 | 6/2010 | Constantz et al. |
| 2005/0255174 A1 | 11/2005 | Shelley et al. | | 2010/0135865 A1 | 6/2010 | Constantz et al. |
| 2006/0048517 A1 | 3/2006 | Fradette et al. | | 2010/0135882 A1 | 6/2010 | Constantz et al. |
| 2006/0051274 A1 | 3/2006 | Wright et al. | | 2010/0140103 A1 | 6/2010 | Gilliam et al. |
| 2006/0057036 A1 | 3/2006 | Ayala Hermosillo | | 2010/0144521 A1 | 6/2010 | Constantz et al. |
| 2006/0060532 A1 | 3/2006 | Davis | | 2010/0150802 A1 | 6/2010 | Gilliam et al. |
| 2006/0105082 A1 | 5/2006 | Zeigler | | 2010/0154679 A1 | 6/2010 | Constantz et al. |
| 2006/0165583 A1 | 7/2006 | Makino et al. | | 2010/0155258 A1 | 6/2010 | Kirk et al. |
| 2006/0169177 A1 | 8/2006 | Jardine et al. | | 2010/0158786 A1 | 6/2010 | Constantz et al. |
| 2006/0169593 A1 | 8/2006 | Xu et al. | | 2010/0196104 A1 | 8/2010 | Constantz et al. |
| 2006/0173169 A1 | 8/2006 | Cheryan | | | | |
| 2006/0184445 A1 | 8/2006 | Sandor et al. | | FOREIGN PATENT DOCUMENTS | | |
| 2006/0185516 A1 | 8/2006 | Moriyama et al. | | AU | 2008256636 B2 | 12/2008 |
| 2006/0185560 A1 | 8/2006 | Ramme et al. | | CA | 1335974 A1 | 6/1995 |
| 2006/0185985 A1 | 8/2006 | Jones | | CA | 2646462 | 9/2007 |
| 2006/0186562 A1 | 8/2006 | Wright et al. | | DE | 2653649 A1 | 6/1978 |
| 2006/0189837 A1 | 8/2006 | Forrester | | DE | 3146326 A1 | 6/1983 |
| 2006/0195002 A1 | 8/2006 | Grandjean et al. | | DE | 3638317 | 1/1986 |
| 2006/0196836 A1 | 9/2006 | Arakel et al. | | DE | 19523324 | 9/1994 |
| 2006/0286011 A1 | 12/2006 | Anttila et al. | | DE | 19512163 A1 | 10/1995 |
| 2006/0288912 A1 | 12/2006 | Sun et al. | | DE | 19631794 A1 | 8/1997 |
| 2007/0045125 A1 | 3/2007 | Hartvigsen et al. | | EP | 0522382 A1 | 1/1993 |
| 2007/0056487 A1 | 3/2007 | Anthony et al. | | EP | 0487102 B1 | 8/1995 |
| 2007/0092427 A1 | 4/2007 | Anthony et al. | | EP | 0591350 B1 | 11/1996 |
| 2007/0099038 A1 | 5/2007 | Galloway | | EP | 0628339 B1 | 9/1999 |
| 2007/0113500 A1 | 5/2007 | Zhao | | EP | 0844905 B1 | 3/2000 |
| 2007/0148509 A1 | 6/2007 | Colbow et al. | | EP | 1379469 B1 | 3/2006 |
| 2007/0163443 A1 | 7/2007 | Moriyama et al. | | EP | 1650162 A1 | 4/2006 |
| 2007/0186820 A1 | 8/2007 | O'Hearn | | EP | 1716911 A1 | 11/2006 |
| 2007/0187247 A1 | 8/2007 | Lackner et al. | | EP | 1554031 B1 | 12/2006 |
| 2007/0202032 A1 | 8/2007 | Geerlings et al. | | EP | 1571105 B1 | 12/2007 |
| 2007/0212584 A1 | 9/2007 | Chuang | | GB | 911386 A | 11/1962 |
| 2007/0217981 A1 | 9/2007 | Van Essendelft | | GB | 1392907 | 5/1975 |
| 2007/0240570 A1 | 10/2007 | Jadhav et al. | | GB | 2210035 A | 6/1989 |
| 2007/0261947 A1 | 11/2007 | Geerlings et al. | | GB | 2371810 | 8/2002 |
| 2007/0266632 A1 | 11/2007 | Tsangaris et al. | | JP | 51102357 A1 | 9/1976 |
| 2008/0031801 A1 | 2/2008 | Lackner et al. | | JP | 59100280 | 12/1982 |
| 2008/0059206 A1 | 3/2008 | Jenkins | | JP | 1142093 | 11/1987 |
| 2008/0112868 A1 | 5/2008 | Blencoe et al. | | JP | 63-312988 | 12/1988 |
| 2008/0138265 A1 | 6/2008 | Lackner et al. | | JP | 03-020491 | 1/1991 |
| 2008/0171158 A1 | 7/2008 | Maddan | | JP | 03-170363 A | 7/1991 |
| 2008/0178739 A1 | 7/2008 | Lewnard et al. | | JP | 7061842 A | 3/1995 |
| 2008/0213146 A1 | 9/2008 | Zauderer | | JP | 10305212 A | 11/1998 |
| 2008/0223727 A1 | 9/2008 | Oloman et al. | | JP | 2003041388 | 7/2001 |
| 2008/0236143 A1 | 10/2008 | Lo | | JP | 2002-273163 A | 9/2002 |
| 2008/0245274 A1 | 10/2008 | Ramme | | JP | 2004-174370 | 6/2004 |
| 2008/0245660 A1 | 10/2008 | Little et al. | | JP | 2005-052762 | 3/2005 |
| 2008/0245672 A1 | 10/2008 | Little et al. | | JP | 2006-076825 | 3/2006 |
| 2008/0248350 A1 | 10/2008 | Little et al. | | NL | 7607470 A | 1/1978 |
| 2008/0270272 A1 | 10/2008 | Branscomb | | WO | WO 93/16216 A1 | 8/1993 |
| 2008/0276553 A1 | 11/2008 | Ingjaldsdottir et al. | | WO | WO 94/18119 | 8/1994 |
| 2008/0277319 A1 | 11/2008 | Wyrsta | | WO | WO 96/34997 A1 | 11/1996 |
| 2008/0289495 A1 | 11/2008 | Eisenberger et al. | | WO | WO 99/13967 A1 | 3/1999 |
| 2009/0001020 A1 | 1/2009 | Constantz et al. | | WO | WO 2006/009600 A2 | 1/2000 |
| 2009/0010827 A1 | 1/2009 | Geerlings et al. | | WO | WO 01/07365 A1 | 2/2001 |
| 2009/0043687 A1 | 2/2009 | van Soestbergen et al. | | WO | WO 01/96243 A1 | 12/2001 |
| 2009/0081093 A1 | 3/2009 | Comrie | | WO | WO 02/00551 A2 | 1/2002 |
| 2009/0081096 A1 | 3/2009 | Pellegrin | | WO | WO 03/008071 A1 | 1/2003 |
| 2009/0081112 A1 | 3/2009 | Virtanen | | WO | WO 03/054508 A2 | 7/2003 |
| 2009/0090277 A1 | 4/2009 | Joshi et al. | | WO | WO 03/068685 A1 | 8/2003 |
| 2009/0120644 A1 | 5/2009 | Roddy et al. | | WO | WO 2004/041731 A1 | 5/2004 |
| 2009/0143211 A1 | 6/2009 | Riman et al. | | WO | WO 2004/094043 A2 | 11/2004 |
| 2009/0148238 A1 | 6/2009 | Smith | | WO | WO 2004/098740 A2 | 11/2004 |
| 2009/0169452 A1 | 7/2009 | Constantz et al. | | WO | WO 2005/028379 A1 | 3/2005 |
| 2009/0186244 A1 | 7/2009 | Mayer | | WO | WO 2005/078836 A2 | 8/2005 |

| | | |
|---|---|---|
| WO | WO 2005/086843 A2 | 9/2005 |
| WO | WO 2005/108297 A2 | 11/2005 |
| WO | WO 2006/034339 A1 | 3/2006 |
| WO | WO 2006/036396 A2 | 4/2006 |
| WO | WO 2006/099599 A2 | 9/2006 |
| WO | WO 2006/134080 A1 | 12/2006 |
| WO | WO 2007/003013 A1 | 1/2007 |
| WO | WO 2007/016271 A2 | 2/2007 |
| WO | WO 2007/060149 A1 | 5/2007 |
| WO | WO 2007/069902 A1 | 6/2007 |
| WO | WO 2007/071633 A1 | 6/2007 |
| WO | WO 2007/082505 A2 | 7/2007 |
| WO | WO 2007/094691 A1 | 8/2007 |
| WO | WO 2007/096671 A1 | 8/2007 |
| WO | WO 2007/106372 A2 | 9/2007 |
| WO | WO 2007/106883 A2 | 9/2007 |
| WO | WO 2007/123917 A2 | 11/2007 |
| WO | WO 2007/139392 A1 | 12/2007 |
| WO | WO 2007/140544 A1 | 12/2007 |
| WO | WO 2007/142945 A2 | 12/2007 |
| WO | WO 2008/018928 A2 | 2/2008 |
| WO | WO 2008/026201 A2 | 3/2008 |
| WO | WO 2008/031834 A1 | 3/2008 |
| WO | WO 2008/061305 A1 | 5/2008 |
| WO | WO 2008/068322 A1 | 6/2008 |
| WO | WO 2008/089523 A1 | 7/2008 |
| WO | WO 2008/095057 A2 | 8/2008 |
| WO | WO 2008/101293 A1 | 8/2008 |
| WO | WO 2008/108657 A1 | 9/2008 |
| WO | WO 2008/115662 A2 | 9/2008 |
| WO | WO 2008/124538 A1 | 10/2008 |
| WO | WO 2008/140821 A2 | 11/2008 |
| WO | WO 2008/142017 A2 | 11/2008 |
| WO | WO 2008/142025 A1 | 11/2008 |
| WO | WO 2008/148055 A1 | 12/2008 |
| WO | WO 2008/151060 A1 | 12/2008 |
| WO | WO 2009/006295 A2 | 1/2009 |
| WO | WO 2009/024826 A1 | 2/2009 |
| WO | WO 2009/032331 A2 | 3/2009 |
| WO | WO 2009/036087 A1 | 3/2009 |
| WO | WO 2009/039655 A1 | 4/2009 |
| WO | WO 2009/049085 A2 | 4/2009 |
| WO | WO 2009/065031 A1 | 5/2009 |
| WO | WO 2009/070273 A1 | 6/2009 |
| WO | WO 2009/086460 A1 | 7/2009 |
| WO | WO 2009/146436 A1 | 12/2009 |
| WO | WO 2010/006242 A1 | 1/2010 |
| WO | WO 2010/039903 A1 | 4/2010 |
| WO | WO 2010/068924 A1 | 6/2010 |
| WO | WO 2010/091029 A1 | 8/2010 |

OTHER PUBLICATIONS

Zhang, C. L. et al. "Temperature-dependent oxygen and carbon isotope fractionations of biogenic siderite," Geochimica et Cosmochimica Acta 2001, 65, 2257-2271.*

Golden, D. C. "A simple inorganic process for formation of carbonates, magnetite, and sulfides in Martian meteorite ALH84001," American Mineralogist 2001, 86, 370-375.*

Biello, D. Cement from CO2: A Concrete Cure for Global Warming? *Scientific American* Aug. 7, 2008., pp. 1-3 [online] [retrieved on Dec. 29, 2009] <URL:http://www.scientificarnerican.com/article.cfm>.

Carbon Sequestration. National Energy Technology Laboratory, Jul. 1, 2008 (online) [retrieved on Dec. 21, 2009] <URL:http://web.archive.org/web/20080701213124/http://www.netl.doe.gov/technologies/carbon_seq/index.html>.

Christiansen, L.E., et al. Measurement of Sulfur Isotope Compositions by Tunable Laser Spectroscopy of SO2. Analytical Chemistry, Nov. 17, 2007, vol. 79, No. 24, pp. 9261-9268 (abstract) [online] [retrieved on Dec. 30, 2009] <URL:http://pubs.acs.org/doi/abs/10.1021/ac071040p>.

Huijgen, W.J.J., et al. 2005. Mineral CO2 Sequestration by Steel Slag Carbonation. *Environ. Sci.Technol.* 39: 9676-9682.

Huijgen, W.J.J., et al. 2006. Energy Consumption and Net CO2 Sequestration of Aqueous Mineral.Carbonation. *Ind. Eng. Chem. Res.* 45: 9184-9194.

Huntzinger, D.N. et al. 2009. A life-cycle assessment of Portland cement manufacturing: comparing the traditional process with alternative technologies. *Journal of Cleaner Production.* 17: 668-675.

Huntzinger, D.N. Carbon Dioxide Sequestration in Cement Kiln Dust Through Mineral Carbonation. Michigan Technological University, 2006 [online], [retrieved on Dec. 29, 2009]. <URL:http://www.geo.mtu.edu/~dnhuntzi/DNHuntzingerETD.pdf>.

International Search Report dated Jan. 4, 2010 of PCT/US09/062795.

International Search Report dated Jan. 13, 2010 of PCT/US09/059135.

International Search Report dated Feb. 2, 2010 of PCT/US09/059141.

International Search Report dated Feb. 24, 2010 of PCT/US09/067764.

Lin, C. et al. Use of Cement Kiln Dust, Fly Ash, and Recycling Technique in Low-Volume Road Rehabilitation. Transportation Research Record, 1992, No. 1345, pp. 19-27 (abstract) [online], [retrieved on Dec. 31, 2009] <URL: http://pubsindex.trb.org/view.aspx?id=370714>.

Sasakawa, M., et al. Carbonic Isotopic Characterization for the Origin of Excess Methane in Subsurface Seawater. Journal of Geophysical Research, vol. 113 (abstract) [online], Mar. 11, 2008 [retrieved on Jan. 1, 2010] <URL: http://www.agu.org/pubs/crossref/2008/2007JC004217.shtml>.

Sethi, S. et al. 2006. Existing & Emerging Concentrate Minimization & Disposal Practices for Membrane Systems. *Florida Water Resources Journal.* pp. 38, 40, 42, 44, 46, 48.

Stanley, S.M., et al. 2002. Low-magnesium calcite produced by coralline algae in seawater of Late Cretaceous composition. *PNAS.* 99(24): 15323-15326.

U.S. Appl. No. 12/163,205, filed Jun. 27, 2008, Constantz, Brent R., et al, Non-Final Office.Action dated Jan. 27, 2010.

U.S. Appl. No. 12/163,205, filed Jun. 27, 2008, Constantz, Brent R., et al, Non-Final Office Action dated Mar. 1, 2010.

U.S. Appl. No. 12/344,019, filed Dec. 24, 2008, Constantz, Brent R., et al, Non-Final Office.Action dated Nov. 16, 2009.

U.S. Appl. No. 12/475,378, filed May 29, 2009, Constantz Brent. et al, Non-Final Office Action dated Mar. 2, 2010.

U.S.Appl. No. 12/486,692, filed Jun. 17, 2009, Constantz Brent. et al, Non-Final Office Action dated Mar. 1, 2010

Wang, W., et al. 2005. Effects of biodegradation on the carbon isotopic composition of natural gas—A case study in the bamianhe oil field of the Jiyang Depression, Eastern China. *Geochemical Journal.* 39(4): 301-309. (abstract) [online] [retrieved on Dec. 29, 2009] <URL: http://www/jstage.jst.go.jp/article/geochemj/39/4/39_301/_article> ab.

Wen-Zhi et al., "Using Electrolytic Method to Promote CO2 Sequestration in Serpentine by Mineral Carbonation"; Journal of China University of Mining and Technology; vol. 36, No. 6; Nov. 2007 (Publication and English Translation).

Winschel, R.A., et al. Stable Carbon Isotope Analysis of Coal/Petroleum Coprocessing Products. Preprints of Papers, American Chemical Society, Division of Fuel Chemistry, Jan. 1, 1988, vol. 33, No. 1, pp. 114-121 [online], [retrieved on Dec. 29, 2009] <URL: http://www.anl.gov/PCS/acsfuel/preprint%20archive/Files/33_1_TORONTO_06-88_0114.PDF>.

Allen, L.M. 1992. Boron and Sulfur Isotopic Fractionation in the Coal Combustion System. A Thesis Submitted to the Faculty of the Department of Hydrology and Water Resources. The University of Arizona.

Baer, D.S., et al. 2002. Sensitive absorption measurements in the near-infrared region using off-axis integrated-cavity-output spectroscopy. *Appl. Phys. B.* 5 pages.

Biennier, L., et al. 2004. Multiplex integrated cavity output spectroscopy of cold PAH cations. *Chemical Physics Letters.* 387: 287-294.

Bottomley, D.J. et al. 1999. The origin and evolution of Canadian Shield brines: evaporation or freezing of seawater? New lithium isotope and geochemical evidence from the Slave craton. *Chemical Geology.* 155: 295-320.

Cerling, T.E. 1984. The stable isotopic composition of modern soil carbonate and its relationship to climate. *Earth and Planetary Science Letters.* 71: 229-240.

Criss, R.E. 1995. Stable Isotope Distribution: Variations from Temperature, Organic and Water-Rock Interactions. Washington University, St. Louis, Department of Earch and Planetary Sciences. *American Geophysical Union.* pp. 292-307.

Ehleringer, J.R., et al. 2002. Stable Isotopes. vol. 2, The Earth System: biological and ecological dimensions of global environmental change. pp. 544-550. Edited by Professor Harold A. Mooney and Dr. Josep G. Canadell in Encyclopedia of Global Environmental Change. John Wiley & Sons, Ltd. Chichester.

Elswick, E.R., et al. 2007. Sulfur and carbon isotope geochemistry of coal and derived coal-combustion by-products: An example from an Eastern Kentucky mine and power plant. *Applied Geochemistry*. 22: 2065-2077.

Fallick, A.E., et al. 1991. A Stable Isotope Study of the Magnesite Deposits Associated with the Alpine-Type Ultramafic Rocks of Yugoslavia. *Economic Geology*. 86: 847-861.

Filley, T.R. et al. 1997. Application of Isotope-Ratio-Monitoring Gas Chromatography/Mass Spectrometry to Study Carbonization Reactions of FCCU Slurry Oils. Department of Geosciences, Department of Materials Science and Engineering, The Pennsylvania State University, University Park, PA. Abstracts of Papers of the American Chemical Society. 214:65-FUEL Part 1. pp. 938-941.

Fouke, B.W., et al. 2000. Depositional Facies and Aqueous-Solid Geochemistry of Travertine-Depositing Hot Springs (Angel Terrace, Mammoth Hot Springs, Yellowstone National Park, U.S.A.). *Journal of Sedimentary Research*. 70(3): 565-585.

Holdgate, G.R., et al. 2009. Eocene-Miocene carbon-isotope and floral record from brown coal seams in the Gippsland Basin of southeast Australia. *Global and Planetary Change*. 65: 89-103.

Horkel, K., et al. 2009. Stable isotopic composition of cryptocrystalline magnesite from deposits in Turkey and Austria. *Geophysical Research Abstracts*. 11. (abstract only).

Horner, G. et al. 2004. Isotope selective analysis of $CO_2$ with tunable diode laser (TDL) spectroscopy in the NIR. *The Analyst*. 129: 772-778.

McCrea, J.M. 1950. On the Isotopic Chemistry of Carbonates and a Paleotemperature Scale. *The Journal of Chemical Physics*. 18(6): 849-857.

Melezhik, V.A., et al. 2001. Palaeoproterozoic magnesite: lithological and isotopic evidence for playa/sabkha environments. *Sedimentology*. 48: 379-397.

Mihalcea, R.M., et al. 1998. Diode-laser absorption measurements of $CO_2$ near 2.0 μm at elevated temperatures. *Applied Optics*. 37(36): 8341-8347.

Miljevic, N., et al. 2007. Potential Use of Environmental Isotopes in Pollutant Migration Studies. *Environmental Isotopes in Pollutant Studies*. 58: 251-262.

Mook, W.G., et al. 1968. Isotopic Equilibrium between Shells and Their Environment. *Science*. 159(3817): 874-875.

Mook, W.G., et al. 1974. Carbon Isotope Fractionation Between Dissolved Bicarbonate and Gaseous Carbon Dioxide. 22:169-176.

O'Neil, J.R., et al. 1971. C13 and O18 compositions in some freshwater carbonates associated with ultramafic rocks and serpentines: western United States. *Geochimica et Cosmochimica Acta*. 35: 687-697.

Philp, R.P. 2007. The emergence of stable isotopes in environmental and forensic geochemistry studies: a review. *Environ Chem Lett*. 5:57-66.

Power, I.M., et al. 2007. Biologically induced mineralization of dypingite by cyanobacteria from an alkaline wetland near Atlin, British Columbia, Canada.*Geochemical Transactions*. 8: 16 pages.

Saad, N. et al. 2009. Measurement of Isotopic $CO_2$ in Dissolved Inorganic Carbons of Water Samples from Various Origins Using Wavelength-Scanned Cavity Ring-Down Spectrophotometer. *Geophysical Research Abstracts*. 11. (abstract only).

Schouten, S., et al. 2004. Stable Carbon Isotopic Fractionations Associated with Inorganic Carbon Fixation by Anaerobic Ammonium-Oxidizing Bacteria. *Applied and Environmental Microbiology*. 70(6): 3785-3788.

Schroll, E. 2002. Genesis of magnesite deposits in the view of isotope geochemistry. *Boletim Paranaense de Geociencias*. 50: 59-68.

Sheppard, S.M.F., et al. 1970. Fractionation of Carbon and Oxygen Isotopes and Magnesium between Coexisting Metamorphic Calcite and Dolomite. *Contr. Mineral. And Petrol*. 26. 161-198.

Sial, A.N., et al. 2000. Carbon isotope fluctuations in Precambrian carbonate sequences of several localities in Brazil. *An. Acad. Bras. Ci*. 72(4): 539-558.

Vagin, S.P., et al. 1979. Measurement of the Temperature of Gas Media Containing Carbon Dioxide by the Laser-Probing Method. *Plenum*.

Webber, M.E., et al. 2001. In situ combustion measurements of $CO_2$ by use of a distributed-feedback diode-laser sensor near 2.0 μm. *Applied Optics*. 40(6): 821-828.

Wilson, S.A., et al. 2009. Carbon Dioxide Fixation within Mine Wastes of Ultramafic-Hosted Ore Deposits: Examples from the Clinton Creek and Cassiar Chrysotile Deposits, Canada. *Society of Economic Geologists, Inc*. 104: 95-112.

Zedef, V., et al. 2000. Genesis of Vein Stockwork and Sedimentary Magnesite and Hydromagnesite Deposits in the Ultramafic Terranes of Southwestern Turkey: A Stable Isotope Study. 95: 429-446.

International Search Report dated Oct. 30, 2009 of PCT/US09/056573.

"Electrochemical cell", Wikipedia (2009), http:en.wikipedia.org/wiki/Electrochemical_Cell, Nov. 24, 2009, 5 pp.

International Search Report dated Dec. 14, 2009 of PCT/US09/061748.

U.S. Appl. No. 60/921,958, filed Apr. 3, 2007, Little et al.

Avery, G.B. et al. 2006. Carbon isotopic characterization of dissolved organic carbon in rainwater: Terrestrial and marine influences. Science Direct. 40(39): 7539-7545. Retrieved from the internet on May 20, 2010.

Dickens, A. et al. 2004. Reburial of fossil organic carbon in marine sediments. *Nature*. 427: 336-339. Retrieved from the internet on May 20, 2010.

Faure, et al. 1963. The Isotopic Composition of Strontium in Oceanic and Continental Basalts: Application to the Origin of Igneous Rocks. *Journal of Petrology*. 4(1): 31-50. (abstract only). Http://petrology.oxfordjournals.org/cgi/content/abstract/4/1/31 (retrieved on Jun. 1, 2010).

International Search Report dated Jul. 7, 2010 of PCT/US10/026880.
International Search Report dated Jul. 9, 2010 of PCT/US10/025970.
International Search Report dated May 6, 2010 of EP09716193.9.
International Search Report dated Jun. 22, 2010 of EP08772151.0.
International Search Report dated May 21, 2010 of PCT/US09/064117.

"Isotopic Signature", Wikipedia (2010), http://en.wikipedia.org/wiki/Isotopic_signature, Apr. 14, 2009, 3 pp.

Mottana, A. et al. 1979. Der grosse Mineralienfuhrer, BLV Verlagsgesel lschaft mbH, Munchen, XP002577921, p. 194. (In German with English Translation).

Noda, H., et al. 1990. Electrochemical Reduction of Carbon Dioxide at Various Metal Electrodes in Aqueous Potassium Hydrogen Carbonate Solution. *The Chemical Society of Japan*. 63: 2459-2462.

Portier et al. 2005. Modelling $CO_2$ solubility in pure water and NaCl-type waters from 0 to 300 °C and from 1 to 300 bar Application to the Utsira Formation at Sleipner. *Chemical Geology*. 217: 187-199.

Quay, P.D., et al. 1992. Oceanic Uptake of Fossil Fuel $CO$_2$: Carbon-13 Evidence. *Science*. 256 (5053): 74-79.

Schwab, E. 2004. Calciumhydroxid, XP-002577920. Retrieved from the Internet: <URL:http://www.roempp.com/prod/index1.html> (In German with English Translation).

U.S. Appl. No. 12/344,019, filed Dec. 24, 2008, Constantz, Brent R., et al, Non-Final Office Action dated Jul. 14, 2010.

U.S. Appl. No. 12/475,378, filed May 29, 2009, Constantz Brent. et al, Final Office Action dated May 5, 2010.

U.S. Appl. No. 12/486,692, filed Jun. 17, 2009, Constantz Brent. et al, Final Office Action dated May 3, 2010.

U.S. Appl. No. 12/557,492, filed Sep. 10, 2009, Constantz, Brent R., et al. Non-Final Office Action dated May 6, 2010.

U.S. Appl. No. 12/604,383, filed Oct. 22, 2009, Constantz Brent R. et al, Non-Final Office Action dated Apr. 5, 2010.

U.S. Appl. No. 12/604,383, filed Oct. 22, 2009, Constantz Brent R. et al, Final Office Action dated Jun. 11, 2010.

U.S. Appl. No. 12/571,398 filed, Sep. 30, 2009, Constantz Brent R. et al, Non-Final Office Action dated May 3, 2010.

U.S. Appl. No. 12/609,491, filed Oct. 30, 2009, Constantz Brent. et al, Non-Final Office Action dated Mar. 31, 2010.

Aker, "Aker Clean Carbon, Carbon Capture Solutions Provider" Aker Clean Carbon Presentation for UN's IPCC; Jan. 24, 2008; 8pp.

Alexander, G. et al., "Evaluation of reaction variables in the dissolution of serpentine for mineral carbonation"; Elsevier; ScienceDirect Fuel 86 (2007) 273-281.

Back, M. et al.,"Reactivity of Alkaline Lignite Fly Ashes Towards CO in Water." Environmental Science & Technology. vol. 42, No. 12 (2008) pp. 4520-4526.

Berg et al., "A 3-Hydroxyproprionate/ 4-Hydroxybutyrate Autotrophic Carbon Dioxide Assimilation Pathway in Archea"; Science 14, Dec. 2007; vol. 318, No. 5857 DOI 10.1126/science 1149976; pp. 1782-1786.

"Biomass Burning: A Hot Issue in Global Change." National Aeronautics and Space Administration. Langley Research Center, Hampton, Virginia. Fact Sheet FS-2001-02-56- LaRC. Feb. 2001. 4 pages.

Bond, G.M., et al. 2001. CO2 Capture from Coal-Fired Utility Generation Plant Exhausts, and Sequestration by a Biomimetic Route Based on Enzymatic Catalysis—Current Status (paper presented at the First National Conference on Carbon Sequestration, May 14-17, in Washington D.C., USA; Paper Sa.5.

Bond, G.M., et al. 2002. Brines as possible cation sources for biomimetic carbon dioxide sequestration. *American Geophysical Union Abstract* #U22A-07.

Cannell, M.G.R. 2003. "Carbon sequestration and biomass energy offset: theoretical, potential and achievable capacities globally, in Europe and the UK." Biomass and Bioenergy. 24: 97-116.

Ciccs "Aims and Research"; www.nottingham.ac.uk/carbonmanagement/ccs_aims.php 2pp Aug. 3, 2007.

Druckenmiller et al., "Carbon sequestration using brine of adjusted pH to form mineral carbonates"; Elsevier; www.elsevier.com/locate/fuproc; Fuel Processing Technology 86 (2005) 1599-1614.

Faverjon, F. et al. 2005. Electrochemical study of a hydrogen diffusion anode-membrane assembly for membrane electrolysis. *Electrochimica Acta* 51 (3): 386-394.

Faverjon, F. et al. 2006. Regeneration of hydrochloric acid and sodium hydroxide from purified sodium chloride by membrane electrolysis using a hydrogen diffusion anode-membrane assembly. Journal of Membrane Science 284 (1-2): 323-330.

Gain, E. et al. 2002. Ammonium nitrate wastewater treatment by coupled membrane electrolysis and electrodialysis. *Journal of Applied Electrochemistry* 32: 969-975.

Genders, D. 1995. Electrochemical Salt Splitting. http://www.electrosynthesis.com/news/mwatts.html (accessed Feb. 5, 2009).

Goldberg et al., "CO2 Mineral Sequestration Studies in US"; National Energy Technology Laboratory; goldberg@netl.doe.gov; 10pp (2001).

Graff "Just Catch—CO2 Capture Technology" Aker Kvaerner; Pareto Clean Energy Tech Seminar Oct. 11, 2007 25pp.

Green Car Congress "PKU Researchers Carry Out Aqueous Fischer-Tropsch Reaction for First Time"; Dec. 12, 2007. www.greeencarcongress.com/2007/12/pku-researchers.html; Dec. 12, 2007; 2pp.

Green Car Congress "Researchers Develop New Method for Ocean Sequestration of Carbon Dioxide Through Accelerated Weathering f Volcanic Rocks"; www.greeencarcongress.com/2007/11/researchers-dev.html#more; Nov. 7, 2007; 3pp.

Haywood et al., "Carbon dioxide sequestration as stable carbonate minerals—environmental barriers"; Environmental Geology (2001) 41:11-16; Springer-Verlag 2001.

Hill et al., "Preliminary Investigation of Carbon Sequestration Potential in Brine from Pennsylvania's Oriskany Sandstone Formation in Indiana County, PA"; The Energy Institute and the Department of Energy & Geo-Environmental Engineering; 5pp.

Holze, S. et al. 1994. Hydrogen Consuming Anodes for Energy Saving in Sodium Sulphate Electrolysis. *Chem. Eng. Technol.* 17: 382-389.

Huijgen, W.J.J., et al. 2003. Carbon dioxide sequestration by mineral carbonation. ECN-C-03-016; Energy Research Centre of the Netherlands: Petten; pp. 1-42.

Huijgen, W.J.J., et al. 2005. Carbon dioxide sequestration by mineral carbonation: Literature review update 2003-2004, ECN-C-05-022; Energy Research Centre of the Netherlands: Petten; pp. 1-37.

Huntzinger, D.N. et al.,"Carbon Dioxide Sequestration in Cement Kiln Dust through Mineral Carbonation"; Environmental Science & Technology, vol. 43, No. 6 (2009) pp. 1986-1992.

International Search Report dated Sep. 17, 2008 of PCT/US2008/068564.

International Search Report dated Feb. 19, 2009 of PCT/US08/88242.

International Search Report dated Mar. 11, 2009 of PCT/US2008/088318.

International Search Report dated Mar. 11, 2009 of PCT/2008/088246.

International Search Report dated Aug. 5, 2009 of PCT/2009/048511.

International Search Report dated Sep. 8, 2009 of PCT/US2009/045722.

International Search Report dated Sep. 17, 2009 of PCT/US2009/050756.

International Search Report dated Sep. 22, 2009 of PCT/US2009/047711.

International Search Report dated Oct. 19, 2009 of PCT/US2009/050223.

Justnes, H. et al. "Pozzolanic, Amorphous Silica Produced from the Mineral Olivine." Proceedings of the Seventh CANMET/ACI International Conference on Fly Ash, Silica Fume, Slag and Natural Pozzolans in Concrete, 2001. SP-199-44. pp. 769-781.

Kohlmann et al., "Carbon Dioxide Emission Control by Mineral Carbonation: The Option for Finland"; INFUB 6th European Conference on Industrial Furnaces and Boilers Estoril Lisbon Portugal, Apr. 2-5, 2002 10pp.

Lackner, K. "Carbonate Chemistry for Sequestering Fossil Carbon"; Annual Review Energy Environ. 2002 27:193-232.

Lackner, K.S. et al. "Carbon Dioxide Disposal in Carbonate Minerals." Energy. 1995. 20(11): 1153-1170.

Levy, D. "Burnt biomass causes short-term global cooling, long-term warming." http://news-service.stanford.edu/news/2004/august4/biomass-84.html. 3 pages.

Montes-Hernandez, G. et al.,"Mineral sequestration of CO2 by aqueous carbonation of coal combustion fly-ash." Journal of Hazardous Materials vol. 161 (2009). pp. 1347-1354.

Nayak, V.S. "Nonelectrolytic Production of Caustic Soda and Hydrochloric Acid from Sodium Chloride"; Ind. Eng. Chem. Res. 1996. 35: 3808-3811.

O'Connor et al., "Carbon Dioxide Sequestration by Direct Mineral Carbonation: Results From Recent Studies and Current Status"; Albany Research Center, Albany Oregon; Office of Fossil Energy, US Dept. of Energy; 1st Annual DOE Carbon Sequestration Conference, Washington DC, May 2001 12pp.

O'Connor, W.K. et al. "Carbon dioxide sequestration: Aqueous mineral carbonation studies using olivine and serpentine." 2001. Albany Research Center, National Energy Technology Laboratory: Mineral Carbonation Workshop, Pittsburgh, PA.

Park, A., et al. 2004. CO2 mineral sequestration: physically activated dissolution of serpentine and pH swing process. *Chemical Engineering Science* 59 (22-23): 5241-5247.

Rahardianto et al., High recovery membrane desalting of low-salinity brackish water: Integration of accelerated precipitation softening with membrane RO; Science Direct; Journal of Membrane Science 289 (2007) 123-137.

Rakib, M. et al. 1999. Behaviour of Nafion® 350 membrane in sodium sulfate electrochemical splitting: continuous process modelling and pilot scale tests. Journal of Applied Electrochemistry. 29: 1439-1448.

Rau, G. 2004. Possible use of Fe/CO2 fuel cells for CO2 mitigation plus H2 and electricity production. *Energy Conversion and Management*. 45: 2143-2152.

Raz et al., "Formation of High-Magnesium Calcites via an Amorphous Precursor Phase: Possible Biological Implications"; Advanced Materials; Adv. Mater. (2000) vol. 12, No. 1; 5pp.

Rosenthal, E., "Cement Industry is at Center of Climate Change Debate" New York Times; www.nytimes.com/2007/10/26/business/worldbusiness/26cement.html"ref=todayspaper; 4pp.

Sadhwani et al., "Case Studies on environmental impact of seawater desalination" Science Direct; http://www.sciencedirect.com/science?_ob=ArticleURL&_udi=B6TFX-4HMX97J-3&_u... 3pp; Desalination 185 (2005) 1-8.

Serizawa et al., "Cell-compatible properties of calcium carbonates and hydroxyapatite deposited on ultrathin poly (vinyl alcohol)-coated polyethylene films"; J. Biomater. Sci. Polymer Edn., vol. 14, No. 7 (2003) pp. 653-663.

Shell Global Solutions, "ADIP-X and Sulfinol-X—new regenerable acid-gas removal processes"; Shell Global Solutions International; OG 130210370903-En(A); www.shellglobalsoultions.com 2 pp.

Tececo Pty Ltd, "Eco-Cement"; www.tececo.com/simple.eco-cement.php; Dec. 29, 2008; 6pp.

Turner, J.A. 1999. "A Realizable Renewable Energy Future." Science. 285 (5428): 687-689.

Uibu, M. et al. "CO2 mineral sequestration in oil-shale wastes from Estonian power production." Journal of Environmental Management vol. 90 (2009). pp. 1253-1260.

Uibu, M. et al.,"Mineral trapping of CO2 via oil shale ash aqueous carbonation: controlling mechanism of process rate and development of continuous-flow reactor system." Oil Shale. vol. 26, No. 1 (2009) pp. 40-58.

Uliasz-Bochenczyk, A. et al. "Utilization of Carbon Dioxide in Fly Ash and Water Mixtures." Chemical Engineering Research and Design. 2006. 84(A9): 843-846.

U.S. Appl. No. 12/375,632, filed Mar. 5, 2009, Kirk, Donald W. et al, Non-Final Office Action dated Sep. 8, 2009.

Wright, L.L., et al. 1993. "U.S. Carbon Offset Potential Using Biomass Energy Systems." Water, Air, and Soil Pollution. 70: 483-497.

Green Car Congress "Researcher Proposes System for Capture of Mobile Source CO2 Emissions Directly from Atmosphere"; www.greeencarcongress.com/2007/10/researcher-prop.html#more; Oct. 8, 2007; 4pp.

Mazrou, S., et al. 1997. Sodium hydroxide and hydrochloric acid generation from sodium chloride and rock salt by electro-electrodialysis. *Journal of Applied Electrochemistry* 27: 558-567.

\* cited by examiner

Figure 1. Theoretical Carbon Sequestration Process

COMPOSITIONS AND METHODS USING SUBSTANCES CONTAINING CARBON

CROSS-REFERENCE

This application claims priority to the following copending patent application: U.S. Provisional Patent Application Ser. No. 61/101,629, titled "Methods of Producing Carbon Sequestration Tradable Commodities, and Systems for Transferring the Same," filed 30 Sep. 2008; U.S. Provisional Patent Application Serial No. 61/181,250, titled "Compositions and Methods Using Substances with Negative delta 13C Values," filed 26 May 2009; U.S. Provisional Patent Application Ser. No. 61/117,541, titled "Methods of Producing Carbon Sequestration Tradable Commodities, and Systems for Transferring the Same," filed 24 Nov. 2008; U.S. Provisional Patent Application Ser. No. 61/219,310, titled "Compositions and Methods Using Substances with Negative delta 13C Values," filed 22 Jun. 2009; U.S. Provisional Patent Application Ser. No. 61/232,401, titled, "Carbon Capture and Storage," filed 7 Aug. 2009; U.S. Provisional Patent Application Ser. No. 61/239,429, titled, "Apparatus, Systems, and Methods of Treating Industrial Waste Gases," filed 2 Sep. 2009; U.S. Provisional Patent Application Ser. No. 61/230,042, titled, "Apparatus, Systems, and Methods of Treating Industrial Waste Gases," filed 30 Jul. 2009; U.S. Provisional Patent Application Ser. No. 61/178,475, titled, "Apparatus, Systems, and Methods of Treating Industrial Waste Gases," filed 14 May 2009; U.S. Provisional Patent Application Ser. No. 61/170,086, titled, "Apparatus, Systems, and Methods of Treating Industrial Waste Gases," filed 16 Apr. 2009; U.S. Provisional Patent Application Ser. No. 61/168,166, titled, "Apparatus, Systems, and Methods of Treating Industrial Waste Gases," filed 9 Apr. 2009; U.S. Provisional Patent Application Ser. No. 61/158,992, titled, "Apparatus, Systems, and Methods of Treating Industrial Waste Gases," filed 10 Mar. 2009; U.S. Provisional Patent Application Ser. No. 61/101,631, titled, "$CO_2$ Sequestration," filed 30 Sep. 2008; U.S. Provisional Patent Application Ser. No. 61/101,626, titled, "High Yield $CO_2$ Sequestration Product Production," filed 30 Sep. 2008; and is a continuation in part of the following copending applications: U.S. patent application Ser. No. 12/557,492, titled, "$CO_2$ Commodity Trading System and Method," filed on 10 Sep. 2009; U.S. patent application Ser. No. 12/475,378, titled, "Rocks and Aggregate, and Methods of Making and Using the Same," filed 29 May 2009 now U.S. Pat. No. 7,753,618; U.S. patent application Ser. No. 12/344,019, titled, "Methods of Sequestering $CO_2$," filed 24 Dec. 2008 now U.S. Pat. No. 7,887,694; U.S. patent application Ser. No. 12/501,217, titled, "Production of Carbonate-Containing Compositions from Material Comprising Metal Silicates," filed 10 Jul. 2009 now U.S. Pat. No. 7,749,476; and U.S. patent application Ser. No. 12/486,692, titled, "Methods and Systems for Utilizing Waste Sources of Metal Oxides," filed 17 Jun. 2009 now U.S. Pat. No. 7,754,169; all of which are incorporated herein by reference.

BACKGROUND OF THE INVENTION

Relative isotope composition values, e.g., relative carbon isotope composition values ($\delta^{13}C$ values) can be used in a variety of ways to verify the origins of materials in a composition. Other substances within the composition may also be used to verify the origin of the material. Such techniques are useful in, e.g., confirming that a given composition contains substances sequestered from a particular source, e.g., fossil fuels, and such compositions may have a premium value.

SUMMARY OF THE INVENTION

In some embodiments, the invention provides a composition that includes carbonates, bicarbonates, or a combination thereof, wherein the carbon in the composition has a relative carbon isotope composition ($\delta^{13}C$) value less than −26.10%. In some embodiments, the invention provides a composition in which the composition is a synthetic composition. In some embodiments, the invention provides a composition in which the carbonates, bicarbonate, or combination of carbonates and bicarbonates make up at least 50% of the composition. In some embodiments, the invention provides a composition in which the composition has a mass of greater than 100 kg. In some embodiments, the invention provides a composition in which the $CO_2$ content of the composition is at least 10%. In some embodiments, the invention provides a composition in which the composition has a negative carbon footprint. In some embodiments, the invention provides a composition that further includes boron, sulfur, or nitrogen in which the relative isotopic composition of the boron, sulfur, or nitrogen is indicative of a fossil fuel origin. In some embodiments, the invention provides for a composition in which the carbonates, bicarbonates or combination of carbonates and bicarbonates include calcium, magnesium or a combination of calcium and magnesium. In some embodiments, the invention provides a composition in which the calcium to magnesium (Ca/Mg) molar ratio is between 1/200 and 200/1. In some embodiments, the invention provides a composition in which the calcium to magnesium (Ca/Mg) molar ratio is between 12/1 to 1/15. In some embodiments, the invention provides a composition in which the calcium to magnesium (Ca/Mg) molar ratio is between 5/1 to 1/10. In some embodiments, the invention provides a composition that further includes SOx or a derivative of SOx. In some embodiments, the invention provides a composition in which the composition includes a SOx derivative and in which the SOx derivative is a sulfite, a sulfate, or a combination thereof. In some embodiments, the invention provides a composition that further includes a metal. In some embodiments, the invention provides a composition that includes a metal in which the metal includes lead, arsenic, mercury, or cadmium, or a combination thereof.

In some embodiments, the invention provides a building material that includes carbonates, bicarbonates, or a combination thereof, in which the carbon in the carbonates, bicarbonates or combination thereof has a relative carbon isotope composition ($\delta^{13}C$) value less than −10.00%. In some embodiments, the invention provides a building material in which the component that includes carbonates, bicarbonates, or combination thereof is carbon-neutral or carbon negative. In some embodiments, the invention provides a building material in which the component that includes carbonates, bicarbonates, or combination thereof is synthetic. In some embodiments, the invention provides a building material of in which the carbonates, bicarbonates, or combination thereof make up at least 50% of the component that includes carbonates, bicarbonates, or combination thereof. In some embodiments, the invention provides a building material in which the $CO_2$ content of the component that includes carbonates, bicarbonates, or combination thereof is at least 10%. In some embodiments, the invention provides a building material that further includes boron, sulfur, or nitrogen in which the relative isotopic composition of the boron, sulfur, or nitrogen is indicative of a fossil fuel origin. In some embodiments, the invention provides a building material in which the carbonates, bicarbonates, or combination thereof include calcium, magnesium or a combination of calcium and magnesium. In some embodiments, the invention provides a building material in which the calcium to magnesium (Ca/Mg) molar ratio is between 1/200 and 200/1. In some embodiments, the invention provides a building material in which the calcium to magnesium (Ca/Mg) molar ratio is between 12/1 to 1/15. In some embodiments, the invention provides a building material in which the component that includes carbonates, bicarbonates, or combination thereof constitutes at least 20% of the building material. In some embodiments, the invention provides a building material in which the building material is a cementitious material. In some embodiments, the invention provides a cementitious building material in which the building material is cement or concrete. In some embodiments, the invention provides a building material in which the building material is a non-cementitious material. In some embodiments, the invention provides a building material wherein the building material is an aggregate. In some embodiments, the invention provides a building material in which the building material is a roadway material. In some embodiments, the invention provides a building material in which the building material is a brick, a board, a conduit, a beam, a basin, a column, a tile, a fiber siding product, a slab, an acoustic barrier, plaster, dry-wall, stucco, a soil stabilization composition, or insulation or combinations thereof. In some embodiments, the invention provides a building material in which the component that includes carbonates, bicarbonates, or combination thereof further includes SOx or a derivative thereof. In some embodiments, the invention provides a building material in which the component that includes carbonates, bicarbonates, or combination thereof and includes SOx or a derivative thereof includes a sulfate, a sulfite, or a combination thereof as a derivative of SOx. In some embodiments, the invention provides a building material in which the component comprising carbonates, bicarbonates, or combination thereof further includes a metal. In some embodiments, the invention provides a building material that includes a metal in which the metal includes lead, arsenic, mercury or cadmium of combinations thereof.

In some embodiments, the invention provides a flowable composition that includes carbonates, bicarbonates or a combination of carbonates and bicarbonates, in which the carbon in the carbonates, bicarbonates or combination of carbonates and bicarbonates has a relative carbon isotope composition ($\delta^{13}C$) value less than −5.00‰, and the viscosity of the composition is between 1 and 2000 cP. In some embodiments, the invention provides a flowable composition in which the viscosity if between 10 and 1000 cP. In some embodiments, the invention provides a flowable composition in which the composition is a synthetic composition. In some embodiments, the invention provides a flowable composition in which the carbonates, bicarbonates, or combination thereof make up at least 10% w/w of the composition. In some embodiments, the invention provides a flowable composition in which the $CO_2$ content of the composition of at least 10%. In some embodiments, the invention provides a flowable composition in which the composition has a negative carbon footprint. In some embodiments, the invention provides a flowable composition that further includes boron, sulfur, or nitrogen in which the relative isotopic composition of the boron, sulfur, or nitrogen is indicative of a fossil fuel origin. In some embodiments, the invention provides a flowable composition in which the carbonates, bicarbonates, or combination thereof include calcium, magnesium or a combination thereof. In some embodiments, the invention provides a flowable composition in which the calcium to magnesium (Ca/Mg) molar ratio is between 1/200 and 200/1. In some embodiments, the invention provides a flowable composition in which the calcium to magnesium (Ca/Mg) molar ratio is between 12/1 to 1/15. In some embodiments, the invention provides a flowable composition in which the calcium to magnesium (Ca/Mg) molar ratio is between 5/1 to 1/10. In some embodiments, the invention provides a flowable composition that further includes SOx or a derivative thereof. In some embodiments, the invention provides a flowable composition that further includes a metal. In some embodiments, the invention provides a flowable composition that includes a metal in which the metal includes lead, arsenic, mercury, or cadmium of a combination thereof.

In some embodiments, the invention provides a synthetic composition that includes carbonates, bicarbonates, or a combination of carbonates and bicarbonates, in which the carbon in the composition has a relative carbon isotope composition ($\delta^{13}C$) value less than −5.00‰ and the composition is carbon negative. In some embodiments, the invention provides a synthetic composition in which the carbonates, bicarbonates, or combination thereof make up at least 50% of the composition. In some embodiments, the invention provides a synthetic composition in which the composition has a mass of greater than 100 kg. In some embodiments, the invention provides a synthetic composition in which the $CO_2$ content of the composition is at least 10%. In some embodiments, the invention provides a synthetic composition that further includes boron, sulfur, or nitrogen in which the relative isotopic composition of the boron, sulfur or nitrogen is indicative of a fossil fuel origin. In some embodiments, the invention provides a synthetic composition in which the carbonate, bicarbonates, or combination thereof include calcium, magnesium or a combination thereof. In some embodiments, the invention provides a synthetic composition in which the calcium to magnesium (Ca/Mg) molar ratio is between 1/200 and 200/1. In some embodiments, the invention provides a synthetic composition in which the calcium to magnesium (Ca/Mg) molar ratio is between 12/1 to 1/15. In some embodiments, the invention provides a synthetic composition in which the calcium to magnesium (Ca/Mg) molar ratio is between 5/1 to 1/10. In some embodiments, the invention provides a synthetic composition that further includes SOx or a derivative thereof. In some embodiments, the invention provides a synthetic composition that further includes a metal. In some embodiments, the invention provides a synthetic composition that further includes a metal in which the metal includes lead, arsenic, mercury, or cadmium or a combination thereof.

In some embodiments, the invention provides a method of characterizing a synthetic composition that includes determining a relative carbon isotope composition ($\delta^{13}C$) value for the composition. In some embodiments, the invention provides a method of characterizing a synthetic composition in which the composition is a building material, or a material for underground storage. In some embodiments, the invention provides a method of characterizing a synthetic composition in which the composition is a cementitious composition, or an aggregate. In some embodiments, the invention provides a method of characterizing a synthetic composition in which the composition is a composition for storage of $CO_2$. In some embodiments, the invention provides a method of characterizing a synthetic composition that further includes determining the stability of the composition for release of $CO_2$. In some embodiments, the invention provides a method of characterizing a synthetic composition that further includes measuring the carbon content for the composition. In some embodiments, the invention provides a method of characterizing a synthetic composition that further includes comparing the $\delta^{13}C$ value of the composition to another $\delta^{13}C$ value. In some embodiments, the invention provides a method of characterizing a synthetic composition that further includes comparing the $\delta^{13}C$ value of the composition to another $\delta^{13}C$ value, in which the other $\delta^{13}C$ value is a reference $\delta^{13}C$ value. In some embodiments, the invention provides a method of characterizing a synthetic composition that further includes comparing the $\delta^{13}C$ value of the composition to another $\delta^{13}C$ value, in which the other $\delta^{13}C$ value is a value for a possible raw material for the composition. In some embodiments, the invention provides a method of characterizing a synthetic composition that further includes comparing the $\delta^{13}C$ value of the composition to another $\delta^{13}C$ value, in which the other $\delta^{13}C$ value is a value for a fossil fuel, a flue gas derived from the fossil fuel, a water source, or a combination thereof. In some embodiments, the invention provides a method of characterizing a synthetic composition that further includes determining whether the composition includes sequestered $CO_2$ from a fossil fuel source based on the comparison of the $\delta^{13}C$ value of the composition to a reference $\delta^{13}C$ value. In some embodiments, the invention provides a method of characterizing a synthetic composition that further includes quantifying the amount of carbon dioxide sequestered in the composition.

In some embodiments, the invention provides a method of fingerprinting a composition that includes determining the values for stable isotopes of a plurality of elements, or the values for the ratios of stable isotopes of a plurality of elements in the composition to determine an isotopic fingerprint for the composition, in which the composition includes carbonates, bicarbonates, or a combination of carbonates and bicarbonates. In some embodiments, the invention provides a method of fingerprinting a composition in which the stable isotopes include isotopes of carbon, sulfur, nitrogen or boron or combinations thereof. In some embodiments, the invention provides a method of fingerprinting a composition in which the composition is a building material or a material for underground storage. In some embodiments, the invention provides a method of fingerprinting a composition in which the composition is a composition for storing compounds of elements of at least two of the isotopes so determined. In some embodiments, the invention provides a method of fingerprinting a composition that further includes comparing at least two of the values for stable isotopes or at least two of the values for the ratios of stable isotopes, or a combination thereof. In some embodiments, the invention provides a method of fingerprinting a composition that further includes determining the probable source of one or more components of the composition based on the isotopic fingerprint of the material.

In some embodiments, the invention provides a method of determining whether or not a composition contains an element sequestered from a fossil fuel source; the method includes determining an isotopic value or ratio of isotopic values for the element, comparing the determined value with a reference isotopic value or ratio of isotopic values, and determining whether the composition contains an element sequestered from a fossil fuel source. In some embodiments, the invention provides a method of determining whether or not a composition contains an element sequestered from a fossil fuel source in which the element is carbon, sulfur, nitrogen, or boron. In some embodiments, the invention provides a method of determining whether or not a composition contains an element sequestered from a fossil fuel source in which the element is carbon and the comparison is a $\delta^{13}C$ value.

Provided is a synthetic composition with a neutral or negative carbon footprint comprising carbonates or bicarbonates or a combination thereof, where the carbon in the composition has a relative carbon isotope composition ($\delta^{13}C$) value of −5.00% or less.

Provided is a synthetic composition comprising carbonates or bicarbonates or a combination thereof, where the carbon in the composition has a relative carbon isotope composition ($\delta^{13}C$) value of −22.00% or less. In some embodiments, such compositions have neutral or negative carbon footprints. In some embodiments, the carbonates and/or bicarbonates comprise carbonates and/or bicarbonates of beryllium, magnesium, calcium, strontium, barium or radium or combinations thereof. In some embodiments, the carbonates and/or bicarbonates comprise carbonates and/or bicarbonates of calcium or magnesium or combinations thereof. In some embodiments, the composition contains calcium and magnesium and the calcium to magnesium (Ca/Mg) molar ratio is between 1/200 and 200/1. In some embodiments, the calcium to magnesium (Ca/Mg) molar ratio is between 12/1 to 1/15. In some embodiments, the calcium to magnesium (Ca/Mg) molar ratio is between 5/1 to 1/10. In some embodiments, the calcium to magnesium (Ca/Mg) molar ratio is between 1/9 to 2/5. In some embodiments, the composition further includes particulates from an industrial process. In such embodiments, the industrial process comprises the combustion of a fossil fuel. In such embodiments, the fossil fuel comprises coal. In some embodiments, the particulates from the industrial process comprise flyash. In some embodiments, the composition further comprises $NO_x$ or a derivative thereof. In some embodiments, the composition further comprises $SO_x$ or a derivative thereof. In some embodiments, the composition further comprises VOCs or a derivative thereof. In some embodiments, the composition further comprises a metal. In such embodiments, the metal comprises lead, arsenic, mercury or cadmium or combinations thereof.

Provided is a building material comprising a component comprising carbonates or bicarbonates or a combination thereof where the carbon in the carbonates and/or bicarbonates has a relative carbon isotope composition ($\delta^{13}C$) value less than −5.00%. In some embodiments, the component comprising carbonates and/or bicarbonates in the building material constitutes at least 5% of the building material. In some embodiments, the building material is a cementitious material. In some embodiments, the building material is a mortar, a pozzolanic material, or a supplementary cementitious material or combinations thereof. In some embodiments, the building material is cement or concrete. In some embodiment, the building material is non-cementitious. In some embodiments, the building material is aggregate. In some embodiments, the aggregate is coarse aggregate. In some embodiments, the aggregate is fine aggregate. In some embodiments, the aggregate is reactive aggregate. In some embodiments, the aggregate is non-reactive or inert aggregate. In some embodiments, the aggregate is formed or cast aggregate. In some embodiments, the building material is a roadway material. In some embodiments, the roadway material is a road base. In some embodiments, the roadway material is a paving material. In some embodiments, the material is a non-cementitious material and the non-cementitious building material is a brick, a board, a conduit, a beam, a basin, a column, a tile, a fiber siding product, a slab, an acoustic barrier, plaster, dry-wall, stucco, a soil stabilization composition, or insulation or combinations thereof. In some embodiments, the composition further includes particulates from an industrial process. In such embodiments, the industrial process comprises the combustion of a fossil fuel. In such embodiments, the fossil fuel comprises coal. In some embodiments, the particulates from the industrial process comprise flyash. In some embodiments, the composition further comprises $NO_x$ or a derivative thereof. In some embodiments, the composition further comprises $SO_x$ or a derivative thereof. In some embodiments, the composition further comprises VOCs or a derivative thereof. In some embodiments, the composition further comprises a metal. In such embodiments, the metal comprises lead, arsenic, mercury or cadmium or combinations thereof.

Provided is a non-building material comprising a component comprising carbonates or bicarbonates or a combination thereof where the carbon in the carbonates and/or bicarbonates has a relative carbon isotope composition ($\delta^{13}C$) value less than −5.00‰. In some embodiments, the component comprising carbonates and/or bicarbonates in the non-building material are carbon-neutral or carbon-negative. In some embodiments, the component comprising carbonates and/or bicarbonates in the non-building material constitutes more than 5% of the building material. In some embodiments, the non-building material is a household or commercial ceramic product, a paper product, a polymeric product, a lubricant, an adhesive, a rubber product, a chalk, a paint, a personal care product, a cleaning product, a personal hygiene product, a cosmetic, an ingestible product, a liquid ingestible product, a solid ingestible product, an animal ingestible product, an agricultural product, a soil amendment product, a pesticide, an environmental remediation product, a forest soil restoration product, or a product for neutralization of over acidified water.

Provided is a synthetic composition comprising carbonates or bicarbonates or a combination thereof where the carbon in the composition has a relative carbon isotope composition ($\delta^{13}C$) value less than −5.00‰ and the composition does not release more than 1% of its total $CO_2$ when exposed to normal conditions of temperature and moisture, and rainfall of normal pH, for at least 1 year. In some embodiments, the composition has a neutral or negative carbon footprint. In some embodiments, the composition is a solid precipitate. In some embodiments, the carbonates and/or bicarbonates comprise carbonates and/or bicarbonates of beryllium, magnesium, calcium, strontium, barium or radium or combinations thereof. In some embodiments, the carbonates and/or bicarbonates comprise carbonates and/or bicarbonates of calcium or magnesium or combinations thereof. In some embodiments, the composition contains calcium and magnesium and the calcium to magnesium (Ca/Mg) molar ratio is between 1/200 and 200/1. In some embodiments, the calcium to magnesium (Ca/Mg) molar ratio is between 12/1 to 1/15. In some embodiments, the calcium to magnesium (Ca/Mg) molar ratio is between 5/1 to 1/10. In some embodiments, the calcium to magnesium (Ca/Mg) molar ratio is between 1/9 to 2/5. In some embodiments, the composition further includes particulates from an industrial process. In such embodiments, the industrial process comprises the combustion of a fossil fuel. In such embodiments, the fossil fuel comprises coal. In some embodiments, the particulates from the industrial process comprise flyash. In some embodiments, the composition further comprises $NO_x$ or a derivative thereof. In some embodiments, the composition further comprises $SO_x$ or a derivative thereof. In some embodiments, the composition further comprises VOCs or a derivative thereof. In some embodiments, the composition further comprises a metal. In such embodiments, the metal comprises lead, arsenic, mercury or cadmium or combinations thereof.

Provided is a building material comprising a synthetic composition comprising carbonates or bicarbonates or a combination thereof where the carbon in the composition has a relative carbon isotope composition ($\delta^{13}C$) value less than −5.00‰ and the composition does not release more than 1% of its total $CO_2$ when exposed to normal conditions of temperature and moisture, and rainfall of normal pH, for at least 1 year. In some embodiments, the building material is carbon-neutral or carbon-negative. In some embodiments, the building material is a cementitious material. In some embodiments, the building material is cement or concrete. In some embodiments, the building material is a mortar, a pozzolanic material, or a supplementary cementitious material or combinations thereof. In some embodiment, the building material is non-cementitious. In some embodiments, the building material is aggregate. In some embodiments, the aggregate is coarse aggregate. In some embodiments, the aggregate is fine aggregate. In some embodiments, the aggregate is reactive aggregate. In some embodiments, the aggregate is non-reactive or inert aggregate. In some embodiments, the aggregate is formed or cast aggregate. In some embodiments, the building material is a roadway material. In some embodiments, the roadway material is a road base. In some embodiments, the roadway material is a paving material. In some embodiments, the material is a non-cementitious material and the non-cementitious building material is a brick, a board, a conduit, a beam, a basin, a column, a tile, a fiber siding product, a slab, an acoustic barrier, plaster, dry-wall, stucco, a soil stabilization composition, or insulation or combinations thereof.

Provided is a non-building material comprising a component comprising a synthetic composition comprising carbonates or bicarbonates or a combination thereof where the carbon in the composition has a relative carbon isotope composition ($\delta^{13}C$) value less than −5.00‰ and the composition does not release more than 1% of its total $CO_2$ when exposed to normal conditions of temperature and moisture, and rainfall of normal pH, for at least 1 year. In some embodiments, the carbonates and/or bicarbonates in the non-building material are carbon-neutral or carbon-negative. In some embodiments, at least 5% of the non-building material has a relative carbon isotope composition ($\delta^{13}C$) value less than −5.00‰ and the composition does not release more than 1% of its total $CO_2$ when exposed to normal conditions of temperature and moisture, and rainfall of normal pH, for at least 1 year.

Provided is a synthetic composition including, but not limited to, magnesium carbonate and/or bicarbonate where the carbon in the composition has a relative carbon isotope composition ($\delta^{13}C$) value less than −5.00‰ and the composition includes, but is not limited to, the mineral phases: magnesite, nesquehonite, hydromagnesite, huntite, magnesium calcite, dolomite, protodolomite or disordered dolomite or combinations thereof. In some embodiments, the composition does not release more than 1% of its total $CO_2$ when exposed to normal conditions of temperature and moisture, and rainfall of normal pH, for at least 1 year.

Provided is a synthetic composition including, but not limited to, magnesium carbonate and/or bicarbonate where the carbon in the composition has a relative carbon isotope composition ($\delta^{13}C$) value less than −5.00‰ and the composition is in the hydration state of 1, 2, 3, 4, 5, or 6 waters of hydration or combinations thereof. In some embodiments, the composition does not release more than 1% of its total $CO_2$ when exposed to normal conditions of temperature and moisture, and rainfall of normal pH, for at least 1 year.

Provided is a synthetic composition comprising calcium carbonate or bicarbonate or any combination thereof where the carbon in the composition has a relative carbon isotope composition ($\delta^{13}C$) value less than −5.00‰ and the composition includes, but is not limited to, the mineral phases amorphous calcium carbonate, calcite, aragonite, or vaterite or combinations thereof. In some embodiments, the composition does not release more than 1% of its total $CO_2$ when exposed to normal conditions of temperature and moisture, and rainfall of normal pH, for at least 1 year.

Provided is a synthetic composition comprising calcium carbonate or bicarbonate or any combination thereof where the carbon in the composition has a relative carbon isotope composition ($\delta^{13}C$) value less than −5.00‰ and the composition is in the hydration state of 1, 2, 3, or 4 waters of hydration or combinations thereof. In some embodiments, the composition does not release more than 1% of its total $CO_2$ when exposed to normal conditions of temperature and moisture, and rainfall of normal pH, for at least 1 year.

Provided is a method of producing at least 100 kilograms per day of carbon-containing material that has a relative carbon isotope composition ($\delta^{13}C$) value of less than −5.00‰ through carbon sequestration. In some embodiments, the product has a neutral or negative carbon footprint.

Provided is a method of characterizing a synthetic composition by determining a relative carbon isotope composition ($\delta^{13}C$) value for the composition. In some embodiments, the synthetic composition is a building material or a material for underground storage. In some embodiments, the synthetic composition is a cementitious composition or an aggregate. In some embodiments, the synthetic composition is a composition for storage of $CO_2$. In some embodiments, the method includes the step of determining the stability of the composition for release of $CO_2$. In some embodiments the methods includes the step of determining the carbon content of the composition. In some embodiments, the method includes the step of comparing the $\delta^{13}C$ value of the composition to another $\delta^{13}C$ value, in some cases the other $\delta^{13}C$ value is a standard $\delta^{13}C$ values, in other cases a $\delta^{13}C$ value for a possible raw material for producing the composition. In some cases, the other $\delta^{13}C$ value used for comparison is that of a raw material that could be a fossil fuel, flue gas derived from the fossil fuel, a water source or a combination thereof. In some embodiments, the method further comprises determining whether the composition comprises sequestered $CO_2$ from a fossil fuel source based upon comparing the $\delta^{13}C$ values. In some embodiments, the amount of carbon dioxide sequestered in the composition is quantified.

Provided is a method of fingerprinting a composition comprising determining the values for stable isotopes of a plurality of elements, or the values for the ratios of stable isotopes of a plurality of elements in the composition to determine an isotopic fingerprint for the composition. In some embodiments, the stable isotopes comprise isotopes of carbon, sulfur, nitrogen or boron or combinations thereof. In some embodiments, the composition is a building material or a material for underground storage. In some embodiments, the method includes the step of comparing at least two of the values for stable isotopes or at least two of the values for the ratios of stable isotopes, or a combination thereof. In some embodiments, the method includes the step of determining the probable source of one or more of the components of the composition based on the isotopic fingerprint of the material. In some embodiments, the probable source of one or more of the components is a fossil fuel.

Provided is a method of determining whether or not a composition contains an element sequestered from a fossil fuel source comprising determining an isotopic value or a ratio of isotopic values for the element. In some embodiments, the element is carbon, sulfur, nitrogen or boron. In some embodiments, the method further comprises the step of comparing the isotopic value or ratio of isotopic values to a standard value. In some embodiments, the element is carbon and the comparison is a $\delta^{13}C$ value.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
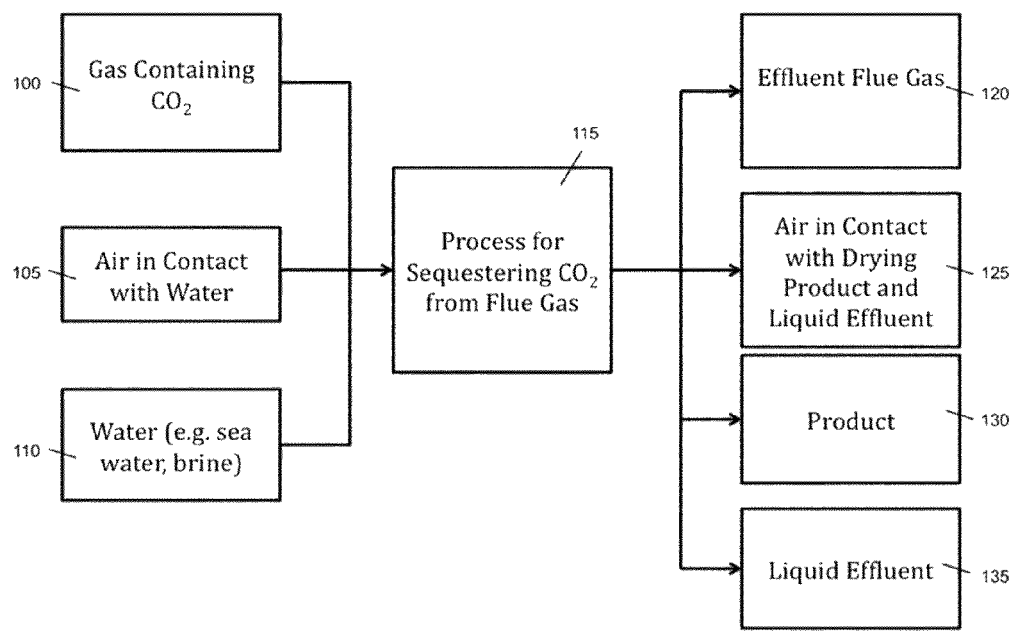
FIG. 1 provides an exemplary carbon sequestration process.

The invention provides compositions containing elements with certain relative element isotope composition value or values, and methods for determining the content of compositions in terms of the relative element isotopic value or values. In some embodiments, the invention provides compositions, e.g., synthetic compositions containing carbon with a negative relative carbon isotope composition ($\delta^{13}C$) value, and methods for analyzing carbon in a composition to determine $\delta^{13}C$ values, e.g., to verify that some or all of the carbon in the composition is from a carbon sequestration process. In some embodiments, other elements, such as sulfur, boron, or nitrogen, may be similarly present and/or characterized according to their isotopic content or isotopic ratios, and in addition other substances, such as sulfites, sulfates, or heavy metals, may also be present in the compositions and may be analyzed. The compositions and methods find use in applications where it is desired to use materials that are the product of sequestration of substances whose release into the environment is undesirable, such as carbon dioxide, sulfur oxides, nitrogen oxides, heavy metals, and other substances produced in, e.g., the burning of fossil fuels, and verifying the source of carbon and the like in such materials.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a," "an," and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Introduction

In further describing the subject of the invention, methods used to measure isotopic ratio values, e.g., $\delta^{13}C$ values and element content, e.g., carbon content, in compositions will be presented. Methods of tracking or verifying the origin of, e.g., carbon, in a composition will also be described. Then compositions containing elements with certain isotopic ratios, e.g., $\delta^{13}C$ values, will be described.

Method for Determining Relative Isotopic Values

In one aspect the invention provides methods of characterizing a composition by determining its relative isotope composition ratio value. Although various isotopes may be used, all of which have isotopic ratios that may be compared with standard ratios—e.g., carbon, oxygen, sulfur, boron, and nitrogen—the following description focuses primarily on carbon, and the relative carbon isotopic ratio, or $\delta^{13}C$ value. It will be understood that the discussion applies equally to other appropriate elements as well. In some embodiments, the elemental content, e.g., carbon content of the composition is determined as well. In some embodiments, the methods further include verifying that the composition contains carbon from $CO_2$ that is from a particular source, e.g., a fossil fuel source, such as by comparing the value determined for carbon content and relative carbon isotope composition ratio with a standard value, a raw material value, or the like. The composition may be a composition in which carbon, e.g., carbon dioxide, from a fossil fuel source is stored. In some cases it is desirable to use such a composition in, e.g., a structure or a roadway, in preference to other materials, in order to ensure the sequestration of carbon dioxide and, optionally, other undesirable substances, in the built environment. In some cases it is desirable to use such a composition, e.g., a slurry or solution, as a sequestration medium for the long-term storage of carbon dioxide and, optionally, other undesirable substances. Thus in some embodiments the methods further include determining the stability of the composition for carbon dioxide storage, e.g., determining the rate of release of carbon dioxide under set conditions.

In some embodiments, the methods include measuring the isotopic value, such as the relative isotope ratio value, for a plurality of elements, e.g., two or more of carbon, sulfur, nitrogen, oxygen, and boron, making it possible to isotopically "fingerprint" a particular composition.

The methods of the invention are useful, e.g., to verify that some or substantially all of the carbon and, in some cases, other elements, in a composition originated in a fossil fuel.

Stable Isotopes and Isotope Fractionation

Many elements have stable isotopes, and these isotopes may be preferentially used in various processes, e.g., biological processes. An example is carbon, which will be used to illustrate most of the methods described herein, however, it will be appreciated that these methods are also applicable to other elements with stable isotopes if their ratios can be measured in a similar fashion to carbon; such elements include nitrogen, oxygen, sulfur, and boron. Methods for measuring isotope ratios of these elements are well-known.

The relative carbon isotope composition ($\delta^{13}C$) value with units of ‰ (per mil) is a measure of the ratio of the concentration of two stable isotopes of carbon, namely $^{12}C$ and $^{13}C$, relative to a standard of fossilized belemnite (the PDB standard).

$$\delta^{13}C\ \text{\textperthousand} = [(^{13}C/^{12}C_{sample} - ^{13}C/^{13}C_{PDB\ standard})/(^{13}C/^{12}C_{PDB\ standard})] \times 1000$$

$^{12}C$ is preferentially taken up by plants during photosynthesis and in other biological processes that use inorganic carbon because of its lower mass. The lower mass of $^{12}C$ allows for kinetically limited reactions to proceed more efficiently than with $^{13}C$. Thus, materials that are derived from plant material, e.g., fossil fuels, have relative carbon isotope composition values that are less than those derived from inorganic sources. The carbon dioxide in flue gas produced from burning fossil fuels reflects the relative carbon isotope composition values of the organic material that was fossilized. Table 1 lists relative carbon isotope composition value ranges for relevant carbon sources for comparison.

Material incorporating carbon from burning fossil fuels reflects $\delta^{13}C$ values that are more like those of plant derived material, i.e. less, than that which incorporates carbon from atmospheric or non-plant marine sources. Verification that the material produced by a carbon dioxide sequestering process is composed of carbon from burning fossil fuels can include measuring the $\delta^{13}C$ value of the resultant material and confirming that it is not similar to the values for atmospheric carbon dioxide, nor marine sources of carbon.

TABLE 1

Relative carbon isotope composition ($\delta^{13}C$) values for carbon sources of interest.

| Carbon Source | $\delta^{13}C$ Range [‰] | $\delta^{13}C$ Average value [‰] |
|---|---|---|
| C3 Plants (most higher plants) | −23 to −33 | −27 |
| C4 Plants (most tropical and marsh plants) | −9 to −16 | −13 |
| Atmosphere | −6 to −7 | −6 |
| Marine Carbonate ($CO_3^{2-}$) | −2 to +2 | 0 |
| Marine Bicarbonate ($HCO_3^-$) | −3 to +1 | −1 |
| Coal from Yallourn Seam in Australia[1] | −27.1 to −23.2 | −25.5 |
| Coal from Dean Coal Bed in Kentucky, USA[2] | −24.47 to −25.14 | −24.805 |

[1]Holdgate, G. R. et al., Global and Planetary Change, 65 (2009) pp. 89-103.
[2]Elswick, E. R. et al., Applied Geochemistry, 22 (2007) pp. 2065-2077.

In some embodiments the invention provides a method of characterizing a composition comprising measuring its relative carbon isotope composition ($\delta^{13}C$) value. In some embodiments the composition is a composition that contains carbonates, e.g., magnesium and/or calcium carbonates. Any suitable method may be used for measuring the $\delta^{13}C$ value, such as mass spectrometry or off-axis integrated-cavity output spectroscopy (off-axis ICOS).

One difference between the carbon isotopes is in their mass. Any mass-discerning technique sensitive enough to measure the amounts of carbon can be used to find ratios of the $^{13}C$ to $^{12}C$ isotope concentrations. Mass spectrometry is commonly used to find $\delta^{13}C$ values. Commercially available are bench-top off-axis integrated-cavity output spectroscopy (off-axis ICOS) instruments that are able to determine $\delta^{13}C$ values as well. These values are obtained by the differences in the energies in the carbon-oxygen double bonds made by the $^{12}C$ and $^{13}C$ isotopes in carbon dioxide. The $\delta^{13}C$ value of a carbonate precipitate from a carbon sequestration process serves as a fingerprint for a $CO_2$ gas source, as the value will vary from source to source, but in most carbon sequestration cases $\delta^{13}C$ will generally be in a range of −9‰ to −35‰.

In some embodiments the methods include the measurement of the amount of carbon in the composition. Any suitable technique for the measurement of carbon may be used, such as coulometry. Carbon measurements may be used in some cases to quantitate the amount of carbon dioxide sequestered in a composition. Isotope measurements may be used to verify that the source of the carbon in a composition is what it is claimed to be.

A further feature of some embodiments of the invention includes comparing the $\delta^{13}C$ value for the composition with another $\delta^{13}C$ value; this other $\delta^{13}C$ value may be a standard value, a value for a possible raw material in the composition (e.g., coal, oil, natural gas, or flue gas), or any other value that gives useful information for the comparison. In some embodiments, the $\delta^{13}C$ value for the composition is compared to a fixed value or range of values, such as a value between −1‰ and −50‰, or between −5‰ and −40‰ or between −5‰ and −35‰, or between −7‰ and −40‰ or between −7‰ and −35‰ or between −9‰ and −40‰ or between −9‰ and −35‰, or a comparison to a value that is −3‰, −5‰, −6‰, −7‰, −8‰, −9‰, −10‰, −11‰, −12‰, −13‰, −14‰, −15‰, −16‰, −17‰, −18‰, −19‰, −20‰, −21‰, −22‰, −23‰, −24‰, −25‰, −26‰, −27‰, −28‰, −29‰, −30‰, −31‰, −32‰, −33‰, −34‰, −35‰, −36‰, −37‰, −38‰, −39‰, −40‰, −41‰, −42‰, −43‰, −44‰, or −45‰. In some embodiments, a value less than a fixed value is indicative that some or substantially all of the carbon in the composition is of fossil fuel origin, e.g. a value less than any of the values given herein, such as a value less than −7‰, or a value less than −10‰, or a value less than −15‰, or a value less than −20‰, or a value less than −25‰, or a value less than −30‰, or a value less than −35‰, a value less than −40‰.

In some embodiments, the $\delta^{13}C$ value for the composition is compared to a value for a possible raw material of the composition. For example, the $\delta^{13}C$ value for the composition may be compared to a $\delta^{13}C$ value, or a range of $\delta^{13}C$ values, for a fossil fuel, such as a natural gas, an oil, a coal or a particular type of coal, or such as a flue gas produced from burning a natural gas, an oil, a coal or a particular type of coal. This can be particularly useful in verifying that the composition contains $CO_2$ from the fossil fuel and/or from the burning of the fossil fuel. As an example only, if the $\delta^{13}C$ value for a coal is −34‰ and the $\delta^{13}C$ value for a composition that is claimed to have sequestered $CO_2$ from the burning of the coal is equal to or within a certain range of −34‰ (which can be any suitable range, depending on measurement conditions, variations in the coal, variations in the flue gas from the coal, etc., e.g., ±1‰, or ±2‰, or ±3‰, or ±4‰, ±5‰), this may be considered verification, in whole or in part, that the carbon in the composition originated in the fossil fuel. In the above example, if the acceptable range is ±3‰ and the composition has a $\delta^{13}C$ value of −32‰ then the $\delta^{13}C$ value would be considered consistent with an origin for the carbon in the composition from that particular coal. Other factors may be considered in the verification, as appropriate. In some embodiments the $\delta^{13}C$ value is the sole factor considered.

Some embodiments further involve quantifying the amount of $CO_2$ sequestered from a source of $CO_2$, e.g. a fossil fuel source, in a composition. For example, coulometry may be used to determine the relative amount of carbon in a composition, and isotopic ratio values may be used to verify that the carbon is wholly or partially of fossil fuel origin. It is then a simple calculation to determine the amount of $CO_2$ (or carbon) sequestered in the composition, given the relative amount of the carbon that is of fossil fuel origin and the total carbon.

Other embodiments of the invention include determining isotopic values or isotopic ratios compared to a standard that are similar to $\delta^{13}C$ values, for elements other than carbon, or in addition to carbon, in a composition. Such elements include, but are not limited to, oxygen, nitrogen, sulfur, and boron. The isotopic value for any such element, or combination of elements, may be measured by techniques similar to those used for carbon. Such techniques and methods of expressing isotopic ratios in comparison with a standard are well-known in the art, e.g., $\delta^{11}B$ values for boron and $\delta^{34}S$ values for sulfur. Thus in some embodiments the invention provides methods of isotopically fingerprinting a composition by determining a plurality of isotopic values or isotopic ratio values, or a combination thereof, for the composition. In some embodiments, the quantity of the element or its compounds in the composition is also determined. In some embodiments one or more of the isotopic components of the isotopic fingerprint is used in combination with quantitation of the element/compound represented by the isotope to determine the total amount of the element/compound in the composition that is of a particular origin, e.g., that is of fossil fuel origin. In addition, isotopic ratios may be altered during combustion and other processing of a fossil fuel (e.g., for boron and/or sulfur), and these alterations may be taken into account in some embodiments to further refine the verification and/or quantification analysis.

In some embodiments, the isotopic values or isotopic ratio values, or a combination thereof, are determined for two or more of carbon, sulfur, oxygen, nitrogen, and boron. In some embodiments an isotopic fingerprint for carbon and sulfur is determined, e.g., a $\delta^{13}C$ values for carbon and $\delta^{34}S$ value for sulfur. In some embodiments an isotopic fingerprint for carbon and boron is determined, e.g., a $\delta^{13}C$ values for carbon and $\delta^{11}B$ value for boron. In some embodiments an isotopic fingerprint for carbon, sulfur, and boron is determined, e.g., a $\delta^{13}C$ values for carbon, $\delta^{34}S$ value for sulfur, and $\delta^{11}B$ value for boron.

The isotopic fingerprint may be used to verify the source of the elements in the composition, e.g., in a protocol to verify that the composition contains elements of fossil fuel origin. This is useful because many of the elements, e.g. carbon and sulfur or their oxides or other compounds, are subject to regulation, such as cap and trade systems or other regulatory systems, in various parts of the world. Thus the techniques of the invention may be used, e.g., in such a system, to verify and/or quantitate capture of the elements and/or their compounds. This verification and/or quantitation can be used to confirm compliance with regulations, to calculate credits or penalties for sequestration of the elements or compounds, e.g., carbon dioxide, sulfur oxides, nitrogen oxides, and any other element or compound subject to regulation for which isotopic measurements may be performed, and for any other suitable use as will be apparent to those of skill in the art.

For example, to show that carbon dioxide sequestration occurs during a process, the total amount of carbon dioxide gas coming out of a process is shown to be less than the total amount of carbon dioxide gas entering the process; in addition the origin of the carbon dioxide in the exiting gas may be shown to be the same as that of the gas entering the process and/or a product of the process is show to have sequestered the $CO_2$ from the gas. "Fingerprinting" a material correlates the carbon, and/or other elements, contained in the material to a source by measuring and comparing the ratios of stable isotopes of carbon and/or other elements, such as nitrogen and sulfur. As users of materials seek to obtain carbon credits when using materials, this method will be useful to prove carbon dioxide sequestration and show a material to be carbon negative.

Shown in FIG. 1 is a carbon dioxide sequestration process that has three possible sources of carbon. They are: the gas stream that contains $CO_2$ [100], the air above the solution where the sequestration process takes place [105], and the water or solution [110] of the shown sequestration process, e.g. sea water, brine, or other ionic solution. The amount of carbon in each can be measured. For the incoming $CO_2$ containing gas stream [100], the partial pressure of $CO_2$ gas is measured, e.g. using a commercially available gas probe as is known to those skilled in the art. The flow rate of the $CO_2$ containing gas is also measured or regulated. By knowing the volume of gas from the flow rate and the concentration of $CO_2$ in the gas, the total amount of $CO_2$ that goes into the process is known. Air is a mixture of oxygen ($O_2$), nitrogen ($N_2$), $CO_2$, water vapor, ozone, and other gases. Similar to what is measured for the incoming $CO_2$ gas stream, to characterize the air in the system [105], the partial pressure of $CO_2$ is measured, e.g. using a commercially available probe, and the volume of air is known based upon the dimensions of the reaction vessel. These values for the air in the system give us the amount of carbon contributed by the air. Any suitable method, e.g. coulometry, is used to measure the concentration of carbon in the water [110]. Both the inorganic and the organic carbon content can be measured using coulometry by varying the digestion liquid. In general, the organic carbon does not participate in the reactions and thus is not included in the accounting of carbon in the sequestration process.

There are four components that result from the $CO_2$ sequestration process of the example [115] that may contain carbon. These components are: the effluent gas [120], the desired product [130], the effluent liquid [135], and the air in contact with the product and effluent liquid after the reaction takes place [125]. As mentioned above, the amount of carbon in the gas components is determined using a commercially available probe to determine the partial pressure of carbon dioxide in conjunction with the volume of gas in the system. The amount of carbon in the liquid and solid components is measured using coulometry. These materials are also characterized by their $\delta^{13}C$ values using mass spectrometry or off-axis ICOS. The product's $\delta^{13}C$ value [130] is compared to the value of the incoming $CO_2$ gas stream [100], to its fingerprint. A $\delta^{13}C$ for a product that is close to that of the incoming $CO_2$, e.g., that is still very strongly negative, is indicative of the fact that the carbon in the product did not come from the water [110] or air [105]. Water and air typically have only mildly negative $\delta^{13}C$ values, not less than −8%, to be measured in this method of material and process characterization.

Comparing the amount of carbon in the incoming components to the amount of carbon in the components resulting from the sequestration process shows whether or not any carbon is unaccounted for. This mass balance in conjunction with the $\delta^{13}C$ fingerprinting shows that some portion of the $CO_2$ leaves the incoming gas stream, is not present in the effluent gas stream, and is incorporated into the product.

The exemplary process shown in FIG. 1 is a process [115] during which the $CO_2$ from the incoming gas dissolves [100] into the solution, reacts with ions in the solution, and forms a material which serves to remove the $CO_2$ from the incoming gas in a form that may be stored over a long term, or that may be converted to such a form. The process may produce a solution, a precipitated material, or a slurry, so long as the ultimate product is suitable for long-term storage. The isotopic content or ratio, e.g., $\delta^{13}C$ value, of any component may be measured at any stage of the process in order to obtain both a quantitative and/or qualitative measure of the fate of the original $CO_2$. In addition, carbon measurements, by e.g., coulometry, allow the exact quantitation of the fate of the $CO_2$. In the case of any measurement, multiple samples may be obtained, either from a material or over time, for example, 1, 2, 3, 4, 5, 6, 7, 8, 9, 10 or more than 10 samples may be obtained and analyzed. Thus, for product produced in large lots, and/or produced continuously, a suitable number of samples may be taken to indicate the overall $\delta^{13}C$ value and/or carbon content of the entire amount of material. In the example shown in FIG. 1, $CO_2$ may enter the process from the gas containing $CO_2$ (e.g., flue gas from fossil fuel burning), from the air in contact with the water into which the gas containing $CO_2$ is being dissolved [105], and from the water itself [110]. The $\delta^{13}C$ value for one, two, or all of these may be measured, and the concentration of $CO_2$, and flow rate, of each may also be measured. Similar measurements may be made of the effluent gas [120], the air in contact with the drying product of the precipitation step and/or the liquid effluent [125], the product (e.g., a solid material containing carbonates or a liquid slurry of carbonates and/or bicarbonates) [130], and the liquid effluent [135]. Any additional sources or sinks for $CO_2$ may be similarly tested and accounted for. Knowing the flow rates, volumes, times of flow, $\delta^{13}C$ values, and $CO_2$ concentrations/amounts in each of the sources and sinks, it is straightforward to calculate mass balances and to confirm, e.g., sequestration of $CO_2$ into the product from the original flue gas, and to quantitate the amount of $CO_2$ sequestered. It will be appreciated that different sources of flue gas, e.g., different fossil fuels such as coals from various locations, may have different $\delta^{13}C$ values, and the product produced at a given location, using given raw materials, may be identified or confirmed based on such $\delta^{13}C$ values. While one way to do this is to compare the $\delta^{13}C$ of a putative product with the $\delta^{13}C$ value of the fossil fuel from which it is said to have come, or the $CO_2$ from the burning of said fossil fuel, it is also possible to sample individual lots of product, or representative samples of a number of lots, in order to use a $\delta^{13}C$ that is empirically derived from product itself. Either approach, or a combination, may be taken toward verification and identification of counterfeit materials.

It will also be appreciated that other elements, such as sulfur, boron, and/or nitrogen, which are present in the fossil fuel will likely have their own isotopic ratio values that are specific to the specific type of fossil fuel, e.g., to the specific type and geographic origin of coal used, and potentially even to particular batches of coal. If the $\delta^{13}C$ value is combined with one or more of these values a unique "fingerprint" for the origin of the material may be obtained, which may be compared against the fingerprint for a composition which is claimed to sequester carbon and/or other substances from the fossil fuel. Thus, in some embodiments, the invention provides methods of verifying the source of a composition by determining a $\delta^{13}C$ value for the composition and an isotopic composition value for one or more of sulfur, boron, or nitrogen. These isotopic values or combinations of values may be used alone, or the amounts of each element, and/or ratios thereof, may be used (e.g., the ratio of carbon to boron, or carbon to sulfur, or sulfur to boron, etc.), to verify the origin of the composition. As with isotopic ratios, when amounts of the element itself are used, the amounts in the composition may be compared to actual samples taken at the supposed point of origin, i.e., the site of sequestration, to determine if there is a match. Combinations of amounts and isotopic ratios offer an extremely powerful method of exactly typing and verifying a composition, and are included in embodiments of the invention.

Other substances that are optionally sequestered in the precipitated composition, or in the solution, include one or more of sulfur oxides ($SO_x$, e.g., $SO_2$ and $SO_3$), nitrogen oxides ($NO_x$, e.g., $NO$ or $NO_2$), heavy metals such as mercury, radioactive substances, and volatile organic compounds. These substances or, in some cases, their derivatives, may also be measured and quantitated in the composition that is being analyzed, and values compared to actual or theoretical values to determine quantities removed from the flue gas (for regulatory and/or trading purposes), or, if the composition is an unknown composition or a composition that is claimed to originate in a particular fossil fuel, to verify that it did, indeed, so originate. Thus, in some embodiments the invention include methods of analyzing a sample that include determining a $\delta^{13}C$ value for the sample and determining a value for one or more of the content of $SO_x$ or a derivative thereof, such as a sufate or a sulfite, e.g., calcium or magnesium sulfate or sulfite, $NO_x$ or a derivative thereof, or mercury or a derivative thereof such as mercuric chloride, and comparing the values to reference values, which may be empirically derived from actual samples of known origin, theoretically derived, or derived in any other suitable manner. In some embodiments the invention includes methods of analyzing a sample that include determining a $\delta^{13}C$ value for the sample, determining a similar isotopic ratio value for one or more of boron, sulfur, or nitrogen, and determining a value for one or more of the content of $SO_x$ or a derivative thereof, such as a sufate or a sulfite, e.g., calcium or magnesium sulfate or sulfite, $NO_x$ or a derivative thereof, or mercury or a derivative thereof such as mercuric chloride, and comparing the values to reference values, which may be empirically derived from actual samples of known origin, theoretically derived, or derived in any other suitable manner.

If desired, the relative carbon isotope composition value of the solution during the process can be monitored using, e.g., mass spectrometry or off-axis ICOS. The concentration of $CO_2$ dissolved into the solution may be calculated from the total alkalinity measurement. A measure of the total alkalinity of a known volume of solution will allow for the carbon dioxide content to be calculated. Monitoring the $CO_2$ dissolving into the solution while the process is progressing allows adjustments to be made to create the desired sequestration products and is an optional component of the method.

It can be appreciated that this method is equally applicable to a wide variety of other products including but not limited to combustible fuel, environmental analytes, foods, and paint. Any material wherein the stable isotope content of source materials can be compared to that of the products can be characterized by this method. For example, ratios of stable isotopes for oxygen ($^{16}O$ and $^{18}O$), nitrogen ($^{14}N$ and $^{15}N$), sulfur ($^{32}S$ and $^{34}S$), hydrogen ($^{1}H$ and $^{2}H$), and/or boron ($^{10}B$ and $^{11}B$) can also be measured, e.g. using mass-spectrometry. It can also be appreciated that the amounts of these, and any other suitable element, may be measured using a variety of standard laboratory analytical techniques. These values may be used to trace other components in a product. For example, sulfur from flue gas may be traced in a product in an analogous manner to carbon. Similarly, nitrogen may also be traced. In this way, a "fingerprint" for a particular product may be produced. In the simplest case, the fingerprint is a value for a ratio of stable isotopes in a product (e.g. $\delta^{13}C$ value). In other embodiments, a plurality of isotope ratios may be used, e.g. 2, 3, 4, 5, 6, or more than 6. In some embodiments a fingerprint for a product comprises a value for a stable carbon isotope or ratio values. In some embodiments a fingerprint for a product comprises a value for a stable sulfur isotope or ratio of values. In some embodiments a fingerprint for a product comprises a value for a stable nitrogen isotope or ratio values. In some embodiments a fingerprint for a product comprises a value for a stable boron isotope or ratio values. In some embodiments, a combination of values or ratios of values for stable isotopes for more than one element is used. In some embodiments, a combination of concentration values or ratios of concentrations for stable isotopes of carbon and sulfur are provided. In some embodiments, a combination of values or ratios of values for stable isotopes for more than one element is used. In some embodiments, a combination of concentration values or ratios of concentrations for stable isotopes of carbon and nitrogen are provided. In some embodiments, a combination of values or ratios of values for stable isotopes for more than one element is used. In some embodiments, a combination of concentration values or ratios of concentrations for stable isotopes of carbon, nitrogen, and sulfur are provided. In some embodiments, a fingerprint for a product comprises a $\delta^{13}C$ value. In some embodiments, a fingerprint comprises a $\delta^{13}C$ value and a $\delta^{34}S$ value. In some embodiments, a fingerprint comprises a $\delta^{13}C$ value and a $\delta^{11}B$ value. In some embodiments, a fingerprint comprises a $\delta^{13}C$ value and a $\delta^{15}N$ value. In some embodiments, a fingerprint comprises a $\delta^{13}C$ value, a $\delta^{34}S$ value, and a $\delta^{15}N$ value. In some embodiments, a fingerprint comprises a $\delta^{13}C$ value, a $\delta^{34}S$ value, and a $\delta^{11}B$ value. In some embodiments, a fingerprint comprises a $\delta^{13}C$ value, a $\delta^{11}B$ value, and a $\delta^{15}N$ value.

Compositions Containing Carbon

In some embodiments the invention provides compositions containing carbon with negative relative carbon isotope composition ($\delta^{13}C$) values, e.g., synthetic compositions. Such values may be indicative of plant-based origins, e.g. flue gas from burning fossil fuel, and may be used to verify that the carbon in the composition comes partially or completely from the burning of fossil fuel. Compositions that are likely to contain components from flue gas combustion, e.g., $CO_2$ and optionally other components such as sulfur-, nitrogen-, and/or heavy metal-containing components, are useful as vehicles to sequester such substances from the environment, and may also have other uses such as in the built environment. In some embodiments, the composition is a synthetic composition. Synthetic compositions provided in some embodiments of the invention are typically formed by any synthetic method that produces a product with carbon with a negative $\delta^{13}C$ value, however, they may be formed by sequestering $CO_2$ gas in the synthetic composition, e.g., the composition may be formed by precipitating material from an aqueous solution into which $CO_2$ gas from, e.g., the burning of fossil fuel, has been introduced. Other possible compositions, e.g., synthetic compositions, of the invention include aqueous solutions containing, e.g., carbonates and/or bicarbonates which have a negative $\delta^{13}C$ value, or slurries containing both solids and aqueous liquids, either or both of which may contain, e.g., carbonates and/or bicarbonates which have a negative $\delta^{13}C$ value. The compositions may be present in amounts of more than 1 kg, such as more than 10 kg, for example, more than 100 kg, more than 1000 kg, more than 100,000 kg, more than 1,000,000 kg or even more than 10,000,000 kg. The compositions may, for example, have a mass of 1 kg to 10,000,000 kg, or 10 kg to 10,000,000 kg, or 100 kg to 10,000,000 kg, or 1000 kg to 10,000,000 kg, or 10,000 kg to 10,000,000 kg, or 1 kg to 1,000,000 kg, or 10 kg to 1,000,000 kg, or 100 kg to 1,000,000 kg, or 1000 kg to 1,000,000 kg, or 10,000 kg to 1,000,000 kg, or 1 kg to 100,000 kg, or 10 kg to 100,000 kg, or 100 kg to 100,000 kg, or 1000 kg to 100,000 kg, or 10,000 kg to 100,000 kg, or 1 kg to 10,000 kg, or 10 kg to 10,000 kg, or 100 kg to 10,000 kg, or 1000 kg to 10,000 kg, or 1 kg to 1000 kg, or 10 kg to 1000 kg, or 100 kg to 1000 kg. In some cases the composition may be a solid mass. In some cases the composition may be made up of particulate matter, in which individual particles are relatively small, e.g., 0.1-1000 microns average diameter, or in some cases even 1000 microns to several centimeters or more in diameter, or combinations thereof, in which case the composition is considered to be the combined mass of the particles in a single batch, lot, container, or the like. In the case of larger amounts of composition, it may be desirable to take multiple samples to determine an accurate value for, e.g., $\delta^{13}C$ value and/or carbon content. Compositions of the invention may also have an average density that falls within a certain range, for example, in some embodiments, a composition of the invention has a bulk density of 50 lb/ft$^3$ to 200 lb/ft$^3$, and in certain embodiments a bulk density of 75 lb/ft$^3$ to 125 lb/ft$^3$. Compositions of the invention may also have an average hardness that falls within a certain ranges, such as in some embodiments a composition of the invention has an average hardness between 1 and 7 on the Mohs scale of hardness. In some embodiments, a composition of the invention has an average hardness of at least 3 on the Mohs scale of hardness. In some embodiments, a composition of the invention has an average hardness of at least 4 on the Mohs scale of hardness. In some embodiments, a composition of the invention has an average hardness of at least 5 on the Mohs scale of hardness. In some embodiments, a composition of the invention has an average hardness between 1 and 6 on the Mohs scale of hardness, such as between 1 and 5, such as between 2 and 5, such as between 1 and 4, such as between 2 and 6, such as between 2 and 4 on the Mohs hardness scale.

In some embodiments compositions of the invention comprise carbon with $\delta^{13}C$ values less than −5.00%, −6%, −7%, −8%, −9%, −10%, −11%, −12%, −15%, −17%, −20%, −21.0%, −21.7%, −21.8%, −21.9%, −22.0%, −23.0%, −24.0%, −25.0%, −26.0%, −27.0%, −28.0%, −29.0%, −30.0%, −31.0%, −32.0%, −35.0%, or −40.0%. In some of these embodiments the compositions may further have a carbon dioxide content (e.g., in some embodiments in the form of carbonates, bicarbonates, or a combination of carbonates and bicarbonates) of at least 1% w/w, such as at least 10% w/w, for example, at least 20% w/w, and in some embodiments at least 30% w/w, 40% w/w or even 50% w/w. Carbon dioxide content may be determined by any suitable analysis and/or calculation, as are known in the art. In some embodiments the invention provides a composition, e.g., a solid composition or a slurry of solid and aqueous solution, for which the $\delta^{13}C$ value of the carbon-containing composition, e.g., synthetic carbon containing composition is less than −5% and in certain embodiments the $\delta^{13}C$ value of the carbon-containing composition, e.g., synthetic carbon containing composition is less than −5% and the carbon dioxide content is at least 10%. In some embodiments the $\delta^{13}C$ value of the carbon-containing composition, e.g., synthetic carbon containing composition is less than −10%, and in certain embodiments the $\delta^{13}C$ value of the carbon-containing composition, e.g., synthetic carbon containing composition is less than −10% and the carbon dioxide content is at least 10%. In some embodiments the $\delta^{13}C$ value of the carbon-containing composition, e.g., synthetic carbon containing composition is less than −15%, and in certain embodiments the $\delta^{13}C$ value of the carbon-containing composition, e.g., synthetic carbon containing composition is less than −15% and the carbon dioxide content is at least 10%. In some embodiments the $\delta^{13}C$ value of the carbon-containing composition, e.g., synthetic carbon containing composition is less than −20.0%, and in certain embodiments the $\delta^{13}C$ value of the carbon-containing composition, e.g., synthetic carbon containing composition is less than −20% and the carbon dioxide content is at least 10%. In some embodiments the $\delta^{13}C$ value of the carbon-containing composition, e.g., synthetic carbon containing composition is less than −22.0% and in certain embodiments the $\delta^{13}C$ value of the carbon-containing composition, e.g., synthetic carbon containing composition is less than −22% and the carbon dioxide content is at least 10%. In some embodiments the $\delta^{13}C$ value of the carbon-containing composition, e.g., synthetic carbon containing composition is less than −23.0% and in certain embodiments the $\delta^{13}C$ value of the carbon-containing composition, e.g., synthetic carbon containing composition is less than −23% and the carbon dioxide content is at least 10%. In some embodiments the $\delta^{13}C$ value of the carbon-containing composition, e.g., synthetic carbon containing composition is less than −24.0% and in certain embodiments the $\delta^{13}C$ value of the carbon-containing composition, e.g., synthetic carbon containing composition is less than −24% and the carbon dioxide content is at least 10%. In some embodiments the $\delta^{13}C$ value of the carbon-containing composition, e.g., synthetic carbon containing composition is less than −25.0%, and in certain embodiments the $\delta^{13}C$ value of the carbon-containing composition, e.g., synthetic carbon containing composition is less than −25% and the carbon dioxide content is at least 10%. In some embodiments the $\delta^{13}C$ value of the carbon-containing composition, e.g., synthetic carbon containing composition is less than −27.0% and in certain embodiments the $\delta^{13}C$ value of the carbon-containing composition, e.g., synthetic carbon containing composition is less than −27% and the carbon dioxide content is at least 10%. In some embodiments the $\delta^{13}C$ value of the carbon-containing composition, e.g., synthetic carbon containing composition is less than −30.0% and in certain embodiments the $\delta^{13}C$ value of the carbon-containing composition, e.g., synthetic carbon containing composition is less than −30% and the carbon dioxide content is at least 10%. In some embodiments the $\delta^{13}C$ value of the carbon-containing composition, e.g., synthetic carbon containing composition is less than −40.0% and in certain embodiments the $\delta^{13}C$ value of the carbon-containing composition, e.g., synthetic carbon containing composition is less than −40% and the carbon dioxide content is at least 10%.

In some embodiments of the invention carbon-containing compositions, e.g., synthetic carbon containing compositions, are provided that are carbon neutral or carbon negative in addition to having a negative $\delta^{13}C$ value as described herein. Carbon neutral and carbon negative are terms that refer to the amount of carbon dioxide gas released in the production of a product as compared to the amount of carbon dioxide prevented from entering the atmosphere, i.e., sequestered, by the product. Carbon neutral products prevent as much carbon dioxide from reaching the Earth's atmosphere as is released in producing the product. Carbon negative products prevent more carbon dioxide from reaching the Earth's atmosphere than is released during the production of the product. For example, in a carbon dioxide sequestration process where the flue gas from a power plant is injected into an impermeable under-ground repository, the carbon dioxide actually prevented from entering the atmosphere through the sequestration technique is weighed against the carbon dioxide produced to power the machinery performing the injection of the flue gas. If more carbon dioxide is placed into the impermeable repository than is released by the sequestering machinery, then the process is carbon negative. The concepts of carbon negative products or methods are elaborated upon in patent application U.S. Ser. No. 12/344,019, specifically page 7, and application U.S. 61/117,541, specifically pages 1 and 2, which are hereby incorporated by reference herein in their entirety.

In some embodiments compositions of the invention contain strontium, e.g., between 0.001% and 5% w/w/strontium, or between 0.00001% and 1% w/w strontium, or between 0.001% and 0.1% w/w strontium, or between 0.01% and 5% w/w strontium, or between 0.01% and 1% w/w strontium, or between 0.01% and 0.1% w/w strontium, or between 0.1% and 5% w/w strontium, or between 0.1% and 1% w/w strontium. In some embodiments compositions of the invention contain boron, e.g., between 0.000001% and 2.0% w/w boron, or between 0.00001% and 1% w/w boron, or between 0.0001% and 0.1% w/w boron, or between 0.001% and 1% w/w boron, or between 0.001% and 0.1% w/w boron, or between 0.1% and 5% w/w boron, or between 0.1% and 1% w/w boron. In some embodiments compositions of the invention contain selenium, e.g., between 0.000001% and 2.0% w/w selenium, or between 0.00001% and 1% w/w selenium, or between 0.0001% and 0.1% w/w selenium, or between 0.001% and 1% w/w selenium, or between 0.001% and 0.1% w/w selenium, or between 0.1% and 5% w/w selenium, or between 0.1% and 1% w/w selenium.

In some embodiments, carbon containing compositions, e.g., synthetic carbon containing compositions are provided where the compositions contain carbon having a negative $\delta^{13}C$ value as described herein, where at least part of the carbon is in the form of carbonates and/or bicarbonates, e.g., carbonates and/or bicarbonates of beryllium, magnesium, calcium, strontium, barium or radium or combinations thereof. The molar ratio of carbonates to bicarbonates may be any suitable ratio for the process of producing the composition and/or the intended use of the composition, such as: a carbonate/bicarbonate ratio of greater than 100/1, less than 1/100, more than 50/1, 25/1, 10/1, 9/1, 8/1, 7/1, 6/1, 5/1, 4/1, 3/1, 2/1, 1/1, 1/2, 1/3, or 1/4; less than 50/1, 25/1, 10/1, 9/1, 8/1, 7/1, 6/1, 5/1, 4/1, 3/1, 2/1, 1/1, 1/2, 1/3, or 1/4; or substantially all carbonate or substantially all bicarbonate. In some embodiments, the carbonate/bicarbonate ratio may be 100/1 to 1/100, or 50/1 to 1/50, o, 25/1 to 1/25, or 10/1 to 1/10, or 5/1 to 1/5, or 2/1 to 1/2, or 100/1 to 1.10, or 100/1 to 1/1, or 50/1 to 1/10, or 50/1 to 1/1 or 25/1 to 1/10, or 25/1 to 1/1 or 10/1 to 1/1, or 1/100 to 10/1, or 1/100 to 1/1, or 1/50 to 10/1, or 1/50 to 1/1, or 1/25 to 10/1, or 1/25 to 1/1, or 1/10 to 1/1. In some embodiments the invention provides carbon containing compositions, e.g., synthetic carbon containing compositions that contain carbonates and/or bicarbonates of calcium or magnesium or combinations thereof. In some embodiments the invention provides carbon containing compositions, e.g., synthetic carbon containing compositions that contain only carbonates of calcium or magnesium or combinations thereof without containing bicarbonate, or containing only trace amounts of bicarbonate. Other embodiments provide carbon containing compositions, e.g., synthetic carbon containing compositions that are comprised solely of bicarbonates of calcium or magnesium or combinations thereof. In the embodiments of the invention where both calcium and magnesium are provided, various embodiments include a range of ratios between the calcium and magnesium atoms in the carbon containing compositions, e.g., synthetic carbon containing composition. In some embodiments of the invention, the calcium to magnesium molar ratio (Ca/Mg) range is less than 1/200 to greater than 200/1. In some embodiments, Ca/Mg ratio is 1/1. In some embodiments, Ca/Mg ratio ranges are 2/1 to 1/2, 3/2 to 2/3, or 5/4 to 4/5. In some embodiments, Ca/Mg ratio ranges are 1/7 to 200/1, 1/15 to 12/10, 1/10 to 5/1, 1/7 to 1/2, or 1/9 to 2/5. In some embodiments, Ca/Mg ratio ranges are 1/200 to 1/7, 1/70 to 1/7, or 1/65 to 1/40. In some embodiments, Ca/Mg ranges are 1/3 to 3/1 or 1/2 to 2/1. In some embodiments, Ca/Mg ranges are 2/1 to all calcium, 3/1 to 200/1, 5/1 to 200/1, or 10/1 to 200/1.

In some embodiments, other components besides carbon dioxide or compounds derived from carbon dioxide (e.g. carbonates and/or bicarbonates) are included in a carbon containing composition. For example, in some embodiments, the carbon found in the composition originates at least in part from the burning of fossil fuel and the production of a flue gas, e.g., in an industrial process, and other components of the fossil fuel may also provide additional components of the carbon containing composition. Exemplary components include the combustion gases, e.g., nitrogen oxides ($NO_x$); sulfur oxides ($SO_x$) and sulfides; halides such as hydrogen chloride and hydrogen fluoride; particulates such as flyash, cement kiln dust, other dusts and metals including arsenic, beryllium, boron, cadmium, chromium, chromium VI, cobalt, lead, manganese, mercury, molybdenum, selenium, strontium, thallium, or vanadium; and organics such as hydrocarbons and volatile organic compounds (VOCs), radioactive materials, dioxins and PAH compounds. PAH (Polynuclear Aromatic Hydrocarbons) are organic compounds produced when materials containing carbon and hydrogen are burned. As used herein, nitrogen oxides ($NO_x$) refers to oxides of nitrogen, e.g., nitric oxide (NO) and nitrogen dioxide ($NO_2$); and sulfur oxides ($SO_x$) refers to oxides of sulfur, e.g., sulfur dioxide ($SO_2$) and sulfur trioxide ($SO_3$). In all of these embodiments, it can be appreciated that the components may interact with other participants in the reaction that forms the synthetic carbon-containing composition such that the components are provide in the product (the synthetic carbon containing composition) as derivatives of the original components.

In some embodiments the compositions of the invention may include flyash. In some embodiments compositions of the invention contain flyash in an amount of 0.001% w/w-10.0%, such as 0.01% w/w-5.0% w/w, such as 0.1% w/w-5.0% w/w, such as 1.0% w/w-5.0% w/w, such as 1.0% w/w-4.0% w/w, such as 1.0% w/w-3.0% w/w, such as 1.0% w/w-2.5% w/w, such as 0.1% w/w to 2.5% w/w fly ash. In some embodiments compositions of the invention contain one or more mercury compounds, e.g., mercuric chloride and/or other mercuric compounds, in an amount of 0.0000001-0.1% w/w, e.g., 0.000001-0.1% w/w, or 0.00001-0.1%, or 0.0000001-0.01%, or 0.0000001-0.001, or % 0.0000001-0.001%, or 0.0000001-0.00001%, or 0.000001-0.1, or % 0.000001-0.01%, or 0.000001-0.001%, or 0.000001-0.0001%, or 0.000001-0.00001, or % 0.00001-0.01%, or 0.00001-0.001%, or 0.00001-0.0001 w/w. In some embodiments compositions of the invention contain one or more sulfur compounds, e.g., one or more sulfates, sulfites, or combination of sulfates and sulfites, in an amount of 0.01-30% w/w, e.g., 0.01-20% w/w, or 0.01-10% w/w, or 0.01-1% w/w, or 0.1-30% w/w, e.g., 0.1-20% w/w, or 0.1-10% w/w, or 0.1-1%, or 1-30% w/w, e.g., 1-20% w/w, 1-10% w/w, or 1-5% w/w. In some embodiments compositions of the invention contain one or more nitrogen compounds, e.g., derivatives of NOx such as nitrates or nitrites, in an amount of 0.01-30% w/w, e.g., 0.01-20% w/w, or 0.01-10% w/w, or 0.01-1% w/w, or 0.1-30% w/w, e.g., 0.1-20% w/w, or 0.1-10% w/w, or 0.1-1%, or 1-30% w/w, e.g., 1-20% w/w, 1-10% w/w, or 1-5% w/w. It will be apparent that a composition may contain one or more of flyash, mercury compounds, sulfur compounds, or nitrogen compounds, e.g., one or more mercury, sulfur, or nitrogen compounds in the weight percentage ranges given above.

In some embodiments, the invention provides compositions, such as synthetic compositions, containing carbon with $\delta^{13}C$ value less than −5%, or less than −10%, or less than −15%, or less than −20%, or less than −25% which also include one or more of the following: $SO_x$; $NO_x$; metals including: arsenic, beryllium, boron, cadmium, chromium, chromium VI, cobalt, lead, manganese, mercury, molybdenum, selenium, strontium, thallium, or vanadium; VOCs; particulates such as fly ash; or radioactive compounds or derivatives thereof. In some embodiments, the invention provides for carbon containing compositions, e.g., synthetic carbon containing compositions with $\delta^{13}C$ value less than −5% that further comprise $SO_x$ or derivatives thereof. In some embodiments, the invention provides for carbon containing compositions, e.g., synthetic carbon containing compositions with $\delta^{13}C$ values less than −5% that further comprise particulate matter, e.g. fly ash. In some embodiments, the invention provides for carbon containing compositions, e.g., synthetic carbon containing compositions with $\delta^{13}C$ values less than −5% that further comprise a metal, e.g. arsenic, beryllium, boron, cadmium, chromium, chromium VI, cobalt, lead, manganese, mercury, molybdenum, selenium, strontium, thallium, and vanadium, or derivatives thereof. In some embodiments, the invention provides for carbon containing compositions, e.g., synthetic carbon containing compositions with $\delta^{13}C$ values less than −5% that further comprise $SO_x$ or derivatives thereof and particulate matter, e.g. fly ash. In some embodiments, the invention provides for carbon containing compositions, e.g., synthetic carbon containing compositions with $\delta^{13}C$ values less than −5% that further comprise $SO_x$ or derivatives thereof and a heavy metal, e.g. arsenic, beryllium, boron, cadmium, chromium, chromium VI, cobalt, lead, manganese, mercury, molybdenum, selenium, strontium, thallium, and vanadium, or derivatives thereof; in some embodiments the heavy metal is mercury or a derivative compound of mercury. In some embodiments, the invention provides for carbon containing compositions, e.g., synthetic carbon containing compositions with $\delta^{13}C$ values less than −5% that further comprise particulate matter, e.g. fly ash, and a heavy metal, e.g. arsenic, beryllium, boron, cadmium, chromium, chromium VI, cobalt, lead, manganese, mercury, molybdenum, selenium, strontium, thallium, and vanadium, or derivatives thereof; in some embodiments the heavy metal is mercury or a derivative compound of mercury. In some embodiments, the invention provides for carbon containing compositions, e.g., synthetic carbon containing compositions with $\delta^{13}C$ values less than −5% that further comprise $NO_x$ or derivatives thereof. In some embodiments, the invention provides for carbon containing compositions, e.g., synthetic carbon containing compositions with $\delta^{13}C$ values less than −5% that further comprise VOCs or derivatives thereof. In some embodiments, the invention provides for carbon containing compositions, e.g., synthetic carbon containing compositions with $\delta^{13}C$ value less than −15% that further comprise $SO_x$ or derivatives thereof. In some embodiments, the invention provides for carbon containing compositions, e.g., synthetic carbon containing compositions with $\delta^{13}C$ values less than −15% that further comprise particulate matter, e.g. fly ash. In some embodiments, the invention provides for carbon containing compositions, e.g., synthetic carbon containing compositions with $\delta^{13}C$ values less than −15% that further comprise a metal, e.g. arsenic, beryllium, boron, cadmium, chromium, chromium VI, cobalt, lead, manganese, mercury, molybdenum, selenium, strontium, thallium, and vanadium, or derivatives thereof. In some embodiments, the invention provides for carbon containing compositions, e.g., synthetic carbon containing compositions with $\delta^{13}C$ values less than −15% that further comprise $SO_x$ or derivatives thereof and particulate matter, e.g. fly ash. In some embodiments, the invention provides for carbon containing compositions, e.g., synthetic carbon containing compositions with $\delta^{13}C$ values less than −15% that further comprise $SO_x$ or derivatives thereof and a heavy metal, e.g. arsenic, beryllium, boron, cadmium, chromium, chromium VI, cobalt, lead, manganese, mercury, molybdenum, selenium, strontium, thallium, and vanadium, or derivatives thereof; in some embodiments the heavy metal is mercury or a derivative compound of mercury. In some embodiments, the invention provides for carbon containing compositions, e.g., synthetic carbon containing compositions with $\delta^{13}C$ values less than −15% that further comprise particulate matter, e.g. fly ash, and a heavy metal, e.g. arsenic, beryllium, boron, cadmium, chromium, chromium VI, cobalt, lead, manganese, mercury, molybdenum, selenium, strontium, thallium, and vanadium, or derivatives thereof; in some embodiments the heavy metal is mercury or a derivative compound of mercury. In some embodiments, the invention provides for carbon containing compositions, e.g., synthetic carbon containing compositions with $\delta^{13}C$ values less than −15% that further comprise $NO_x$ or derivatives thereof. In some embodiments, the invention provides for carbon containing compositions, e.g., synthetic carbon containing compositions with $\delta^{13}C$ values less than −15% that further comprise VOCs or derivatives thereof. More details regarding the inclusion of by-products of industrial processes are given in patent application U.S. 61/156,809, specifically pages 1-2, 19-24, and 32-39, which is hereby incorporated by reference herein in its entirety.

As described herein, in some embodiments, the carbon found in the composition originates at least in part from the burning of fossil fuel, e.g., coal, and the production of a flue gas, e.g., in an industrial process, and other components of the fossil fuel may also provide additional components of the synthetic carbon containing composition. In addition to the components detailed above, there are other elements in fossil fuels, e.g., coals, that, through processes of fractionation, also have isotopic ratios which may be compared to standards, as described more fully in the methods section, and as well-known in the art. For example, ratios of stable isotopes for oxygen ($^{16}O$ and $^{18}O$), nitrogen ($^{14}N$ and $^{15}N$), sulfur ($^{32}S$ and $^{34}S$), hydrogen ($^{1}H$ and $^{2}H$), and boron ($^{10}B$ and $^{11}B$) can also be measured, e.g. using mass-spectrometry. Thus in some embodiments the invention provides compositions comprising carbon $\delta^{13}C$ values less than −5% that further comprise boron with a $\delta^{11}B$ value of less than −2%, less than −5%, less than −7%, less than −10%, less than −12%, less than −14%, less than −15%, less than −17%, less than −20%, less than −22%, less than −25%, or less than −30% sulfur with a $\delta^{34}S$ value of less than −5%, or between 0 and +10%, or combinations thereof. These compositions may further contain one or more of a $SO_x$-derived, $NO_x$-derived, or mercury-derived compound, as described further herein.

In some embodiments of the invention, the carbon containing compositions, e.g., synthetic carbon-containing composition includes magnesium carbonates or calcium carbonates or combinations thereof. In some embodiments, the carbon-containing composition includes dolomite, a carbonate containing both calcium and magnesium having the chemical formula $Ca_{0.5}Mg_{0.5}CO_3$, and/or protodolomite (amorphous dolomite with calcium to magnesium ratios deviating from 1:1). Other embodiments contain $CaCO_3$ as one or more of the minerals calcite, aragonite, or vaterite or as combinations thereof. Some embodiments have hydrated forms of calcium carbonate including: ikaite ($CaCO_3 \cdot 6H_2$)), amorphous calcium carbonate ($CaCO_3.H_2O$) or monohydrocalcite ($CaCO_3.H_2O$) or combinations thereof. Some embodiments contain magnesium carbonates in various stages of hydration where waters of hydration include 1, 2, 3, 4, or more than 4 waters of hydration or combinations thereof, such as no hydration as magnesite ($MgCO_3$) or ternary hydration as nesquehonite ($MgCO_3.3H_2O$). Other embodiments include versions of more complex versions of magnesium carbonates that include waters of hydration and hydroxide such as artinite ($MgCO_3.Mg(OH)_2.3H_2O$), dypingite ($Mg_5(CO_3)_4(OH)_2.5H_2O$), or hydromagnesite ($Mg_5(CO_3)_4(OH)_2.3H_2O$) or combinations thereof. Some embodiments include carbonates of calcium and/or magnesium in all or some of the various states of hydration listed herein.

In some embodiments the invention provides for a carbon containing composition, e.g., synthetic carbon containing composition comprising carbonates or bicarbonates or combinations thereof where the carbon in the carbonates or bicarbonates has a $\delta^{13}C$ value less than −5%, or less than −10% or less than −15% or less than −20% or less than −25% or less than −30% or less than −35% where the composition does not release more than 1%, or 5%, or 10% of its total $CO_2$ when exposed to normal conditions of temperature and moisture, including rainfall of normal pH, for its intended use, for at least 1, 2, 5, 10, or 20 years, or for more than 20 years, for example, for more than 100 years. In some embodiments the composition does not release more than 1% of its total $CO_2$ when exposed to normal conditions of temperature and moisture, including rainfall of normal pH, for its intended use, for at least 1 year. In some embodiments the composition does not release more than 5% of its total $CO_2$ when exposed to normal conditions of temperature and moisture, including rainfall of normal pH, for its intended use, for at least 1 year. In some embodiments the composition does not release more than 10% of its total $CO_2$ when exposed to normal conditions of temperature and moisture, including rainfall of normal pH, for its intended use, for at least 1 year. In some embodiments the composition does not release more than 1% of its total $CO_2$ when exposed to normal conditions of temperature and moisture, including rainfall of normal pH, for its intended use, for at least 10 years. In some embodiments the composition does not release more than 1% of its total $CO_2$ when exposed to normal conditions of temperature and moisture, including rainfall of normal pH, for its intended use, for at least 100 years. In some embodiments the composition does not release more than 1% of its total $CO_2$ when exposed to normal conditions of temperature and moisture, including rainfall of normal pH, for its intended use, for at least 1000 years. Any suitable surrogate marker or test that is reasonably able to predict such stability may be used; e.g., conditions of elevated temperature or pH conditions that are reasonably likely to indicate stability over an extended period in an accelerated test may be used. For example, depending on the intended use and environment of the composition, a sample of the composition may be exposed to 50, 75, 90, 100, 120, or 150° C. for 1, 2, 5, 25, 50, 100, 200, or 500 days at between 10% and 50% relative humidity, and a loss less than 1%, 2%, 3%, 4%, 5%, 10%, 20%, 30%, or 50% of its carbon may be considered sufficient evidence of stability for a given period, e.g., for 1, 10, 100, 1000, or more than 1000 years. $CO_2$ content of the material may be monitored by any suitable method, e.g., coulometry. Other conditions may be adjusted as appropriate, including pH, pressure, UV radiation, and the like, again depending on the intended or likely environment.

It will be appreciated that any suitable conditions may be used that one of skill in the art would reasonably conclude indicate the requisite stability over the indicated time period. In addition, if accepted chemical knowledge indicates that the composition would have the requisite stability for the indicated period this may be used as well, in addition to or in place of actual measurements. For example, some carbonate compounds that may be part of a composition of the invention, e.g. in a given polymorphic form, may be well-known geologically and known to have withstood normal weather for decades, centuries, or even millennia, without appreciable breakdown, and so have the requisite stability.

In some embodiments the invention provides for a building material containing a component comprising carbonates or bicarbonates or combinations thereof where the carbon in the carbonates and/or bicarbonates has a $\delta^{13}C$ value less than −5%, e.g., less than −10%, such as less than −15% and in some embodiments less than −20%. A "building material," as that term is used herein, includes any material that is or may be used for a construction purpose, for example, but not limited to, work and home habitats, industrial structures and transportation-related structures such as roads, parking lots and parking structures, as well as environmental structures such as dams, levees, and the like. In some of these embodiments the building material further contains $SO_x$; $NO_x$; metals including: arsenic, beryllium, boron, cadmium, chromium, chromium VI, cobalt, lead, manganese, mercury, molybdenum, selenium, strontium, thallium, or vanadium; VOCs; particulates such as fly ash; or radioactive compounds or derivatives thereof, or combinations thereof, as described above. Further, in some embodiments, the building material does not release more than 1%, or 5%, or 10% of its total $CO_2$ when exposed to normal conditions of temperature and moisture, including rainfall of normal pH, for its intended use, for at least 1, 2, 5, 10, or 20 years, or for more than 20 years, for example, for more than 100 years, also as described above. In some embodiments the invention provides for an aggregate, for example, a synthetic aggregate containing a component comprising carbonates or bicarbonates or combinations thereof where the carbon in the carbonates or bicarbonates has a $\delta^{13}C$ value less than −5%, e.g., less than −10% such as less than −15% and in some embodiments less than −20%. In some embodiments, the aggregate of the invention is a fine aggregate, a coarse aggregate, reactive aggregate, inert or non-reactive aggregate, or a formed or cast aggregate. Reactive aggregate is aggregate which undergoes a chemical reaction such that it bonds to the surrounding material when hydrated. Some embodiments provide for a cementitious building material containing a component comprising carbonates or bicarbonates or combinations thereof where the carbon in the carbonates or bicarbonates has a $\delta^{13}C$ value less than −5%, e.g., less than −10% such as less than −15% and in some embodiments less than −20%. Some embodiments provide for a cement or concrete containing a component comprising carbonates or bicarbonates or combinations thereof where the carbon in the carbonates or bicarbonates has a $\delta^{13}C$ value less than −5%, e.g., less than −10% such as less than −15% and in some embodiments less than −20%. In some embodiments the invention provides for other cementitious building material such as: mortar, a pozzolanic material, or a supplementary cementitious material or combinations thereof containing a component comprising carbonates or bicarbonates or combinations thereof where the carbon in the carbonates or bicarbonates has a $\delta^{13}C$ value less than −5%, e.g., less than −10% such as less than −15% and in some embodiments less than −20%. In some embodiments the invention provides for non-cementitious building material such as: roadway material, a brick, a board, a conduit, a beam, a basin, a column, a tile, a fiber siding product, a slab, an acoustic barrier, plaster, dry-wall, stucco, a soil stabilization composition, or insulation or combinations thereof containing a component comprising carbonates or bicarbonates or combinations thereof where the carbon in the carbonates or bicarbonates has a $\delta^{13}C$ value less than −5%, e.g., less than −10% such as less than −15% and in some embodiments less than −20%. In some embodiments the roadway material may be an asphalt or a paving material.

Some embodiments of the invention provide for non-building materials containing components that include carbonates or bicarbonates or combinations thereof where the carbon in the carbonates and/or bicarbonates has a $\delta^{13}C$ value less than −5%, e.g., less than −10% such as less than −15% and in some embodiments less than −20%. In some embodiments the non-building material includes: a household or commercial ceramic product; a paper product; a polymeric product; a lubricant; an adhesive; a rubber product; a chalk; a paint; a personal care product; a cosmetic; an ingestible product; an agricultural product; or an environmental remediation product. In some embodiments, the invention provides for a personal care product that includes a cleaning product or a personal hygiene product. In some embodiments, the invention provides for an ingestible product that includes a liquid, a solid, or an animal ingestible product containing components that include carbonates or bicarbonates or combinations thereof where the carbon in the carbonates and/or bicarbonates has a $\delta^{13}C$ value less than −5%, e.g., less than −10% such as less than −15% and in some embodiments less than −20%. Some embodiments of the invention provide for an agricultural product that includes a soil amendment product or a pesticide containing components that include carbonates or bicarbonates or combinations thereof where the carbon in the carbonates and/or bicarbonates has a $\delta^{13}C$ value less than −5%, e.g., less than −10% such as less than −15% and in some embodiments less than −20%. Some embodiments of the invention provide for an environmental remediation product that includes a forest soil restoration product or a product for neutralization of over acidified water containing components that include carbonates or bicarbonates or combinations thereof where the carbon in the carbonates and/or bicarbonates has a $\delta^{13}C$ value less than −5%, e.g., less than −10% such as less than −15% and in some embodiments less than −20%. In some embodiments the invention provides for a paper product containing components that include carbonates or bicarbonates or combinations thereof where the carbon in the carbonates and/or bicarbonates has a $\delta^{13}C$ value less than −5%, e.g., less than −10% such as less than −15% and in some embodiments less than −20%. Some embodiments of the invention provide for a lubricant containing components that include carbonates or bicarbonates or combinations thereof where the carbon in the carbonates and/or bicarbonates has a $\delta^{13}C$ value less than −5%. In some embodiments, the invention provides for a paint containing components comprised of carbonates or bicarbonates or combinations thereof where the carbon in the carbonates and/or bicarbonates has a $\delta^{13}C$ value less than −5%. Building materials of the invention may also have an average hardness that falls within a certain ranges, such as in some embodiments a building material of the invention has an average hardness between 1 and 7 on the Mohs scale of hardness. In some embodiments, a building material of the invention has an average hardness of at least 3 on the Mohs scale of hardness. In some embodiments, a building material of the invention has an average hardness of at least 4 on the Mohs scale of hardness. In some embodiments, a building material of the invention has an average hardness of at least 5 on the Mohs scale of hardness. In some embodiments, a building material of the invention has an average hardness between 1 and 6 on the Mohs scale of hardness, such as between 1 and 5, such as between 2 and 5, such as between 1 and 4, such as between 2 and 6, such as between 2 and 4 on the Mohs hardness scale.

In some embodiments the invention provides flowable compositions. In some embodiments, the flowable composition is pseudoplastic (i.e., viscosity of the flowable compositions decreases with increasing shear rate). In some embodiments, the flowable composition is thixotropic (i.e., viscosity decreases over time under constant shear). In some embodiments, viscosity and non-Newtonian behavior increases with increasing concentration of solids. In some embodiments, the flowable composition that is a slurry has a viscosity at 20° C. greater than 1 cP (centipoise), such as greater than 5 cP, greater than 10 cP, greater than 15 cP, greater than 20 cP, greater than 25 cP, greater than 30 cP, greater than 35 cP, greater than 40 cP, greater than 45 cP, greater than 50 cP, greater than 75 cP, greater than 100 cP, greater than 250 cP, greater than 500 cP, greater than 750 cP, or a viscosity at 20° C. greater than 1000 cP. In some embodiments, a flowable composition has a viscosity between 2000 cP to 1 cP, such as 100 cP to 1000 cP, including 150 cP to 500 cP, for example 200 cP to 400 cP. For example, the flowable composition may have a viscosity of 300 cP to 400 cP such as about 380 cP. In view of the pseudoplasticity of the flowable compositions, viscosity may decrease with increasing shear rate. Also, in view of the thixotropic nature of some of the flowable compositions, viscosity may decrease over time with constant shear. In some embodiments, the flowable composition is a slurry comprising solid precipitates and effluent liquid from a carbon sequestration process. In such embodiments, the solid precipitates include, but are not limited to, carbonates, bicarbonates, and any combination of carbonates and bicarbonates. In some embodiments, where the solid precipitates are the result of a carbon sequestration process employing a flue gas from a fossil fuel burning process, the precipitates will have a negative $\delta^{13}C$ value. In such embodiments, the carbonates, bicarbonates, or any combination of carbonates and bicarbonates included in the precipitates will have a $\delta^{13}C$ value less than (i.e. more negative than) −5‰, such as less than −6‰, less than −7‰, less than −8‰, less than −9‰, less than −10‰, less than −15‰, less than −20‰, less than −21‰, less than −22‰, less than −23‰, less than −24‰, less than −25‰, less than −26‰, less than −27‰, less than −28‰, less than −29‰, less than −30‰, less than −35‰, less than −40‰. In some embodiments, the flowable composition will include other constituents of the industrial flue gas, such as, but not limited to: carbon monoxide, nitrogen oxides (NOx), sulfur oxides (SOx), sulfides, halides, particulate matter such as fly ash and dusts; metals and metal-containing compounds, radioactive materials, and organics. In some embodiments, a flowable composition is placed in a repository. In some embodiments, a flowable composition is placed in a subterranean geological formation. In some embodiments, the geological formation was not suitable for storing super-critical carbon dioxide. In some embodiments, the geological formation was the source of a component of a carbon dioxide sequestration process used to form part of the flowable composition. In some embodiments, the flowable composition is a pumpable composition. A pumpable composition is one such that it can be transported using conduits and pumps from one location to another. In some embodiments the invention provides a flowable composition comprising carbonates, bicarbonates, or a combination thereof wherein the carbon in the carbonates, bicarbonates, or combination thereof has a relative carbon isotope composition ($\delta^{13}C$) value less than −5.00‰, and the viscosity of the composition is between 1 and 2000 cP, e.g., between 10 and 1000 cP. In some embodiments, the composition is a synthetic composition. In some embodiments, the carbonates, bicarbonates, or combination thereof make up at least 10% w/w of the composition. In some embodiments, the CO2 content of the composition is at least 10%. In some embodiments, the composition has a negative carbon footprint. In some embodiments, the composition further comprisies boron, sulfur, or nitrogen wherein the relative isotopic composition of the boron, sulfur, or nitrogen is indicative of a fossil fuel origin. In some embodiments, the carbonates, bicarbonates, or combination thereof comprise calcium, magnesium or a combination thereof, e.g., where calcium to magnesium (Ca/Mg) molar ratio is between 1/200 and 200/1. or 12/1 to 1/15, or 5/1 to 1/10. Other suitable Ca/Mg ratios are as described herein. The composition may further comprise SOx or a derivative thereof, such as a sulfate, sulfite, or combination thereof. The composition may further comprise a metal, such as lead, arsenic, mercury, or cadmium or a combination thereof.

Compositions of the invention find utility, for example, in uses where it is desired to use a material that is, or is likely to, contain carbon of plant origin, e.g., carbon of fossil fuel origin, for example carbon that was part of carbon dioxide that would otherwise have been released into the atmosphere. In some cases an economic incentive may be provided for the use of such materials, e.g., a carbon offset payment. In some cases use of such material may satisfy a government regulatory and/or incentive program.

Methods of making the compositions of the invention include any suitable method by which a carbon with the requisite of $\delta^{13}C$ value may be made. Such methods are described, e.g., in US Published Patent Applications Nos. 2009/0020044 and 2009/0001020, and U.S. patent application Ser. No. 12/344,019, the disclosures of which are hereby incorporated by reference in their entirety. For example, a divalent cation-containing water may be exposed to flue gas from an industrial source, e.g., from a coal-fired power plant or other source where the flue gas contains $CO_2$ containing carbon primarily or entirely of fossil fuel origin. The divalent cation-containing water may be, e.g., seawater, brine, and/or water that has been enriched in divalent cations. Protons are removed from the water by addition of base (e.g., a hydroxide such as sodium hydroxide or base from industrial waste, brines, minerals, or other sources) and/or by electrochemical methods, as further detailed in US Published Patent Applications Nos. 2009/0020044 and 2009/0001020, and U.S. patent application Ser. No. 12/344,019, to drive the reaction toward carbonates, e.g. magnesium and/or calcium carbonates, which may remain in solution or which may precipitate from solution. The precipitate may be further treated, e.g., by drying, pressing, crushing, forming, and the like, as described in the above published patent applications. Carbon negative methods of manufacture, for example methods utilizing low-voltage electrochemical methods of base removal, e.g., electrochemical methods requiring a voltage of less than 2.0 V, or less than 1.5 V, or, in some embodiments, less than 1.0 V, are also described in the above patent applications.

Some methods of producing compositions of the invention are given in more detail below, however, any suitable method may be used. As described in further detail below, the methods and systems of the utilize a source of $CO_2$, a source of proton-removing agents (and/or methods of effecting proton removal), and a source of divalent cations to produce the composition.

Carbon Dioxide

Methods of include contacting a volume of an aqueous solution of divalent cations with a source of $CO_2$, and in the case where a precipitate is desired, subjecting the resultant solution to conditions that facilitate precipitation; in some cases it is desirable to produce a solution or a slurry, e.g., a flowable composition, and precipitation conditions may be eliminated or adjusted accordingly. Methods of the invention thus further may include contacting a volume of an aqueous solution of divalent cations with a source of $CO_2$ while subjecting the aqueous solution to conditions that facilitate precipitation. There may be sufficient carbon dioxide in the divalent cation-containing solution to precipitate significant amounts of bicarbonate and/or carbonate-containing precipitation material (e.g., from seawater or brine); however, additional carbon dioxide is generally used. The source of $CO_2$ may be any convenient $CO_2$ source that contains carbon of the requisite $\delta^{13}C$ value. The $CO_2$ source may be a gas, a liquid, a solid (e.g., dry ice), a supercritical fluid, or $CO_2$ dissolved in a liquid. In some embodiments, the $CO_2$ source is a gaseous $CO_2$ source. The gaseous stream may be substantially pure $CO_2$ or comprise multiple components that include $CO_2$ and one or more additional gases and/or other substances such as ash and other particulates. In some embodiments, the gaseous $CO_2$ source is a waste gas stream (i.e., a by-product of an active process of the industrial plant) such as exhaust from an industrial plant. The nature of the industrial plant may vary, the industrial plants including, but not limited to, power plants, chemical processing plants, mechanical processing plants, refineries, cement plants, steel plants, and other industrial plants that produce $CO_2$ as a by-product of fuel combustion or another processing step (such as calcination by a cement plant).

Waste gas streams comprising $CO_2$ include both reducing (e.g., syngas, shifted syngas, natural gas, hydrogen and the like) and oxidizing condition streams (e.g., flue gases from combustion). Particular waste gas streams that may be convenient for the invention include oxygen-containing combustion industrial plant flue gas (e.g., from coal or another carbon-based fuel with little or no pretreatment of the flue gas), turbo charged boiler product gas, coal gasification product gas, shifted coal gasification product gas, anaerobic digester product gas, wellhead natural gas stream, reformed natural gas or methane hydrates, and the like. Combustion gas from any convenient source may be used in methods and systems of the invention. In some embodiments, combustion gases in post-combustion effluent stacks of industrial plants such as power plants, cement plants, and coal processing plants is used.

Thus, the waste streams may be produced from a variety of different types of industrial plants. Typically, waste streams for the methods include waste streams produced by industrial plants that combust fossil fuels (e.g., coal, oil, natural gas) and anthropogenic fuel products of naturally occurring organic fuel deposits (e.g., tar sands, heavy oil, oil shale, etc.). In some embodiments, a waste stream suitable for systems and methods of the invention is sourced from a coal-fired power plant, such as a pulverized coal power plant, a supercritical coal power plant, a mass burn coal power plant, a fluidized bed coal power plant; in some embodiments, the waste stream is sourced from gas or oil-fired boiler and steam turbine power plants, gas or oil-fired boiler simple cycle gas turbine power plants, or gas or oil-fired boiler combined cycle gas turbine power plants. In some embodiments, waste streams produced by power plants that combust syngas (i.e., gas that is produced by the gasification of organic matter, for example, coal, biomass, etc.) are used. In some embodiments, waste streams from integrated gasification combined cycle (IGCC) plants are used. In some embodiments, waste streams produced by Heat Recovery Steam Generator (HRSG) plants are used in accordance with systems and methods of the invention.

Waste streams produced by cement plants are also suitable for systems and methods of the invention so long as the $\delta^{13}C$ value of the flue gas is in the desired range to produce products with the requisite $\delta^{13}C$ value. Cement plant waste streams include waste streams from both wet process and dry process plants, which plants may employ shaft kilns or rotary kilns, and may include pre-calciners. These industrial plants may each burn a single fuel, or may burn two or more fuels sequentially or simultaneously. Other industrial plants such as smelters and refineries are also useful sources of waste streams that include carbon dioxide.

Industrial waste gas streams may contain carbon dioxide as the primary non-air derived component, or may, especially in the case of coal-fired power plants, contain additional components such as nitrogen oxides (NOx), sulfur oxides (SOx), and one or more additional gases. Additional gases and other components may include CO, mercury and other heavy metals, and dust particles (e.g., from calcining and combustion processes). Additional components in the gas stream may also include halides such as hydrogen chloride and hydrogen fluoride; particulate matter such as fly ash, dusts, and metals including arsenic, beryllium, boron, cadmium, chromium, chromium VI, cobalt, lead, manganese, mercury, molybdenum, selenium, strontium, thallium, and vanadium; and organics such as hydrocarbons, dioxins, and PAH compounds. Suitable gaseous waste streams that may be treated have, in some embodiments, $CO_2$ present in amounts of 200 ppm to 1,000,000 ppm, such as 200,000 ppm to 1000 ppm, including 200,000 ppm to 2000 ppm, for example 180,000 ppm to 2000 ppm, or 180,000 ppm to 5000 ppm, also including 180,000 ppm to 10,000 ppm. The waste streams, particularly various waste streams of combustion gas, may include one or more additional components, for example, water, NOx (mononitrogen oxides: NO and $NO_2$), SOx (monosulfur oxides: SO, $SO_2$ and $SO_3$), VOC (volatile organic compounds), heavy metals such as mercury, and particulate matter (particles of solid or liquid suspended in a gas). Flue gas temperature may also vary. In some embodiments, the temperature of the flue gas comprising $CO_2$ is from 0° C. to 2000° C., such as from 60° C. to 700° C., and including 100° C. to 400° C.

In some embodiments, one or more additional components or co-products (i.e., products produced from other starting materials [e.g., SOx, NOx, etc.] under the same conditions employed to convert $CO_2$ into bicarbonates and/or carbonates) are precipitated or trapped in precipitation material, or in solution or slurry, formed by contacting the waste gas stream comprising these additional components with an aqueous solution comprising divalent cations (e.g., alkaline earth metal ions such as $Ca^{2+}$ and $Mg^{2+}$). Sulfates, sulfites, and the like of calcium and/or magnesium may be precipitated or trapped in precipitation material or solution or slurry (further comprising calcium and/or magnesium bicarbonates and/or carbonates) produced from waste gas streams comprising SOx (e.g., $SO_2$). Magnesium and calcium may react to form $MgSO_4$, $CaSO_4$, respectively, as well as other magnesium-containing and calcium-containing compounds (e.g., sulfites), effectively removing sulfur from the flue gas stream without a desulfurization step such as flue gas desulfurization ("FGD"). In addition, $CaCO_3$, $MgCO_3$, and related compounds may be formed without additional release of $CO_2$. In instances where the aqueous solution of divalent cations contains high levels of sulfur compounds (e.g., sulfate), the aqueous solution may be enriched with calcium and magnesium so that calcium and magnesium are available to form bicarbonate and/or carbonate compounds after, or in addition to, formation of $CaSO_4$, $MgSO_4$, and related compounds. In some embodiments, a desulfurization step may be staged to coincide with precipitation of bicarbonate and/or carbonate-containing precipitation material, or the desulfurization step may be staged to occur before precipitation. In some embodiments, multiple reaction products (e.g., $MgCO_3$, $CaCO_3$, $CaSO_4$, mixtures of the foregoing, and the like) are collected at different stages, while in other embodiments a single reaction product (e.g., precipitation material comprising carbonates, bicarbonates, sulfates and/or sulfites, etc.) is collected. In step with these embodiments, other components, such as heavy metals (e.g., mercury, mercury salts, mercury-containing compounds), may be trapped in the bicarbonate and/or carbonate-containing precipitation material or may precipitate separately, if precipitation is used.

A portion of the gaseous waste stream (i.e., not the entire gaseous waste stream) from an industrial plant may be used to produce solutions, slurries, or precipitation material. In these embodiments, the portion of the gaseous waste stream that is employed in the process may be 75% or less, such as 60% or less, and including 50% and less of the gaseous waste stream. In yet other embodiments, substantially (e.g., 80% or more) the entire gaseous waste stream produced by the industrial plant is employed in precipitation of precipitation material, solution, or slurry. In these embodiments, 80% or more, such as 90% or more, including 95% or more, up to 100% of the gaseous waste stream (e.g., flue gas) generated by the source may be employed for precipitation of precipitation material. Methods of the invention may remove significant portions, or substantially all, of the $CO_2$ from a given $CO_2$ source, e.g., over 30%, 40%, 50%, 60%, 70%, 80%, 90%, 95%, 99%, or even over 99.9% of the $CO_2$ in the $CO_2$ source.

Divalent Cations

Methods of the invention include contacting a volume of an aqueous solution of divalent cations with a source of $CO_2$ and optionally subjecting the resultant solution to conditions that facilitate precipitation. In some embodiments, a volume of an aqueous solution of divalent cations is contacted with a source of $CO_2$ while optionally subjecting the aqueous solution to conditions that facilitate precipitation. Divalent cations may come from any of a number of different divalent cation sources depending upon availability at a particular location. Such sources include industrial wastes, seawater, brines, hard waters, rocks and minerals (e.g., lime, periclase, material comprising metal silicates such as serpentine and olivine), and any other suitable source.

In some locations, industrial waste streams from various industrial processes provide for convenient sources of divalent cations (as well as in some cases other materials useful in the process, e.g., metal hydroxide). Such waste streams include, but are not limited to, mining wastes; fossil fuel burning ash (e.g., combustion ash such as fly ash, bottom ash, boiler slag); slag (e.g. iron slag, phosphorous slag); cement kiln waste; oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge. Fossil fuel burning ash, cement kiln dust, and slag, collectively waste sources of metal oxides, further described in U.S. patent application Ser. No. 12/486,692, filed 17 Jun. 2009, the disclosure of which is incorporated herein in its entirety. It will be appreciated that some of these sources, e.g., coal seam wastes, flyash, are themselves sources of carbon with a negative $\delta^{13}C$ value; others may contribute carbon at a somewhat higher value than that found in fossil fuels but their addition does not necessarily significantly alter the $\delta^{13}C$ value of the final product, e.g., change it away from the values described herein (see Examples for specific details). Any of the divalent cations sources described herein may be mixed and matched for the purpose of practicing the invention. For example, material comprising metal silicates (e.g. serpentine, olivine), which are further described in U.S. patent application Ser. No. 12/501,217, filed 10 Jul. 2009, which application is herein incorporated by reference, may be combined with any of the sources of divalent cations described herein for the purpose of practicing the invention.

In some locations, a convenient source of divalent cations for preparation of a composition of the invention is water (e.g., an aqueous solution comprising divalent cations such as seawater or surface brine), which may vary depending upon the particular location at which the invention is practiced. Suitable aqueous solutions of divalent cations that may be used include solutions comprising one or more divalent cations, e.g., alkaline earth metal cations such as $Ca^{2+}$ and $Mg^{2+}$. In some embodiments, the aqueous source of divalent cations comprises alkaline earth metal cations. In some embodiments, the alkaline earth metal cations include calcium, magnesium, or a mixture thereof. In some embodiments, the aqueous solution of divalent cations comprises calcium in amounts ranging from 50 to 50,000 ppm, 50 to 40,000 ppm, 50 to 20,000 ppm, 100 to 10,000 ppm, 200 to 5000 ppm, or 400 to 1000 ppm. In some embodiments, the aqueous solution of divalent cations comprises magnesium in amounts ranging from 50 to 40,000 ppm, 50 to 20,000 ppm, 100 to 10,000 ppm, 200 to 10,000 ppm, 500 to 5000 ppm, or 500 to 2500 ppm. In some embodiments, where $Ca^{2+}$ and $Mg^{2+}$ are both present, the ratio of $Ca^{2+}$ to $Mg^{2+}$ (i.e., $Ca^{2+}:Mg^{2+}$) in the aqueous solution of divalent cations is between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, in some embodiments, the ratio of $Ca^{2+}$ to $Mg^{2+}$ in the aqueous solution of divalent cations is between 1:1 and 1:10; 1:5 and 1:25; 1:10 and 1:50; 1:25 and 1:100; 1:50 and 1:500; or 1:100 and 1:1000. In some embodiments, the ratio of $Mg^{2+}$ to $Ca^{2+}$ (i.e., $Mg^{2+}:Ca^{2+}$) in the aqueous solution of divalent cations is between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, in some embodiments, the ratio of $Mg^{2+}$ to $Ca^{2+}$ in the aqueous solution of divalent cations is between 1:1 and 1:10; 1:5 and 1:25; 1:10 and 1:50; 1:25 and 1:100; 1:50 and 1:500; or 1:100 and 1:1000.

The aqueous solution of divalent cations may comprise divalent cations derived from freshwater, brackish water, seawater, or brine (e.g., naturally occurring brines or anthropogenic brines such as geothermal plant wastewaters, desalination plant waste waters), as well as other salines having a salinity that is greater than that of freshwater, any of which may be naturally occurring or anthropogenic. Brackish water is water that is saltier than freshwater, but not as salty as seawater. Brackish water has a salinity ranging from about 0.5 to about 35 ppt (parts per thousand). Seawater is water from a sea, an ocean, or any other saline body of water that has a salinity ranging from about 35 to about 50 ppt. Brine is water saturated or nearly saturated with salt. Brine has a salinity that is about 50 ppt or greater. In some embodiments, the water source from which divalent cations are derived is a mineral rich (e.g., calcium-rich and/or magnesium-rich) freshwater source. In some embodiments, the water source from which divalent cations are derived is a naturally occurring saltwater source selected from a sea, an ocean, a lake, a swamp, an estuary, a lagoon, a surface brine, a deep brine, an alkaline lake, an inland sea, or the like. In some embodiments, the water source from which divalent cation are derived is an anthropogenic brine selected from a geothermal plant wastewater or a desalination wastewater.

Freshwater is often a convenient source of divalent cations (e.g., cations of alkaline earth metals such as $Ca^{2-}$ and $Mg^{2+}$). Any of a number of suitable freshwater sources may be used, including freshwater sources ranging from sources relatively free of minerals to sources relatively rich in minerals. Mineral-rich freshwater sources may be naturally occurring, including any of a number of hard water sources, lakes, or inland seas. Some mineral-rich freshwater sources such as alkaline lakes or inland seas (e.g., Lake Van in Turkey) also provide a source of pH-modifying agents. Mineral-rich freshwater sources may also be anthropogenic. For example, a mineral-poor (soft) water may be contacted with a source of divalent cations such as alkaline earth metal cations (e.g., $Ca^{2+}$, $Mg^{2+}$, etc.) to produce a mineral-rich water that is suitable for methods and systems described herein. Divalent cations or precursors thereof (e.g. salts, minerals) may be added to freshwater (or any other type of water described herein) using any convenient protocol (e.g., addition of solids, suspensions, or solutions). In some embodiments, divalent cations selected from $Ca^{2+}$ and $Mg^{2+}$ are added to freshwater. In some embodiments, monovalent cations selected from Na+ and K+ are added to freshwater. In some embodiments, freshwater comprising $Ca^{2+}$ is combined with combustion ash (e.g., fly ash, bottom ash, boiler slag), or products or processed forms thereof, yielding a solution comprising calcium and magnesium cations.

In some embodiments, an aqueous solution of divalent cations may be obtained from an industrial plant that is also providing a combustion gas stream. For example, in water-cooled industrial plants, such as seawater-cooled industrial plants, water that has been used by an industrial plant for cooling may then be used as water for producing solutions, slurries, or solid precipitation material. If desired, the water may be cooled prior to entering a system of the invention. Such approaches may be employed, for example, with once-through cooling systems. For example, a city or agricultural water supply may be employed as a once-through cooling system for an industrial plant. Water from the industrial plant may then be employed for producing solutions, slurries, or precipitation material, wherein output water has a reduced hardness and greater purity.

Proton-Removing Agents and Methods for Effecting Proton Removal

Methods of the invention include contacting a volume of an aqueous solution of divalent cations with a source of $CO_2$ (to dissolve $CO_2$) and optionally subjecting the resultant solution to conditions that facilitate precipitation. In some embodiments, a volume of an aqueous solution of divalent cations is contacted with a source of $CO_2$ (to dissolve $CO_2$) while optionally subjecting the aqueous solution to conditions that facilitate precipitation. The dissolution of $CO_2$ into the aqueous solution of divalent cations produces carbonic acid, a species in equilibrium with both bicarbonate and carbonate. In order to produce bicarbonate and especially carbonate-containing material, e.g., suitable for precipitation, protons are removed from various species (e.g. carbonic acid, bicarbonate, hydronium, etc.) in the divalent cation-containing solution to shift the equilibrium toward carbonate. As protons are removed, more $CO_2$ goes into solution. In some embodiments, proton-removing agents and/or methods are used while contacting a divalent cation-containing aqueous solution with $CO_2$ to increase $CO_2$ absorption in one phase of the reaction, wherein the pH may remain constant, increase, or even decrease, followed by a rapid removal of protons (e.g., by addition of a base) to, e.g., cause rapid precipitation of carbonate-containing precipitation material. Protons may be removed from the various species (e.g. carbonic acid, bicarbonate, hydronium, etc.) by any convenient approach, including, but not limited to use of naturally occurring proton-removing agents, use of microorganisms and fungi, use of synthetic chemical proton-removing agents, recovery of man-made waste streams, and using electrochemical means.

Naturally occurring proton-removing agents encompass any proton-removing agents that can be found in the wider environment that may create or have a basic local environment. Some embodiments provide for naturally occurring proton-removing agents including minerals that create basic environments upon addition to solution. Such minerals include, but are not limited to, lime (CaO); periclase (MgO); iron hydroxide minerals (e.g., goethite and limonite); and volcanic ash. Methods for digestion of such minerals and rocks comprising such minerals are provided herein. Some embodiments provide for using naturally alkaline bodies of water as naturally occurring proton-removing agents. Examples of naturally alkaline bodies of water include, but are not limited to surface water sources (e.g. alkaline lakes such as Mono Lake in Calif.) and ground water sources (e.g. basic aquifers such as the deep geologic alkaline aquifers located at Searles Lake in Calif.). Other embodiments provide for use of deposits from dried alkaline bodies of water such as the crust along Lake Natron in Africa's Great Rift Valley. In some embodiments, organisms that excrete basic molecules or solutions in their normal metabolism are used as proton-removing agents. Examples of such organisms are fungi that produce alkaline protease (e.g., the deep-sea fungus *Aspergillus ustus* with an optimal pH of 9) and bacteria that create alkaline molecules (e.g., cyanobacteria such as *Lyngbya* sp. from the Atlin wetland in British Columbia, which increases pH from a byproduct of photosynthesis). In some embodiments, organisms are used to produce proton-removing agents, wherein the organisms (e.g., *Bacillus pasteurii*, which hydrolyzes urea to ammonia) metabolize a contaminant (e.g. urea) to produce proton-removing agents or solutions comprising proton-removing agents (e.g., ammonia, ammonium hydroxide). In some embodiments, organisms are cultured separately from the reaction mixture, wherein proton-removing agents or solution comprising proton-removing agents are used for addition to the reaction mixture. In some embodiments, naturally occurring or manufactured enzymes are used in combination with proton-removing agents. Carbonic anhydrase, which is an enzyme produced by plants and animals, accelerates transformation of carbonic acid to bicarbonate in aqueous solution. As such, carbonic anhydrase may be used to enhance dissolution of $CO_2$ and, e.g., accelerate precipitation of precipitation material if precipitation is used.

Chemical agents for effecting proton removal generally refer to synthetic chemical agents that are produced in large quantities and are commercially available. For example, chemical agents for removing protons include, but are not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide ($Ca(OH)_2$), or magnesium hydroxide ($Mg(OH)_2$). Organic bases are carbon-containing molecules that are generally nitrogenous bases including primary amines such as methyl amine, secondary amines such as diisopropylamine, tertiary such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phophazene is used to remove protons from various species (e.g., carbonic acid, bicarbonate, hydronium, etc.), e.g., for precipitation of precipitation material. In some embodiments, ammonia is used to raise pH to a level sufficient to precipitate precipitation material from a solution of divalent cations and an industrial waste stream. Super bases suitable for use as proton-removing agents include sodium ethoxide, sodium amide ($NaNH_2$), sodium hydride (NaH), butyl lithium, lithium diisopropylamide, lithium diethylamide, and lithium bis(trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used. Carbonates for use in the invention include, but are not limited to, sodium carbonate.

In addition to comprising cations of interest and other suitable metal forms, waste streams from various industrial processes may provide proton-removing agents. Such waste streams include, but are not limited to, mining wastes; fossil fuel burning ash (e.g., combustion ash such as fly ash, bottom ash, boiler slag); slag (e.g. iron slag, phosphorous slag); cement kiln waste; oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge. Mining wastes include any wastes from the extraction of metal or another precious or useful mineral from the earth. In some embodiments, wastes from mining are used to modify pH, wherein the waste is selected from red mud from the Bayer aluminum extraction process; waste from magnesium extraction from seawater (e.g., $Mg(OH)_2$ such as that found in Moss Landing, Calif.); and wastes from mining processes involving leaching. For example, red mud may be used to modify pH as described in U.S. Provisional Patent Application No. 61/161369, filed 18 Mar. 2009, which is incorporated herein by reference in its entirety. Fossil fuel burning ash, cement kiln dust, and slag, collectively waste sources of metal oxides, further described in U.S. patent application Ser. No. 12/486692, filed 17 Jun. 2009, the disclosure of which is incorporated herein in its entirety, may be used in alone or in combination with other proton-removing agents to provide proton-removing agents for the invention. Agricultural waste, either through animal waste or excessive fertilizer use, may contain potassium hydroxide (KOH) or ammonia ($NH_3$) or both. As such, agricultural waste may be used in some embodiments of the invention as a proton-removing agent. This agricultural waste is often collected in ponds, but it may also percolate down into aquifers, where it can be accessed and used.

Electrochemical methods are another means to remove protons from various species in a solution, either by removing protons from solute (e.g., deprotonation of carbonic acid or bicarbonate) or from solvent (e.g., deprotonation of hydronium or water). Deprotonation of solvent may result, for example, if proton production from $CO_2$ dissolution matches or exceeds electrochemical proton removal from solute molecules. In some embodiments, low-voltage electrochemical methods are used to remove protons, for example, as $CO_2$ is dissolved in the reaction mixture or a precursor solution to the reaction mixture (i.e., a solution that may or may not contain divalent cations). In some embodiments, $CO_2$ dissolved in an aqueous solution that does not contain divalent cations is treated by a low-voltage electrochemical method to remove protons from carbonic acid, bicarbonate, hydronium, or any species or combination thereof resulting from the dissolution of $CO_2$. A low-voltage electrochemical method operates at an average voltage of 2, 1.9, 1.8, 1.7, or 1.6 V or less, such as 1.5, 1.4, 1.3, 1.2, 1.1 V or less, such as 1 V or less, such as 0.9 V or less, 0.8 V or less, 0.7 V or less, 0.6 V or less, 0.5 V or less, 0.4 V or less, 0.3 V or less, 0.2 V or less, or 0.1 V or less. Low-voltage electrochemical methods that do not generate chlorine gas are convenient for use in systems and methods of the invention. Low-voltage electrochemical methods to remove protons that do not generate oxygen gas are also convenient for use in systems and methods of the invention. In some embodiments, low-voltage electrochemical methods generate hydrogen gas at the cathode and transport it to the anode where the hydrogen gas is converted to protons. Electrochemical methods that do not generate hydrogen gas may also be convenient. In some instances, electrochemical methods to remove protons do not generate any gaseous by-byproduct. Electrochemical methods for effecting proton removal are further described in U.S. patent application Ser. No. 12/344,019, filed 24 Dec. 2008; U.S. patent application Ser. No. 12/375,632, filed 23 Dec. 2008; International Patent Application No. PCT/US08/088242, filed 23 Dec. 2008; International Patent Application No. PCT/US09/32301, filed 28 Jan. 2009; and International Patent Application No. PCT/US09/48511, filed 24 Jun. 2009, each of which are incorporated herein by reference in their entirety.

Alternatively, electrochemical methods may be used to produce caustic molecules (e.g., hydroxide) through, for example, the chlor-alkali process, or modification thereof. Electrodes (i.e., cathodes and anodes) may be present in the apparatus containing the divalent cation-containing aqueous solution or gaseous waste stream-charged (e.g., $CO_2$-charged) solution, and a selective barrier, such as a membrane, may separate the electrodes. Electrochemical systems and methods for removing protons may produce by-products (e.g., hydrogen) that may be harvested and used for other purposes. Additional electrochemical approaches that may be used in systems and methods of the invention include, but are not limited to, those described in U.S. Provisional Patent Application No. 61/081,299, filed 16 Jul. 2008, and U.S. Provisional Patent Application No. 61/091,729, the disclosures of which are incorporated herein by reference. Combinations of the above mentioned sources of proton-removing agents and methods for effecting proton removal may be employed.

Methods of Combining and Processing Reactants

A variety of different methods may be employed to prepare the compositions of the invention. Protocols of interest include, but are not limited to, those disclosed in U.S. patent application Ser. No. 12/126,776, filed 23 May 2008; Ser. No. 12/163,205, filed 27 Jun. 2008; Ser. No. 12/344,019, filed 24 Dec. 2008; and Ser. No. 12/475,378, filed 29 May 2009, as well as U.S. Provisional Patent Application Ser. No. 61/017,405, filed 28 Dec. 2007; 61/017,419, filed 28 Dec. 2007; 61/057,173, filed 29 May 2008; 61/056,972, filed 29 May 2008; 61/073,319, filed 17 Jun. 2008; 61/079,790, 10 Jul. 2008; 61/081,299, filed 16 Jul. 2008; 61/082,766, filed 22 Jul. 2008; 61/088,347, filed 13 Aug. 2008; 61/088,340, filed 12

Aug. 2008; 61/101,629, filed 30 Sep. 2008; and 61/101,631, filed 30 Sep. 2008; the disclosures of which are incorporated herein by reference.

Compositions of the invention include bicarbonate and carbonate compositions that may be produced in solution or slurry or by precipitating a calcium and/or magnesium bicarbonate or carbonate composition from a solution of divalent cations. The bicarbonate and/or carbonate compound compositions that make up the components of the invention include metastable carbonate compounds that may be precipitated from a solution of divalent cations, such as a saltwater, as described in greater detail below. The bicarbonate and/or carbonate compound compositions of the invention include precipitated crystalline and/or amorphous bicarbonate and carbonate compounds.

Saltwater-derived bicarbonate and/or carbonate compound compositions of the invention (i.e., compositions derived from saltwater and made up of one or more different carbonate crystalline and/or amorphous compounds with or without one or more hydroxide crystalline or amorphous compounds) are ones that are derived from a saltwater. As such, they are compositions that are obtained from a saltwater in some manner, e.g., by treating a volume of a saltwater in a manner sufficient to produce the desired bicarbonate and/or or carbonate compound composition from the initial volume of saltwater. The bicarbonate and/or carbonate compound compositions of certain embodiments are produced by,e.g., precipitation from a solution of divalent cations (e.g., a saltwater) that includes alkaline earth metal cations, such as calcium and magnesium, etc., where such solutions of divalent cations may be collectively referred to as alkaline earth metal-containing waters.

The saltwater employed in methods may vary. As reviewed above, saltwater of interest include brackish water, seawater and brine, as well as other salines having a salinity that is greater than that of freshwater (which has a salinity of less than 5 ppt dissolved salts). In some embodiments, calcium rich waters may be combined with magnesium silicate minerals, such as olivine or serpentine, in solution that has become acidic due to the addition on carbon dioxide to form carbonic acid, which dissolves the magnesium silicate, leading to the formation of calcium magnesium silicate carbonate compounds as mentioned above.

In methods of producing the bicarbonate and/or carbonate compound compositions of the invention, a volume of water is optionally subjected to bicarbonate/carbonate compound precipitation conditions sufficient to produce a solution of bicarbonate and/or carbonate-containing solution which can then be used to produce precipitation material and a mother liquor (i.e., the part of the water that is left over after precipitation of the bicarbonate and/or carbonate compound(s) from the saltwater), if desired. The resultant precipitation material and mother liquor may collectively make up the bicarbonate and/or carbonate compound compositions of the invention (e.g., as a slurry) or may be separated into precipitate and mother liquor, each or both of which may also be compositions of the invention (e.g., solid and solution compositions). Any convenient precipitation conditions may be employed, which conditions result in the production of a barcarbonate/carbonate compound composition.

For precipitated compounds, conditions that facilitate precipitation (i.e., precipitation conditions) may vary. For example, the temperature of the water may be within a suitable range for the precipitation of the desired mineral to occur. In some embodiments, the temperature of the water may be in a range from 5 to 70° C., such as from 20 to 50° C. and including from 25 to 45° C. As such, while a given set of precipitation conditions may have a temperature ranging from 0 to 100° C., the temperature of the water may have to be adjusted in certain embodiments to produce the desired precipitation material.

For carbonate compounds, in normal seawater, 93% of the dissolved $CO_2$ is in the form of bicarbonate ions ($HCO_3^-$) and 6% is in the form of carbonate ions ($CO_3^{2-}$). When calcium carbonate precipitates from normal seawater, $CO_2$ is released. In fresh water, above pH 10.33, greater than 90% of the carbonate is in the form of carbonate ion, and no $CO_2$ is released during the precipitation of calcium carbonate. In seawater this transition occurs at a slightly lower pH, closer to a pH of 9.7. While the pH of the water employed in methods may range from 5 to 14 during a given precipitation process, in certain embodiments the pH is raised to alkaline levels in order to drive the precipitation of carbonate compounds, as well as other compounds, e.g., hydroxide compounds, as desired. In certain of these embodiments, the pH is raised to a level that minimizes if not eliminates $CO_2$ production during precipitation, causing dissolved $CO_2$, e.g., in the form of carbonate and bicarbonate, to be trapped in the precipitation material. In these embodiments, the pH may be raised to 10 or higher, such as 11 or higher.

The pH of the water may be raised using any convenient approach. In certain embodiments, a proton-removing agent is employed, where examples of such agents include oxides, hydroxides (e.g., calcium oxide in fly ash, potassium hydroxide, sodium hydroxide, brucite ($Mg(OH)_2$), etc.), carbonates (e.g., sodium carbonate), and the like, many of which are described above. One such approach for raising the pH of the precipitation reaction mixture or precursor thereof (e.g., divalent cation-containing solution) is to use the coal ash from a coal-fired power plant, which contains many oxides. Other coal processes, like the gasification of coal, to produce syngas, also produce hydrogen gas and carbon monoxide, and may serve as a source of hydroxide as well. Some naturally occurring minerals, such as serpentine, contain hydroxide and may be dissolved to yield a source of hydroxide. The addition of serpentine also releases silica and magnesium into the solution, leading to the formation of silica-containing precipitation material. The amount of proton-removing agent that is added to the reaction mixture or precursor thereof will depend on the particular nature of the proton-removing agent and the volume of the reaction mixture or precursor thereof being modified, and will be sufficient to raise the pH of the reaction mixture or precursor thereof to the desired pH. Alternatively, the pH of the reaction mixture or precursor thereof may be raised to the desired level by electrochemical means as described above. Additional electrochemical methods may be used under certain conditions. For example, electrolysis may be employed, wherein the mercury cell process (also called the Castner-Kellner process); the diaphragm cell process, the membrane cell process, or some combination thereof is used. Where desired, byproducts of the hydrolysis product, e.g., $H_2$, sodium metal, etc. may be harvested and employed for other purposes, as desired. In yet other embodiments, the pH-elevating approach described in U.S. Provisional Patent Application No. 61/081,299, filed 16 Jul. 2008, and 61/091,729, filed 25 Aug. 2008, may be employed, the disclosures of which are incorporated herein by reference.

Additives other than pH-elevating agents may also be introduced into the water in order to influence the nature of the material that is produced. As such, certain embodiments of the methods include providing an additive in water before or during the time when the water is subjected to the precipitation conditions. Certain calcium carbonate polymorphs can be favored by trace amounts of certain additives. For example, vaterite, a highly unstable polymorph of $CaCO_3$, which precipitates in a variety of different morphologies and converts rapidly to calcite, can be obtained at very high yields by including trace amounts of lanthanum as lanthanum chloride in a supersaturated solution of calcium carbonate. Other additives beside lanthanum that are of interest include, but are not limited to transition metals and the like. For instance, the addition of ferrous or ferric iron is known to favor the formation of disordered dolomite (protodolomite) where it would not form otherwise.

The nature of the precipitation material can also be influenced by selection of appropriate major ion ratios. Major ion ratios also have considerable influence of polymorph formation. For example, as the magnesium:calcium ratio in the water increases, aragonite becomes the favored polymorph of calcium carbonate over low-magnesium calcite. At low magnesium:calcium ratios, low-magnesium calcite is the preferred polymorph. As such, a wide range of magnesium: calcium ratios can be employed, including, for example, 100:1, 50:1, 20:1, 10:1, 5:1, 2:1, 1:1, 1:2, 1:5, 1:10, 1:20, 1:50, 1:100, or any of the ratios mentioned above. In certain embodiments, the magnesium:calcium ratio is determined by the source of water employed in the precipitation process (e.g., seawater, brine, brackish water, fresh water), whereas in other embodiments, the magnesium:calcium ratio is adjusted to fall within a certain range.

Rate of precipitation also has a large effect on compound phase formation. The most rapid precipitation can be achieved by seeding the solution with a desired phase. Without seeding, rapid precipitation can be achieved by rapidly increasing the pH of the seawater, which results in more amorphous constituents. When silica is present, the more rapid the reaction rate, the more silica is incorporated in the carbonate-containing precipitation material. The higher the pH is, the more rapid the precipitation is and the more amorphous the precipitation material.

Accordingly, a set of precipitation conditions to produce a desired precipitation material from a solution of divalent cations includes, in certain embodiments, the water's temperature and pH, and in some instances, the concentrations of additives and ionic species in the water. Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare bicarbonate and/or carbonate-containing precipitation material according to the invention may be batch or continuous protocols. It will be appreciated that precipitation conditions may be different to produce a given precipitation material in a continuous flow system compared to a batch system.

In certain embodiments, the methods further include contacting the volume of water that is subjected to the mineral precipitation conditions with a source of $CO_2$. Contact of the water with the source $CO_2$ may occur before and/or during the time when the water is subjected to $CO_2$ precipitation conditions. Accordingly, embodiments of the invention include methods in which the volume of water is contacted with a source of $CO_2$ prior to subjecting the volume of saltwater to mineral precipitation conditions. Embodiments of the invention include methods in which the volume of saltwater is contacted with a source of $CO_2$ while the volume of saltwater is being subjected to bicarbonate and/or carbonate compound precipitation conditions. Embodiments of the invention include methods in which the volume of water is contacted with a source of a $CO_2$ both prior to subjecting the volume of saltwater to bicarbonate and/or carbonate compound precipitation conditions and while the volume of saltwater is being subjected to bicarbonate and/or carbonate compound precipitation conditions. In some embodiments, the same water may be cycled more than once, wherein a first cycle of precipitation removes primarily calcium carbonate and magnesium carbonate minerals, and leaves remaining alkaline water to which other alkaline earth ion sources may be added, that can have more carbon dioxide cycled through it, precipitating more carbonate compounds.

The source of $CO_2$ that is contacted with the volume of saltwater in these embodiments may be any convenient $CO_2$ source of the requisite $\delta^{13}C$ value, and the contact protocol may be any convenient protocol. Where the $CO_2$ is a gas, contact protocols of interest include, but are not limited to: direct contacting protocols, e.g., bubbling the gas through the volume of saltwater, concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient. For exemplary system and methods for contacting the solution of divalent cations with the source of CO2, see U.S. Provisional Patent Application No. 61/158,992, filed 10 Mar. 2009; 61/168,166, filed 9 Apr. 2009; 61/170,086, filed 16 Apr. 2009; 61/178,475, filed 14 May 2009; 61/228,210, filed 24 Jul. 2009; 61/230,042, filed 30 Jul. 2009; and 61/239,429, filed 2 Sep. 2009, each of which is incorporated herein by reference.

The above protocol results in the production of a slurry of a precipitation material and a mother liquor. Where desired, the compositions made up of the precipitation material and the mother liquor may be stored for a period of time following precipitation and prior to further processing, or may not be processed any further or minimally processed and may be used as a slurry, e.g., as a flowable composition, for storage, disposal, or other use. If desired, the flowable composition may be pumped underground for long-term sequestration of the $CO_2$ contained in the precipitated and/or soluble components. Alternatively, the slurry may be stored for later use. For example, the composition may be stored for a period of time ranging from 1 to 1000 days or longer, such as 1 to 10 days or longer, at a temperature ranging from 1 to 40° C., such as 20 to 25° C.

If further treatment is desired, the slurry components may then be separated. Embodiments may include treatment of the mother liquor, where the mother liquor may or may not be present in the same composition as the product. For example, where the mother liquor is to be returned to the ocean, the mother liquor may be contacted with a gaseous source of $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ source is carried out in a manner sufficient to reduce the pH to a range between 5 and 9, e.g., 6 and 8.5, including 7.5 to 8.2. In certain embodiments, the treated brine may be contacted with a source of $CO_2$, e.g., as described above, to sequester further $CO_2$. For example, where the mother liquor is to be returned to the ocean, the mother liquor may be contacted with a gaseous source of $CO_2$ in a manner sufficient to increase the concentration of carbonate ion present in the mother liquor.

Contact may be conducted using any convenient protocol, such as those described above. In certain embodiments, the mother liquor has an alkaline pH, and contact with the $CO_2$ source is carried out in a manner sufficient to reduce the pH to a range between 5 and 9, e.g., 6 and 8.5, including 7.5 to 8.2.

The resultant mother liquor of the reaction may be itself a solution that is a composition of the invention. In some embodiments, the mother liquor may be disposed of using any convenient protocol. In certain embodiments, it may be sent to a tailings pond for disposal. In certain embodiments, it may be disposed of in a naturally occurring body of water, e.g., ocean, sea, lake or river. In certain embodiments, the mother liquor is returned to the source of feed water for the methods of invention, e.g., an ocean or sea. Alternatively, the mother liquor may be further processed, e.g., subjected to desalination protocols, as described further in U.S. application Ser. No. 12/163,205; the disclosure of which is herein incorporated by reference.

In certain embodiments, following production of the product, the resultant product is separated from the mother liquor to produce separated product. Separation of the product can be achieved using any convenient approach, including a mechanical approach, e.g., where bulk excess water is drained from the product, e.g., either by gravity alone or with the addition of vacuum, mechanical pressing, by filtering the product from the mother liquor to produce a filtrate, etc. Separation of bulk water produces, in certain embodiments, a wet, dewatered precipitation material. In some embodiments, the dewatered precipitation material is more than 5% water, more than 10% water, more than 20% water, more than 30% water, more than 50% water, more than 60% water, more than 70% water, more than 80% water, more than 90% water, or more than 95% water.

The resultant dewatered precipitation material may then be dried, as desired, to produce a dried product. Drying can be achieved by air drying the wet precipitation material. Where the wet precipitation material is air dried, air drying may be at room or elevated temperature. In yet another embodiment, the wet precipitation material is spray dried to dry the precipitation material, where the liquid containing the precipitation material is dried by feeding it through a hot gas (such as the gaseous waste stream from the power plant), e.g., where the liquid feed is pumped through an atomizer into a main drying chamber and a hot gas is passed as a co-current or counter-current to the atomizer direction. Depending on the particular drying protocol of the system, the drying station may include a filtration element, freeze drying structure, spray drying structure, etc. Where desired, the dewatered precipitation material product may be washed before drying. The precipitation material may be washed with freshwater, e.g., to remove salts (such as NaCl) from the dewatered precipitation material.

In certain embodiments, the precipitation material is refined (i.e., processed) in some manner prior to subsequent use. Refinement may include a variety of different protocols. In certain embodiments, the product is subjected to mechanical refinement, e.g., grinding, in order to obtain a product with desired physical properties, e.g., particle size, etc.

EXAMPLES

Example 1

Measurement of $\delta^{13}C$ Value for a Solid Precipitate and Starting Materials This Example demonstrates precipitation of carbonate material from saline solution using bottled carbon dioxide ($CO_2$) and a magnesium rich industrial waste material and determination of $\delta^{13}C$ values for materials and product. The procedure was conducted in a container open to the atmosphere.

The starting materials were commercially available bottled $CO_2$ gas, seawater, and brucite tailings from a magnesium hydroxide production site as the industrial waste source of base. The brucite tailings were approximately 85% $Mg(OH)_2$, 12% $CaCO_3$ and 3% $SiO_2$ as determined by a Rietveld analysis of the x-ray diffraction pattern of a dry aliquot of the tailings.

Figure 3:
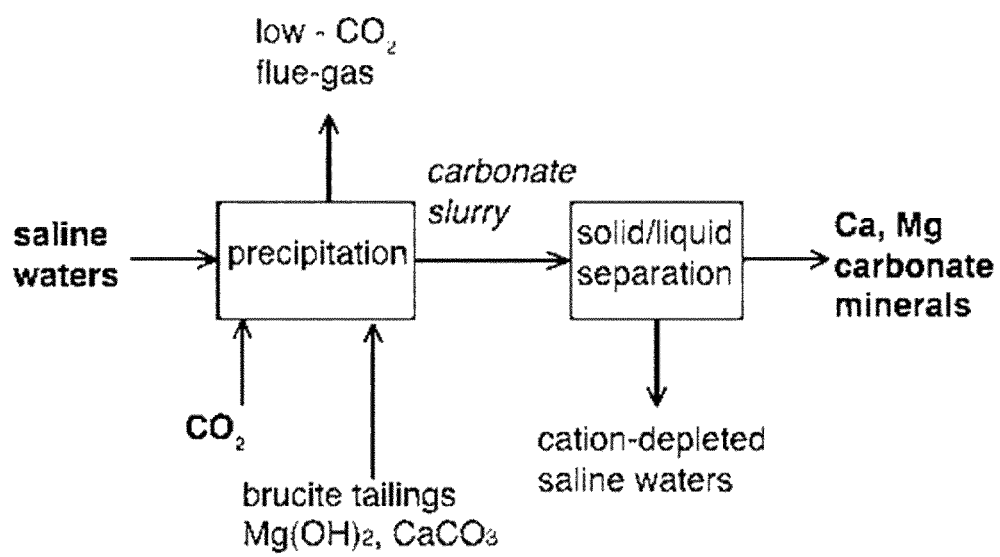
FIG. 3 provides a diagram of the production of precipitate material from carbon dioxide containing gas and brucite tailings on the laboratory scale. Indicated in the diagram are the materials (gas, liquid, and solid) that were characterized.

A container was filled with locally available seawater (around Santa Cruz, Calif.). Brucite tailings were added to the seawater, providing a pH (alkaline) and divalent cation concentration suitable for carbonate precipitation and $CO_2$ gas was sparged into the alkaline seawater solution. Sufficient time was allowed for interaction of the components of the reaction, after which the precipitate material was separated from the remaining seawater solution, also known as the supernatant solution. The precipitate carbonate material was dried at 40° C. in air. See FIG. 3. The resulting powder was suitable, with further processing, for use, e.g., as a material in the built environment, such as aggregate for use in a road bed, concrete, or the like. The powder could also have been stored as it was produced, as a carbon-sequestering storage material. Alternatively, the material could have been left in the supernatant solution and stored, optionally after equilibration with atmospheric air, as a slurry, where both the precipitate and the carbonates and bicarbonates in solution serve as carbon-sequestering materials. Other uses for the material are as described herein, and would be apparent to one of skill in the art. The carbonate material was characterized using $\delta^{13}C$ analysis, x-ray diffraction (XRD) analysis, and scanning electron microscopy (SEM).

Figure 2:
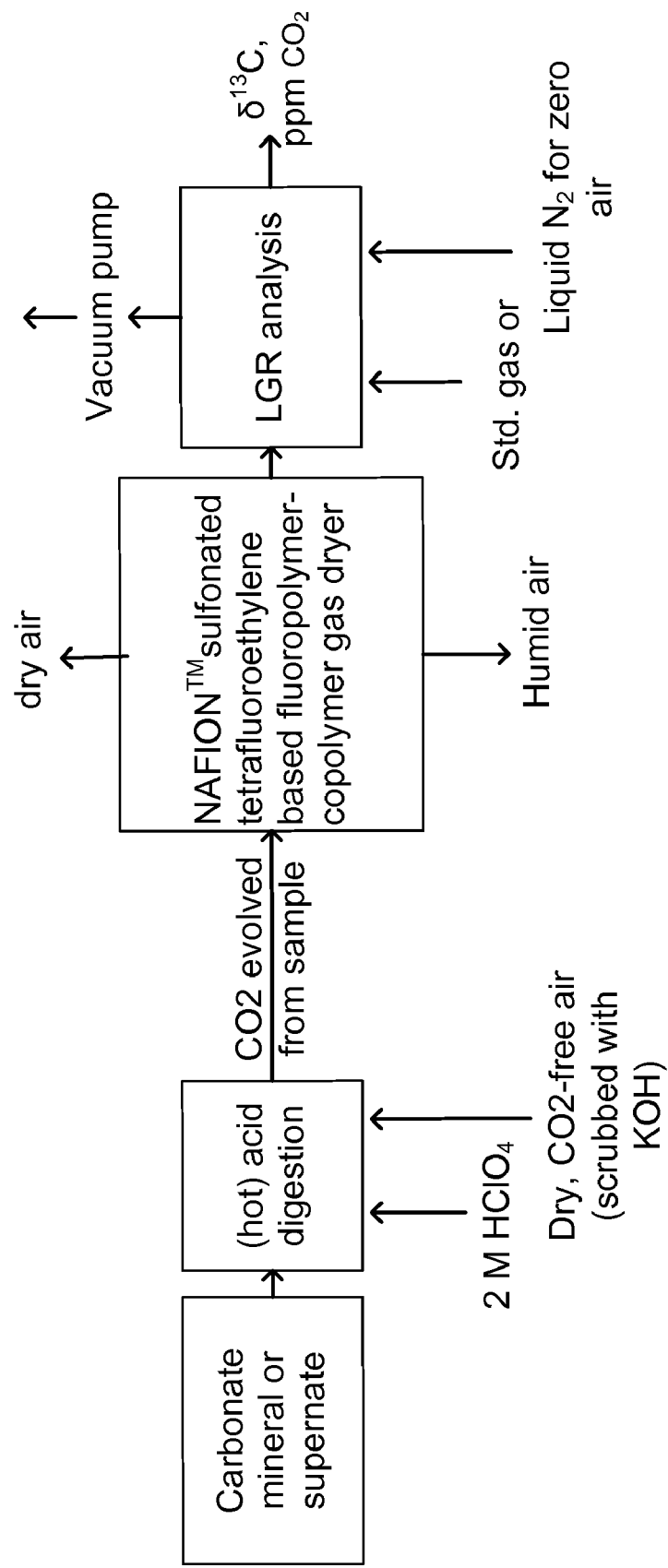
FIG. 2 provides a diagram of the method of preparing samples for analysis with bench-top instrumentation used to obtain $\delta^{13}C$ values.

$\delta^{13}C$ values for the process starting materials, precipitate carbonate material and supernatant solution were measured. The $\delta^{13}C$ value for the atmospheric air was not measured, but a value from literature is given in Table 2. The analysis system used was manufactured by Los Gatos Research and uses direct absorption spectroscopy to provide $\delta^{13}C$ and concentration data for dry gases ranging from 2% to 20% $CO_2$. The instrument was calibrated using standard 5% $CO_2$ gases with known isotopic composition, and measurements of $CO_2$ evolved from samples of travertine and IAEA marble #20 digested in 2M perchloric acid yielded values that were within acceptable measurement error of the values found in literature. The $CO_2$ source gas was sampled using a syringe. The $CO_2$ gas was passed through a gas dryer (Perma Pure MD Gas Dryer, Model MD-110-48F-4 made of Nafion® polymer), then into the bench-top commercially available carbon isotope analysis system. Solid samples, such as the brucite tailings and precipitate, were first digested with heated perchloric acid (2M $HClO_4$). $CO_2$ gas was evolved from the closed digestion system, and then passed into the gas dryer. From there, the gas was collected and injected into the analysis system, resulting in $\delta^{13}C$ data. This digestion process is shown in FIG. 2. Similarly, the supernatant solution was digested to evolve $CO_2$ gas that was then dried and passed to the analysis instrument resulting in $\delta^{13}C$ data.

Figure 7:
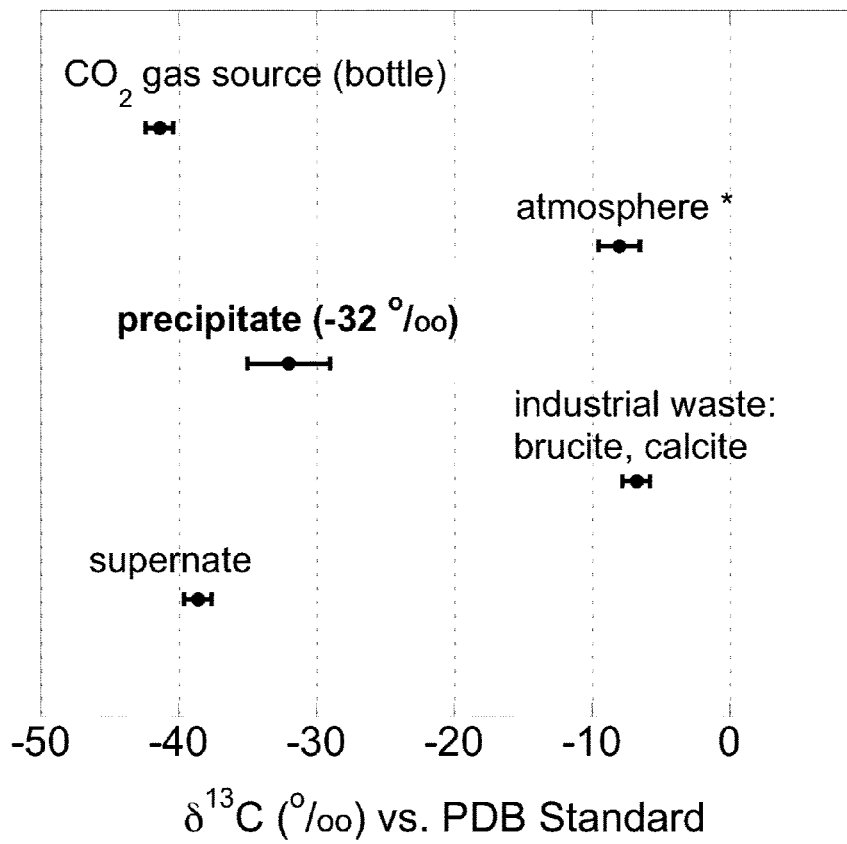
FIG. 7 provides a comparison $\delta^{13}C$ of data from literature, the source of the carbon dioxide containing gas, the industrial waste, precipitate, and supernate from a laboratory scale process using brucite tailings as the industrial waste.

Measurements from the analysis of the $CO_2$ source, industrial waste (brucite tailings), carbonate precipitate, and supernatant solution are listed in Table 2 and illustrated in FIG. 7. The $\delta^{13}C$ values for the precipitate and supernatant solution were −31.98‰ and −38.59‰, respectively. The $\delta^{13}C$ values of both products of the reaction reflect the incorporation of the $CO_2$ source ($\delta^{13}C$=−41.39‰) and the influence of the brucite tailings that included some calcium carbonate ($\delta^{13}C$=−

6.73%). This Example illustrates that $\delta^{13}C$ values may be used to confirm the primary source of carbon in a carbonate composition as well as in a solution produced from the carbon dioxide.

material are as described herein, and would be apparent to one of skill in the art. The carbonate material was characterized using $\delta^{13}C$ analysis, x-ray diffraction (XRD) analysis, and scanning electron microscopy (SEM).

TABLE 2

EXPERIMENTAL SOURCE MATERIALS AND VALUES MEASURED
FOR ISOTOPIC FRACTIONATION CHARACTERIZATION

| EXAMPLE | ATMOSPHERE $\delta^{13}C$ VALUE [‰][3] | $CO_2$ SOURCE | $CO_2$ SOURCE $\delta^{13}C$ VALUE [‰] | BASE SOURCE | BASE $\delta^{13}C$ VALUE [‰] | SUPERNATANT SOLUTION $\delta^{13}C$ VALUE [‰] | PRECIPITATE $\delta^{13}C$ VALUE [‰] |
|---|---|---|---|---|---|---|---|
| 1 | −8 | bottled gas, source 1 | −41.39 | $Mg(OH)_2$ + $Ca(CO)_3$ tailings | −6.73 | −38.59 | −31.98 |
| 2 | −8 | bottled gas conforming to NIST RM8563[4] | −41.56 | $Mg(OH)_2$ + $Ca(CO)_3$ tailings | −6.73 | −34.16 | −30.04 |
| 3 | −8 | flue gas from propane burner | −25.00 | $Mg(OH)_2$ + $Ca(CO)_3$ tailings | −6.73 | −24.8 | −19.92 |
| 4 | −8 | $SO_2/CO_2$ bottled gas mix | −12.45 | fly ash | −17.46 | −11.70 | −15.88 |

[3]Zeebe, R. E. and Wolf-Galdrow, E., $CO_2$ in Seawater: Equilibrium, Kinetics, Isotopes (2005) Elsevier, San Diego, g. 169.
[4]FROM NIST SPECIFICATION RM8563, $CO_2$ Light Isotopic Gas Standard Example 2

Figure 4:
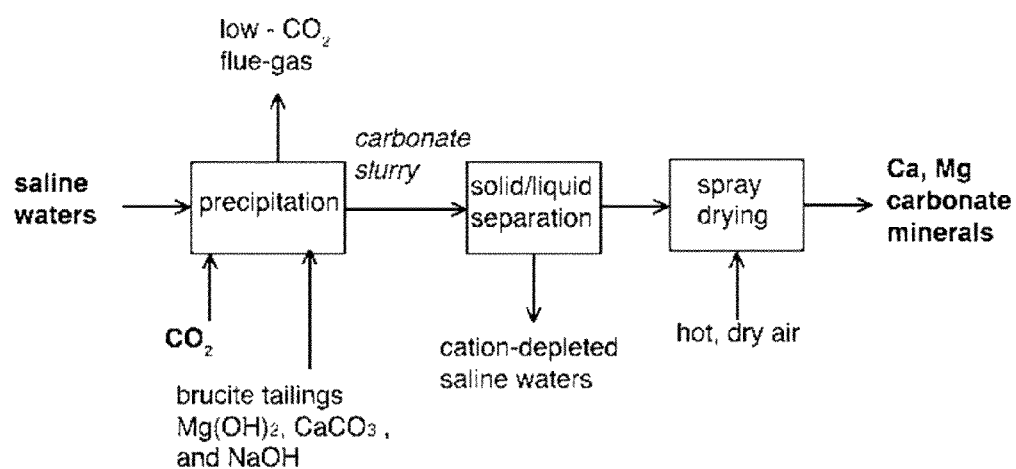
FIG. 4 provides a diagram of the production of precipitate material from carbon dioxide containing gas and brucite tailings on a large scale in a 250,000 gallon tank. Indicated in the diagram are the materials (gas, liquid, and solid) that were characterized.

Measurement of $\delta^{13}C$ Value for a Solid Precipitate and Starting Materials This precipitation was conducted in a 250,000 gallon container. The starting materials were commercially available bottled $CO_2$ gas, seawater (from around Santa Cruz, Calif.), 50% NaOH solution, and brucite tailings as the industrial waste. The brucite tailings were approximately 85% Mg(OH)$_2$, 12% CaCO$_3$ and 3% SiO$_2$ as determined by a Rietfeld analysis of the x-ray diffraction pattern of a dry aliquot of the tailings. The 250,000 gallon container was partially filled with locally available seawater. The carbon dioxide gas was sparged into the sea water through diffusers located at the bottom of the container. After $CO_2$ sparging, the pH of the sea water reached approximately 5.5. Brucite tailings were added to the seawater, providing an increase in magnesium concentration and alkalinity suitable for the precipitation of carbonate solids without releasing $CO_2$ into the atmosphere. The $CO_2$ gas sparging and brucite tailings addition ceased. Sodium hydroxide solution was then added to achieve a pH of approximately 9.5. Sufficient time was allowed for interaction of the components of the reaction, after which the precipitate material was separated from the remaining seawater solution, also known as the supernatant solution. Hot, dry air in a spray drying apparatus was used to dry this material. Over 500 kg of material was produced. See FIG. 4. The resulting powder was suitable, with further processing, for use, e.g., as a material in the built environment, such as aggregate for use in a road bed, concrete, or the like. The powder could also have been stored as it was produced, as a carbon-sequestering storage material. Alternatively, the material could have been left in the supernatant solution and stored, optionally after equilibration with atmospheric air, as a slurry, where both the precipitate and the carbonates and bicarbonates in solution serve as carbon-sequestering materials. Other uses for the $\delta^{13}C$ values for the process starting materials, resulting materials and supernatant solution were measured. The $\delta^{13}C$ value for the atmospheric air was not measured, but a value from literature is given in Table 2. The analysis system used was manufactured by Los Gatos Research as described in Example 1.

Figure 8:
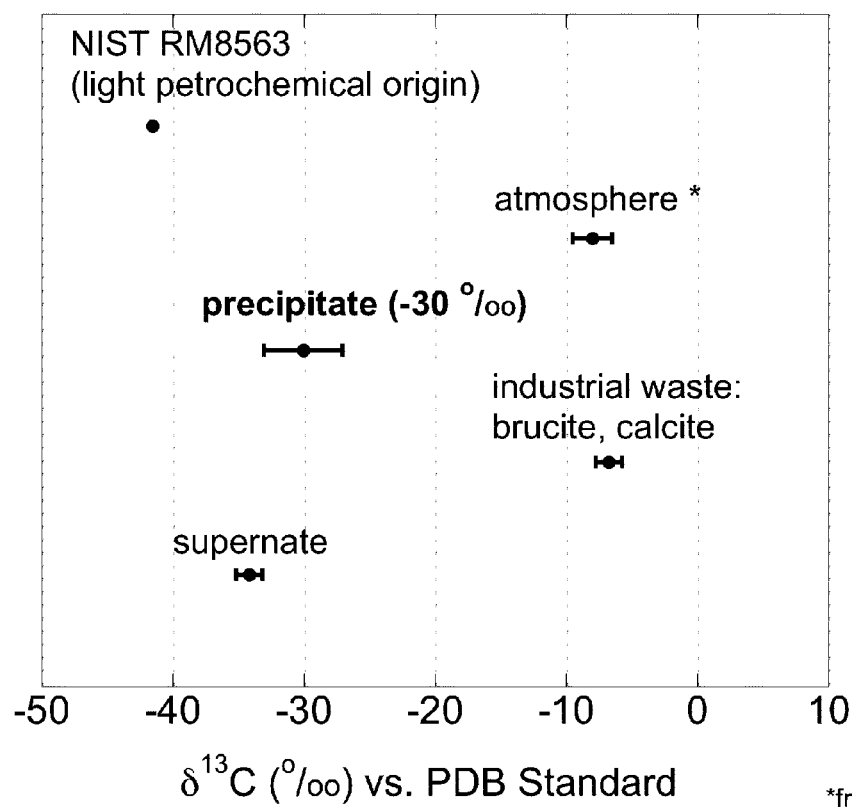
FIG. 8 provides a comparison of $\delta^{13}C$ data from literature, the source of the carbon dioxide containing gas, the industrial waste, precipitate, and supernate from a large scale process using brucite tailings as the industrial waste.

Measurements from the analysis of the $CO_2$ source, industrial waste (brucite tailings), carbonate precipitate, and supernatant solution are listed in Table 2 and illustrated in FIG. 8. The $\delta^{13}C$ values for the precipitate and supernatant solution were −30.04‰ and −34.16‰, respectively. The $\delta^{13}C$ values of both products of the reaction reflect the incorporation of the $CO_2$ source ($\delta^{13}C$=−41.56‰) and the influence of the brucite tailings that included some calcium carbonate ($\delta^{13}C$=−6.73‰). The precipitated carbonate material was more likely to incorporate calcium carbonate from the brucite tailings than the supernatant solution, so the $\delta^{13}C$ value of the precipitate reflects that by being less negative than that of the supernatant solution. This Example illustrates that $\delta^{13}C$ values may be used to confirm the primary source of carbon in a carbonate composition as well as in a solution produced from the carbon dioxide.

Example 3

Measurement of $\delta^{13}C$ Value for a Solid Precipitate and Starting Materials This experiment was performed using flue gas resulting from burning propane and a magnesium rich industrial waste material. The procedure was conducted in a container open to the atmosphere.

The starting materials were flue gas from a propane burner, seawater (from around Santa Cruz, Calif.), and brucite tailings as the industrial waste. The brucite tailings were approximately 85% Mg(OH)$_2$, 12% CaCO$_3$ and 3% SiO$_2$ as determined by a Rietveld analysis of the x-ray diffraction pattern of a dry aliquot of the tailings.

Figure 5:
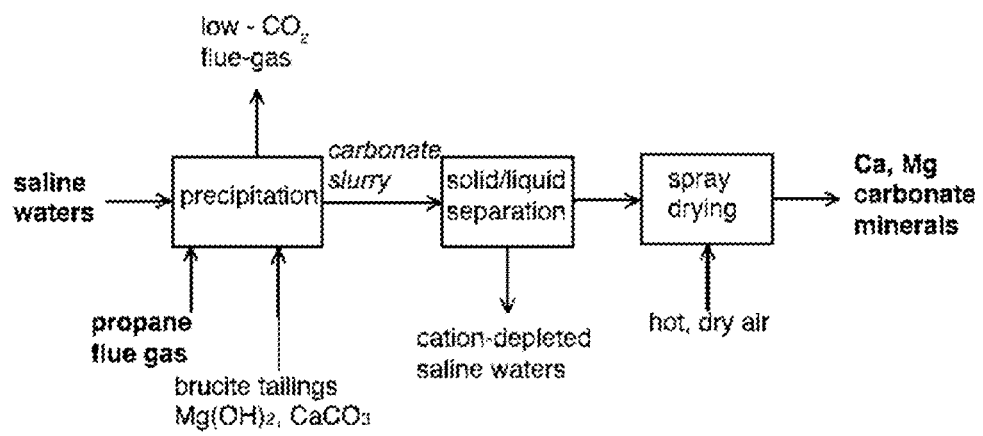
FIG. 5 provides a diagram of the production of precipitate material from carbon dioxide containing gas and brucite tailings in a continuous process. Indicated in the diagram are the materials (gas, liquid, and solid) that were characterized.

A container was filled with locally available seawater. Brucite tailings were added to the seawater, providing a pH (alkaline) and divalent cation concentration suitable for carbonate precipitation without releasing $CO_2$ into the atmosphere. Flue gas was sparged at a rate and time suitable to precipitate carbonate material from the alkaline seawater solution. Sufficient time was allowed for interaction of the components of the reaction, after which the precipitate material was separated from the remaining seawater solution, also known as the supernatant solution, and spray-dried. See FIG. 5. The resulting powder was suitable, with further processing, for use, e.g., as a material in the built environment, such as aggregate for use in a road bed, concrete, or the like. The powder could also have been stored as it was produced, as a carbon-sequestering storage material. Alternatively, the material could have been left in the supernatant solution and stored, optionally after equilibration with atmospheric air, as a slurry, where both the precipitate and the carbonates and bicarbonates in solution serve as carbon-sequestering materials. As used herein, "$CO_2$-sequestering" and "carbon-sequestering" are synonymous. Other uses for the material are as described herein, and would be apparent to one of skill in the art.

$\delta^{13}C$ values for the process starting materials, resulting precipitate carbonate material and supernatant solution were measured. The $\delta^{13}C$ value for the atmospheric air was not measured, but a value from literature is given in Table 2 and illustrated in FIG. 9. The analysis system used was manufactured by Los Gatos Research and uses direct absorption spectroscopy to provide $\delta^{13}C$ and concentration data for gases ranging from 2% to 20% $C_{O2}$, as detailed in Example 1.

Measurements from the analysis of the flue gas, industrial waste (brucite tailings), carbonate precipitate, and supernatant solution are listed in Table 2. The $\delta^{13}C$ values for the precipitate and supernatant solution were −19.92% and −24.8%, respectively. The $\delta^{13}C$ values of both products of the reaction reflect the incorporation of the flue gas, $CO_2$ source, ($\delta^{13}C$=−25.00%) and the influence of the brucite tailings that included some calcium carbonate ($\delta^{13}C$=−6.73%). This Example illustrates that $\delta^{13}C$ values may be used to confirm the primary source of carbon in a carbonate composition when the $CO_2$ source for the carbonate is combustion, as well as in a solution produced from the carbon dioxide.

Example 4

Measurement of $\delta^{13}C$ Value for a Solid Precipitate and Starting Materials This experiment precipitated carbonated material from an aqueous solution using a bottled mixture of $SO_2$ and carbon dioxide ($CO_2$) gases and a fly ash as an industrial waste material. The procedure was conducted in a closed container.

The starting materials were a commercially available bottled mixture of $SO_2$ and $CO_2$ gas ($SO_2/CO_2$ gas), de-ionized water, and fly ash as the industrial waste.

Figure 6:
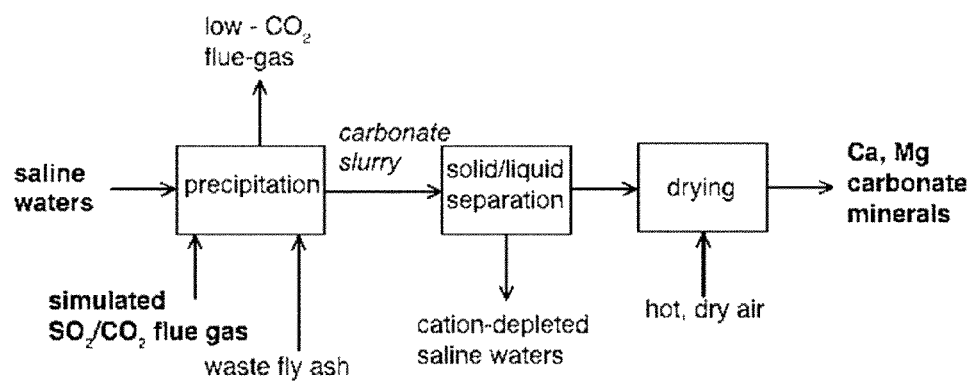
FIG. 6 provides a diagram of the production of precipitate material from carbon dioxide containing gas and fly ash in a laboratory scale process. Indicated in the diagram are the materials (gas, liquid, and solid) that were characterized.

A container was filled with de-ionized water. Fly ash was added to the de-ionized water after slaking, providing a pH (alkaline) and divalent cation concentration suitable for carbonate precipitation without releasing $CO_2$ into the atmosphere. $SO_2/CO_2$ gas was sparged at a rate and time suitable to precipitate carbonate material from the alkaline solution. Sufficient time was allowed for interaction of the components of the reaction, after which the precipitate material was separated from the remaining solution, also known as the supernatant solution, and spray-dried. See FIG. 6. The resulting powder was suitable, with further processing, for use, e.g., as a material in the built environment, e.g., as aggregate for use in a road bed, concrete, or the like. The powder could also have been stored as it was produced, as a carbon-sequestering storage material. Alternatively, the material could have been left in the supernatant solution and stored, optionally after equilibration with atmospheric air, as a slurry, where both the precipitate and the carbonates and bicarbonates in solution serve as carbon-sequestering materials. Other uses for the material are as described herein, and would be apparent to one of skill in the art.

$\delta^{13}C$ values for the process starting materials, precipitate carbonate material and supernatant solution were measured as detailed in Example 1.

Figure 10:
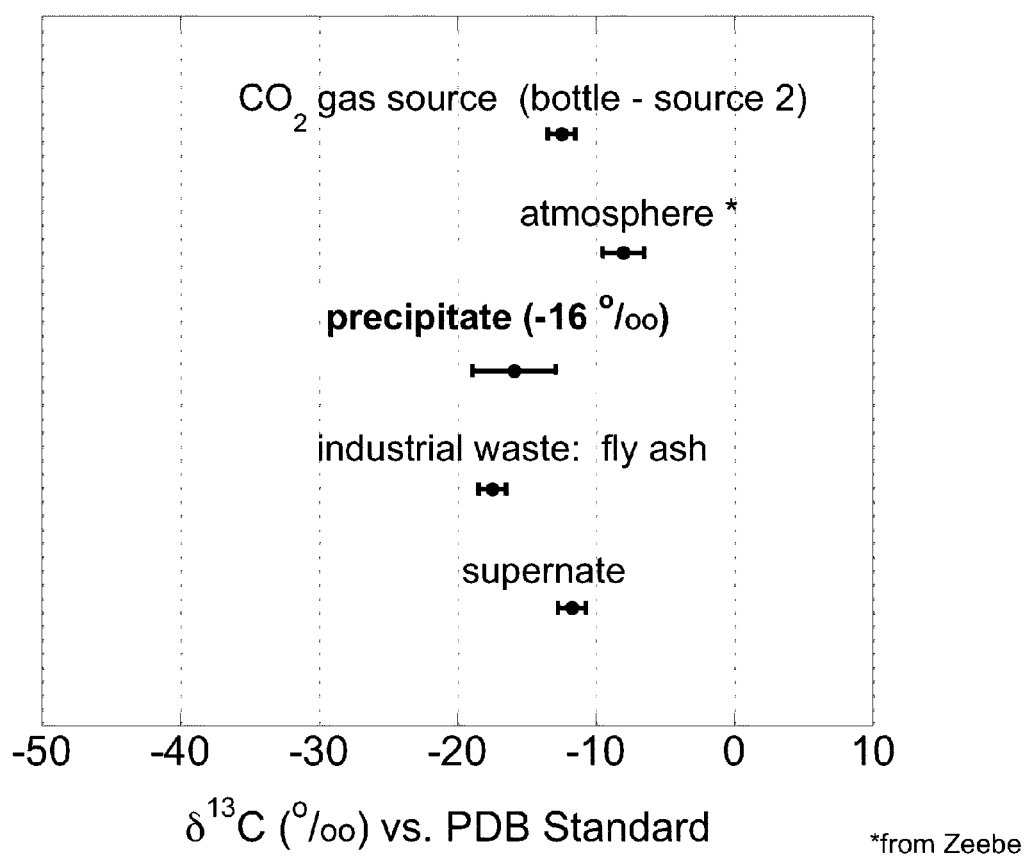
FIG. 10 provides a comparison of $\delta^{13}C$ data from literature, the source of the carbon dioxide containing gas, the industrial waste, precipitate, and supernate from a laboratory scale process using fly ash as the industrial waste.

Measurements from the analysis of the $SO_2/CO_2$ gas, industrial waste (fly ash), carbonate precipitate, and supernatant solution are listed in Table 2 and illustrated in FIG. 10. The $\delta^{13}C$ values for the precipitate and supernatant solution were −15.88% and −11.70%, respectively. The $\delta^{13}C$ values of both products of the reaction reflect the incorporation of the $SO_2/CO_2$ gas ($\delta^{13}C$=−12.45%) and the fly ash that included some carbon that was not fully combusted to a gas ($\delta^{13}C$=−17.46%). Because the fly ash, itself a product of fossil fuel combustion, had a more negative $\delta^{13}C$ than the $CO_2$ used, the overall $\delta^{13}C$ value of the precipitate reflects that by being more negative than that of the $CO_2$ itself. This Example illustrates that $\delta^{13}C$ values may be used to confirm the primary source of carbon in a carbonate composition, when a gas mixture that includes a $SO_x$ ($SO_2$) as well as $CO_2$ is used.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of verifying the origin of carbon in a synthetic carbonate composition derived from a combustion of a fossil fuel source comprising:
   i) evaluating the source of the carbon in the synthetic carbonate composition derived from the combustion of a fossil fuel source by
      (a) determining a relative carbon isotope composition $\delta^{13}C$ value for the composition;
      (b) comparing the value determined in step (a) with a second $\delta^{13}C$ value of a known source; and
      (c) verifying that the composition comprises carbon derived from a fossil fuel source based on the result of the comparison of step (b) and confirming that the $\delta^{13}C$ value for the composition is more like to $\delta^{13}C$ values derived from plant-derived sources than $\delta^{13}C$ values derived from atmospheric carbon dioxide or non-planted-derived marine sources of carbon;
   ii) measuring the carbon content of the composition; and
   iii) quantifying an amount of carbon dioxide that is sequestered in the composition.

2. The method of claim 1 wherein the composition is a building material or a material for underground storage.

3. The method of claim 1 wherein the composition is a cementitious composition or an aggregate.

4. The method of claim 1 wherein the composition is a composition for storage of $CO_2$.

5. The method of claim 1 further comprising determining a stability of the composition for release of $CO_2$.

6. The method of claim 1 wherein the second $\delta^{13}C$ value of step i) (b) is a reference $\delta^{13}C$ value.

7. The method of claim 6, wherein the reference $\delta^{13}C$ value is −10‰.

8. The method of claim 1 wherein the second $\delta^{13}C$ value of step i) (b) is a value for a possible raw material for the composition.

9. The method of claim 6 wherein the second $\delta^{13}C$ value is a value for a fossil fuel or a flue gas derived from said fossil fuel.

* * * * *

UNITED STATES PATENT AND TRADEMARK OFFICE
CERTIFICATE OF CORRECTION

| | | |
|---|---|---|
| PATENT NO. | : 7,939,336 B2 | Page 1 of 1 |
| APPLICATION NO. | : 12/571400 | |
| DATED | : May 10, 2011 | |
| INVENTOR(S) | : Constantz et al. | |

It is certified that error appears in the above-identified patent and that said Letters Patent is hereby corrected as shown below:

On the Title page, in the title section, and col. 1, lines 1-2; of the printed patent, please change "Compositions and methods using substances containing carbon" to -- A method of varying the origin of carbon in a synthetic carbonate composition --.

At sheet 7 of 10, figure 7, of the printed patent, please change "o/oo" to -- ‰ --.

At sheet 8 of 10, figure 8, of the printed patent, please change "o/oo" to -- ‰ --.

Figure 9:
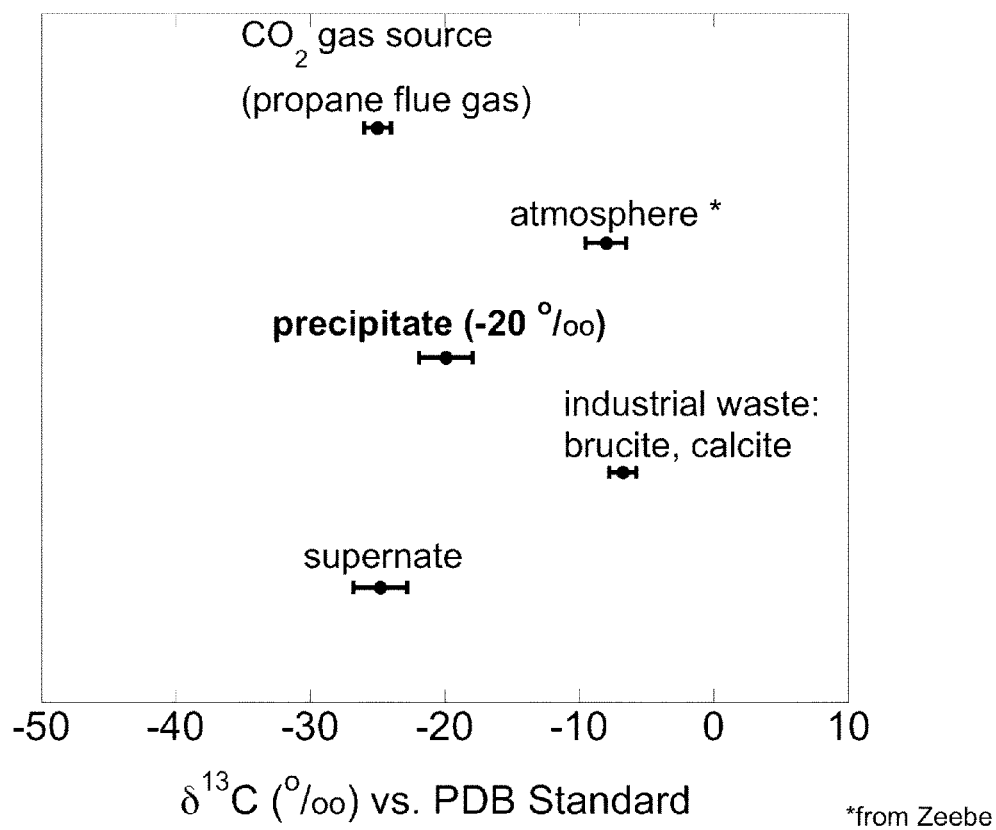
FIG. 9 provides a comparison of $\delta^{13}C$ data from literature, the source of the carbon dioxide containing gas, the industrial waste, precipitate, and supernate from a continuous process using brucite tailings as the industrial waste.

At sheet 9 of 10, figure 9, of the printed patent, please change "o/oo" to -- ‰ --.

At sheet 10 of 10, figure 10, of the printed patent, please change "o/oo" to -- ‰ --.

At column 48, line 55 (claim 1, line 14) of the printed patent, please delete the word "to".

Signed and Sealed this
Twenty-seventh Day of March, 2012

David J. Kappos
*Director of the United States Patent and Trademark Office*